United States Patent
Shinohara

(10) Patent No.: US 11,125,887 B2
(45) Date of Patent: Sep. 21, 2021

(54) TIME SYNCHRONIZATION SYSTEM AND TRANSMISSION APPARATUS

(71) Applicant: ENABLER LTD., Tokyo (JP)

(72) Inventor: Takahiro Shinohara, Tokyo (JP)

(73) Assignee: ENABLER LTD., Tokyo (JP)

( * ) Notice: Subject to any disclaimer, the term of this patent is extended or adjusted under 35 U.S.C. 154(b) by 197 days.

(21) Appl. No.: 16/464,630

(22) PCT Filed: Nov. 29, 2017

(86) PCT No.: PCT/JP2017/042923
§ 371 (c)(1),
(2) Date: May 28, 2019

(87) PCT Pub. No.: WO2018/101369
PCT Pub. Date: Jun. 7, 2018

(65) Prior Publication Data
US 2021/0103059 A1    Apr. 8, 2021

(30) Foreign Application Priority Data
Nov. 29, 2016   (JP) .............................. JP2016-231647

(51) Int. Cl.
*G01S 19/23*       (2010.01)
*G01S 19/14*       (2010.01)
(Continued)

(52) U.S. Cl.
CPC .............. *G01S 19/23* (2013.01); *G01S 19/14* (2013.01); *G01S 19/24* (2013.01); *G04R 20/02* (2013.01); *H04J 3/0644* (2013.01); *H04J 3/0661* (2013.01)

(58) Field of Classification Search
CPC .......... G01S 19/14; G01S 19/24; G01S 19/32; G04R 20/02; G01C 15/00; H04J 3/0644; H04J 3/0661; H01Q 1/1257
(Continued)

(56) References Cited

U.S. PATENT DOCUMENTS 8,451,814 B2   5/2013   Rausch et al.
9,261,861 B2   2/2016   Hasegawa et al.
(Continued)

FOREIGN PATENT DOCUMENTS

CN    1471331 A    1/2004
CN    1685648 A    10/2005
(Continued)

OTHER PUBLICATIONS

International Search Report issued in PCT Patent Application No. PCT/JP2017/042923, dated Mar. 6, 2018.
(Continued)

*Primary Examiner* — Harry K Liu
(74) *Attorney, Agent, or Firm* — Marshall, Gerstein & Borun LLP

(57) ABSTRACT

A system capable of achieving time synchronization among a plurality of apparatuses provided at positions where they are unable to receive a GNSS signal is provided. A time synchronization system includes a reference time obtaining unit configured to obtain, based on a radio signal from a global navigation satellite system, a first timing signal and time information corresponding to timing indicated by the first timing signal, a modulator, connected to a line branched into a plurality of branches, configured to generate a modulated signal containing corresponding time information in synchronization with the first timing signal and to send the modulated signal over the line, at least one demodulator, connected to any branch of the line, configured to demodu-
(Continued)

late the modulated signal propagating over the line, and at least one transmitter configured to transmit a first radio signal compatible with the radio signal from the global navigation satellite system.

14 Claims, 50 Drawing Sheets

(51) Int. Cl.
  *G01S 19/24* (2010.01)
  *G04R 20/02* (2013.01)
  *H04J 3/06* (2006.01)
(58) Field of Classification Search
  USPC ........................................................ 342/352
  See application file for complete search history.

(56) References Cited

U.S. PATENT DOCUMENTS

| | | |
|---|---|---|
| 2004/0004943 A1 | 1/2004 | Kim et al. |
| 2005/0169230 A1 | 8/2005 | Haefner |
| 2006/0165113 A1 | 7/2006 | Nonoyama |
| 2007/0081514 A1 | 4/2007 | Shirokura et al. |
| 2008/0043714 A1 | 2/2008 | Pernu |
| 2009/0168808 A1 | 7/2009 | Cho et al. |
| 2010/0188286 A1 | 7/2010 | Bickerstaff et al. |
| 2011/0305146 A1 | 12/2011 | Rausch et al. |
| 2013/0243040 A1* | 9/2013 | Kimura ............... H04W 4/20 375/141 |
| 2014/0016722 A1* | 1/2014 | Torimoto ............ G01S 5/0226 375/295 |
| 2014/0186049 A1* | 7/2014 | Oshima ............... H04W 4/21 398/118 |
| 2015/0055609 A1 | 2/2015 | Rausch et al. |
| 2015/0323677 A1* | 11/2015 | Muraki ................. G01S 19/25 342/357.25 |
| 2016/0295426 A1 | 10/2016 | Gormley et al. |

FOREIGN PATENT DOCUMENTS

| | | |
|---|---|---|
| CN | 1868172 A | 11/2006 |
| CN | 101473672 A | 7/2009 |
| CN | 102216801 A | 10/2011 |
| JP | 2004150892 A | 5/2004 |
| JP | 2006337236 A | 12/2006 |
| JP | 2007218651 A | 8/2007 |
| JP | 2007263595 A | 10/2007 |
| JP | 2008283235 A | 11/2008 |
| RU | 2303853 C2 | 7/2007 |
| WO | WO-03/08181041 A1 | 10/2003 |

OTHER PUBLICATIONS

Kaoru et al., "Overview of Network Synchronization Technology, Standardization in ITU-T," *NTT Technical Journal*, (2015).
Taoka et al., "MIMO and CoMP in LTE-Advanced," *NTT DOCOMO Technical Journal*, vol. 18, No. 2 (2010).
"IMES User Interface Specifications (IS-IMES)," *Japan Aerospace Exploration Agency*, (2016).
Supplementary European Search Report issued in European Patent Application No. 17876983 dated Jun. 23, 2020.
Office Action issued in Chinese Patent Application No. 201780084894.9 dated Sep. 30, 2020.
Office Action issued in Russian Patent Application No. 2019120239/28(039364) dated Mar. 29, 2021.
Office Action issued in Chinese Patent Application No. 201780084894.9 dated Apr. 9, 2021.
Xiaowi, Li, "Wireless Sensor Network Technology," *Beijing Institute of Technology Press*, pp. 171-172 (2007).

* cited by examiner

| MESSAGE TYPE | | NAME | THE NUMBER OF WORDS | LOWEST FREQUENCY | CONTENT(LSB) | |
|---|---|---|---|---|---|---|
| MT0 | 000 | POSITION INFORMATION 1 | 3 | 12 | LATITUDE·LONGITUDE(2.4m), FLOOR NUMBER(1) | ⎫ |
| MT1 | 001 | POSITION INFORMATION 2 | 4 | 12 | LATITUDE·LONGITUDE(1.2m), ALTITUDE(1m), FLOOR NUMBER(0.5) | ⎬ IMES SIGNAL |
| MT3 | 011 | SHORT ID | 1 | 6 | 12-BIT ID | |
| MT4 | 100 | MEDIUM ID | 2 | 12 | 33-BIT ID | ⎭ |
| MT7 | 111 | TS-MSG1 | 4 | — | GPSWeek, TOW, MONTH, DAY, HOUR, MINUTE, SECOND | } IMES-TS SIGNAL |

| MESSAGE TYPE | | NAME | THE NUMBER OF WORDS | LOWEST FREQUENCY | CONTENT(LSB) | |
|---|---|---|---|---|---|---|
| MT0 | 000 | POSITION INFORMATION 1 | 3 | 12 | LATITUDE·LONGITUDE(2.4m), FLOOR NUMBER(1) | ⎫ |
| MT1 | 001 | POSITION INFORMATION 2 | 4 | 12 | LATITUDE·LONGITUDE(1.2m), ALTITUDE(1m), FLOOR NUMBER(0.5) | ⎬ IMES SIGNAL |
| MT3 | 011 | SHORT ID | 1 | 6 | 12-BIT ID | |
| MT4 | 100 | MEDIUM ID | 2 | 12 | 33-BIT ID | ⎭ |
| MT6 | 110 | TS-MSG0 | 3 | — | GPS Nav COMPATIBLE·GPSWeek·TOW | ⎫ IMES-TS |
| MT7 | 111 | TS-MSG1 | 3 | — | CHRISTIAN·YEAR·MONTH·DAY·HOUR·MINUTE·SECOND | ⎭ SIGNAL |

250 — MT6 row
260 — MT7 row

FIG.16

| MESSAGE TYPE | | THE NUMBER OF PAGES | NAME | THE NUMBER OF WORDS | LOWEST FREQUENCY | CONTENT(LSB) | |
|---|---|---|---|---|---|---|---|
| MT0 | 000 | N/A | POSITION INFORMATION 1 | 3 | 12 | LATITUDE·LONGITUDE(2.4m), FLOOR NUMBER(1) | } IMES SIGNAL |
| MT1 | 001 | N/A | POSITION INFORMATION 2 | 4 | 12 | LATITUDE·LONGITUDE(1.2m), ALTITUDE(1m), FLOOR NUMBER(0.5) | |
| MT3 | 011 | N/A | SHORT ID | 1 | 6 | 12-BIT ID | |
| MT4 | 100 | N/A | MEDIUM ID | 2 | 12 | 33-BIT ID | |
| MT7 | 110 | 1-3 | TAS | 4 | — | TIME/AUTHENTICATION:TOTP(RFC6238) | } IMES-TAS SIGNAL |

| MESSAGE TYPE | | THE NUMBER OF PAGES | NAME | THE NUMBER OF WORDS | LOWEST FREQUENCY | CONTENT(LSB) |
|---|---|---|---|---|---|---|
| MT0 | 000 | N/A | POSITION INFORMATION 1 | 3 | 12 | LATITUDE·LONGITUDE(2.4m), FLOOR NUMBER(1) |
| MT1 | 001 | N/A | POSITION INFORMATION 2 | 4 | 12 | LATITUDE·LONGITUDE(1.2m), ALTITUDE(1m), FLOOR NUMBER(0.5) |
| MT3 | 011 | N/A | SHORT ID | 1 | 6 | 12-BIT ID |
| MT4 | 100 | N/A | MEDIUM ID | 2 | 12 | 33-BIT ID |
| MT6 | 110 | 1–3 | Contents | 4/8 | – | Authorized Content |
| MT7 | 111 | | TAS | 4/8 | – | TIME/AUTHENTICATION/TOTP (RFC6238) |

MT0–MT4: IMES SIGNAL
MT6–MT7: IMES-TAS SIGNAL 250A (MT6 row), 270A (MT7 row)

FIG.31

| No. | Sentence Description | Format | Notes |
|---|---|---|---|
| [IMTCS] Time & Clock Service Information Message | | | |
| 1 | Header | $ | Fixed character. |
| 2 | Talker ID | IM | Fixed character. |
| 3 | Sentence ID | TCS | Kind of data. |
| 4 | Refer PRN channel | Integer Value | Refer IMES-TAS signal PRN No. |
| 5 | Current Time (UTC) | HHMMSS.SS | It is supplied by IMES management network. |
| 6 | Current Date (UTC) | YYYYMMDD | It is supplied by IMES management network. |
| 7 | Status | Integer Value | 0 = Invalid, Do not use.<br>1 = Valid<br>2 to 9 = Reserved |
| 8 | Time Base ID | Integer Value | ID of the time delivery station. |
| 9 | Checksum | *CS | As per NMEA Standard. |
| 10 | Carriage Return & Line Feed | <CR><LF> | |

FIG. 32

[IMTCR] Time & Clock Service RAW Information Message

| No. | Sentence Description | Format | Notes |
|---|---|---|---|
| 1 | Header | $ | Fixed character. |
| 2 | Talker ID | IM | Fixed character. |
| 3 | Sentence ID | TCS | Kind of data. |
| 4 | Refer PRN channel | Integer Value | Refer IMES-TAS signal PRN No. |
| 5 | Current Time (UTC) | HHMMSS | It is supplied by IMES management network. |
| 6 | Current Date (UTC) | YYYYMMDD | It is supplied by IMES management network. |
| 7 | Current IMES-GPS Week | Integer Value In decimal | It is supplied by IMES management network. |
| 8 | Current IMES-TOW | Integer Value In decimal | It is supplied by IMES management network. |
| 9 | Current Leap Seconds Different (Signed Flag) | Integer Value | 0 = +<br>1 = − |
| 10 | Current Leap Seconds Different (Value) | Integer Value | Differences between GPS Time and UTC Time. A value is a second. |
| 11 | Leap Apply Schedule of GPS Week | Integer Value | The adjustment by the leap second is carried out to keep UTC and difference (DUT1) with UT1 within a +−0.9 second. This adjustment is announced previously by IERS. This value is set based on decision of IERS. |
| 12 | Leap Apply Days | Integer Value | Multiplication day from Leap Apply Schedule of GPS Week. |
| 13 | Effectiveness of the 1PPS | Integer Value | Set by IMES management network. This value is judged by a transmitter. This value is broadcasted by IMES transmitter. 0 = Invalid  1 = Valid |
| 14 | The deviation that is offered. (Nano seconds) | Integer Value | Set by IMES management network. Decision level by the IMES setting adjustment. This value is broadcasted by IMES transmitter. It is not a value to guarantee. 0 = Invalid |
| 15 | Timing Grade/Stratum | Integer Value | Set by IMES management network. This value is judged by a transmitter. This value is broadcasted by IMES transmitter.  0 = Stratum0  1 = Stratum1<br>2 = Stratum2  3 = Stratum3  4~7 = Reserve  8 = Async  9 = Invalid |
| 16 | Status | Integer Value | 0 = Invalid , Do not use.   1 = Valid   2 to 9 = Reserved |
| 17 | Time Base ID | Integer Value | ID of the time delivery station. |
| 18 | Checksum | *CS | As per NMEA Standard. |
| 19 | Carriage Return & Line Feed | <CR><LF> | |

FIG. 33

| No. | Sentence Description | [ IMASC ] Authentication Service Code Message | |
|---|---|---|---|
| | | Format | Notes |
| 1 | Header | $ | Fixed character. |
| 2 | Talker ID | IM | Fixed character. |
| 3 | Sentence ID | ASC | Kind of data. |
| 4 | Refer PRN channel | Integer Value | Refer IMES-TAS signal PRN No. |
| 5 | ASG Version | Integer Value | Management number for security weakness. 0 = default Other numbers are reserved. |
| 6 | Current IMES-GPS Week | Integer Value In decimal | It is supplied by IMES management network. This value is broadcasted by IMES transmitter. |
| 7 | Current IMES-TOW | Integer Value In decimal | It is supplied by IMES management network. This value is broadcasted by IMES transmitter. |
| 8 | Status | Integer Value | 0 = Invalid, Do not use. 1 = Valid 2 to 9 = Reserved |
| 9 | C/No | Integer Value | 00 ~ 99 [dB-Hz] |
| 10 | Latitude | ddmm.mmmmmm | Latitude in IMES Message |
| 11 | N/S indicator | Character | N = North, S = South |
| 12 | Longitude | dddmm.mmmmmm | Longitude in IMES Message |
| 13 | E/W indicator | Character | E = East, W = West |
| 14 | Altitude | hh.hh | Altitude in IMES Message |
| 15 | Altitude Unit | Character | M = Meter |
| 16 | Floor ID | Floating value | Floor ID in IMES Message |
| 17 | TOTP Control Code | Hex16bit. It is expressed in ASCII characters. | 16bit possible values 0x0000 to 0xFFFF |
| 18 | TOTP Value | Hex 64bit or Hex 128bit. It is expressed in ASCII characters. | 64bit possible values 0x0000 0000 0000 0000 to 0xFFFF FFFF FFFF FFFF 128bit possible values 0x0000 0000 0000 0000 0000 0000 0000 0000 to 0xFFFF FFFF FFFF FFFF FFFF FFFF FFFF FFFF *128bit length TOTP is reserved. |
| 19 | Time Base ID | Integer Value | ID of the time delivery station. |
| 20 | Checksum | *CS | As per NMEA Standard. |
| 21 | Carriage Return & Line Feed | <CR><LF> | |

FIG.34

[IMMSG] IMES Contents bit stream Message

| No. | Sentence Description | Format | Notes |
|---|---|---|---|
| 1 | Header | $ | Fixed character. |
| 2 | Talker ID | IM | Fixed character. |
| 3 | Sentence ID | MSG | Kind of data. |
| 4 | Refer PRN channel | Integer Value | Refer IMES-TAS signal PRN No. |
|  | Message Type | Integer Value | 0 to 8 |
| 5 | Bitstream | Integer Value | 0xFFFF FFFF FFFF FFFF ..<br>[ It is the value of all 30bit from Preamble to CRC.<br>Plural Word is included, too.] |
| 8 | Time Base ID | Integer Value | ID of the time delivery station. |
| 9 | Checksum | *CS | As per NMEA Standard. |
| 10 | Carriage Return & Line Feed | \<CR\>\<LF\> |  |

FIG.35

[IMPI] IMES Independent Position Information Message

| No. | Sentence Description | Format | Notes |
|---|---|---|---|
| 1 | Header | $ | Fixed character. |
| 2 | Talker ID | IM | Fixed character. |
| 3 | Sentence ID | IPI | Kind of data. |
| 4 | Refer PRN channel | Integer Value | Refer IMES or IMES-TAS signal PRN No. |
| 5 | Current Time (UTC) | HHMMSS | It is supplied by IMES management network. This value is broadcasted by IMES transmitter. |
| 6 | Status | Integer Value | 0 = Invalid, Do not use.  1 = Valid  2 to 9 = Reserved |
| 7 | C/No | Integer Value | 00 – 99 [dB-Hz] |
| 8 | Latitude | ddmm.mmmmmm | Latitude in IMES Message |
| 9 | N/S indicator | Character | N = North, S = South |
| 10 | Longitude | dddmm.mmmmmm | Longitude in IMES Message |
| 11 | E/W Indicator | Character | E = East, W = West |
| 12 | Altitude | hh.hh | Altitude in IMES Message |
| 13 | Altitude Unit | Character | M = Meter |
| 14 | Floor ID | Floating value | Floor ID in IMES Message |
| 15 | Accuracy Index | Integer Value | 0 = Indefinable<br>1 = IMES Accuracy better than 7m<br>2 = IMES Accuracy between 7 – 15m<br>3 = IMES Accuracy more than 15m<br>Refer QZSS IS Doc Table 1.3.1-4, Page A9 |
| 16 | Checksum | *CS | As per NMEA Standard. |
| 17 | Carriage Return & Line Feed | <CR><LF> | |

FIG.36

[ IMSPI ] IMES Synthesis Position Infomation Message

| No. | Sentence Description | Format | Notes |
|---|---|---|---|
| 1 | Header | $ | Fixed character. |
| 2 | Talker ID | IM | Fixed character. |
| 3 | Sentence ID | SPI | Kind of data. |
| 4 | In use | Integer Value | The number of the use of IMESs |
| 5 | Current Time (UTC) | HHMMSS | It is supplied by IMES management network. This value is broadcasted by IMES transmitter. |
| 6 | Status | Integer Value | 0 = Invalid, Do not use.  1 = Valid  2 to 9 = Reserved |
| 7 | C/No | Integer Value | N/A |
| 8 | Latitude | ddmm.mmmmm | Latitude in IMES Message |
| 9 | N/S indicator | Character | N = North, S = South |
| 10 | Longitude | dddmm.mmmmm | Longitude in IMES Message |
| 11 | E/W Indicator | Character | E = East, W = West |
| 12 | Altitude | hh.hh | Altitude in IMES Message |
| 13 | Altitude Unit | Character | M = Meter |
| 14 | Floor ID | Floating value | Floor ID in IMES Message |
| 15 | Synthesis Type | Integer Value | 0 = Choose a value of strongest IMES<br>1 = The value that averaged a position of plural IMES<br>2 = Unification position using individual signal strength<br>3 = Other   4 = Maker defined<br>5 = Undefined   6-9 = Reserved |
| 16 | Checksum | *CS | As per NMEA Standard. |
| 17 | Carriage Return & Line Feed | <CR><LF> | |

FIG.37

| No. | Sentence Description | Format | Notes |
|---|---|---|---|
| | [IMSID] Short ID Code Message | | |
| 1 | Header | $ | Fixed character. |
| 2 | Talker ID | IM | Fixed character. |
| 3 | Sentence ID | SID | Kind of data. |
| 4 | Refer PRN channel | Integer Value | Refer IMES or IMES-TAS signal PRN No. |
| 5 | Status | Integer Value | 0 = Invalid, Do not use.<br>1 = Valid<br>2 to 9 = Reserved |
| 6 | SID | 0xhhh | Short ID in Hexadecimal Values<br>12 bits represented in HEX by 3 nibbles |
| 7 | Boundary Bit (BD Bit) | Integer Value | 0 = IMES Transmitter is inside the building<br>1 = IMES Transmitter is at or near the Entrance of a Building where other GNSS signals may also be visible<br>Or where inside/outside zone is not clearly defined.<br>For Example: a dock yard with big metal roof |
| 8 | Checksum | *CS | As per NMEA Standard. |
| 9 | Carriage Return & Line Feed | <CR><LF> | |

FIG.38

| No. | Sentence Description | Format | Notes |
|---|---|---|---|
| | [ IMMID ] Medium ID Code Message | | |
| 1 | Header | $ | Fixed character. |
| 2 | Talker ID | IM | Fixed character. |
| 3 | Sentence ID | MID | Kind of data. |
| 4 | Refer PRN channel | Integer Value | Refer IMES or IMES-TAS signal PRN No. |
| 5 | Status | Integer Value | 0 = Invalid , Do not use.<br>1 = Valid<br>2 to 9 = Reserved |
| 6 | MID | 0xhhhhhhhhh | Medium ID in Hexadecimal Values<br>33 bits represented in HEX by 9 nibbles<br>3 MSBs are always zeros. |
| 7 | Boundary Bit (BD Bit) | Integer Value | 0 = IMES Transmitter is inside the building<br>1 = IMES Transmitter is at or near the Entrance of a Building where other GNSS signals may also be visible<br>Or where inside/outside zone is not clearly defined.<br>For Example: a dock yard with big metal roof |
| 8 | Checksum | *CS | As per NMEA Standard. |
| 9 | Carriage Return & Line Feed | <CR><LF> | |

FIG.39

[IMDSA] Disaster A Message

| No. | Sentence Description | Format | Notes |
|---|---|---|---|
| 1 | Header | $ | Fixed character. |
| 2 | Talker ID | IM | Fixed character. |
| 3 | Sentence ID | DSA | Kind of data. |
| 4 | Refer PRN channel | Integer Value | Refer IMES or IMES-TAS signal PRN No. |
| 5 | [Undefined] | [Undefined] | [Undefined] |
| 6 | [Undefined] | [Undefined] | [Undefined] |
| 7 | [Undefined] | [Undefined] | [Undefined] |
| 8 | [Undefined] | [Undefined] | [Undefined] |
| 9 | Checksum | *CS | As per NMEA Standard. |
| 10 | Carriage Return & Line Feed | <CR><LF> | |

FIG.40

[ GPGGA ] GNSS Position Information Message (IMES-TAS Debug Mode)

| No. | Sentence Description | Format | Notes |
|---|---|---|---|
| 1 | Header | $ | Fixed character. |
| 2 | Talker ID | GP | Fixed character. |
| 3 | Sentence ID | GGA | Kind of data. |
| 4 | Current Time (UTC) | HHMMSS | It is supplied by IMES management network. This value is broadcasted by IMES transmitter. |
| 5 | Latitude | ddmm.mmmmm | Latitude in IMES Message |
| 6 | N/S indicator | Character | N = North, S = South |
| 7 | Longitude | dddmm.mmmmm | Longitude in IMES Message |
| 8 | E/W Indicator | Character | E = East, W = West |
| 9 | Quality/Position Mode | Integer Value | 0 = No position<br>1 = SPS<br>2 = DGPS |
| 10 | SVs | Integer Value | The number of the acquire satellites |
| 11 | HDOP | hh.hh | Horizontal dilution of precision |
| 12 | Altitude (MSL) | Integer Value | Altitude (MSL) |
| 13 | Altitude Unit | Character | M = Meter |
| 14 | Geoid | Integer Value | Geoid height |
| 15 | Geoid Unit | Character | M = Meter |
| 16 | AGE | Integer Value | DGPS Correction data age |
| 17 | SITE ID | Integer Value | DGPS Base Station ID |
| 18 | Checksum | *CS | As per NMEA Standard. |
| 19 | Carriage Return & Line Feed | <CR><LF> | |

TIME SYNCHRONIZATION SYSTEM AND TRANSMISSION APPARATUS

TECHNICAL FIELD

The present technology relates to a time synchronization system and a transmission apparatus included in the time synchronization system.

BACKGROUND

A method of using a global navigation satellite system (GNSS) such as a global positioning system (GPS) in a system requiring time synchronization among a plurality of apparatuses has generally been used. Typically, in a mobile communication base station (which is also simply referred to as a "base station" below) adapted to code division multiple access (CDMA), system synchronization required for control of data transmission and reception has been achieved from an initial stage of practical use thereof by using a radio signal from the GNSS (which is also referred to as a "GNSS signal" below).

In a typical configuration, time synchronization among a plurality of base stations is achieved by providing a GNSS receiver in each base station and having each base station manage time based on a timing signal output from the receiver (in an example of the GPS, a pulse per second (PPS) signal or the like) and a time message (see also Kaoru Arai and Makoto Murakami, "Overview of Network Synchronization Technology, Standardization in ITU-T," NTT Technical Journal, December 2015 and the like).

In order to address increased traffic, a communication technology referred to as LTE-Advanced has been put into practical use, and furthermore, a next-generation mobile communication system referred to as 5G has also technically been studied and developed (see also Taoka et al., "MIMO and CoMP in LTE-Advanced," NTT DOCOMO Technical Journal Vol. 18, No. 2, July 2010 and the like). LTE-Advanced includes multiple-input and multiple-output (MIMO) and coordinated multiple point transmission/reception (CoMP) as technologies for enhancing throughput, and more precise time synchronization is required for realizing such technologies.

As an approach to increase in communication capacity by enhancing efficiency in use of frequencies, a cell has also been reduced in size and a micro base station referred to as a femtocell has also been put into practical use. System synchronization should be achieved also in such a micro base station as in a common base station.

The micro base station as described above is assumed to be provided indoors, for example, in a house of a user. Such a micro base station provided indoors is often unable to receive a GNSS signal or intensity of a received GNSS signal is often insufficient. Then, time synchronization as adopted in a conventional base station cannot be achieved.

SUMMARY OF THE DISCLOSURE

In consideration of such problems, an object of the present technology is to provide a system capable of achieving time synchronization among a plurality of apparatuses provided at positions where they are unable to receive a GNSS signal.

A time synchronization system according to one aspect of the present invention includes a reference time obtaining unit configured to obtain, based on a radio signal from a global navigation satellite system, a first timing signal and time information corresponding to timing indicated by the first timing signal, a modulator, connected to a line branched into a plurality of branches, configured to generate a modulated signal containing corresponding time information in synchronization with the first timing signal and to send the modulated signal over the line, at least one demodulator, connected to any branch of the line, configured to demodulate the modulated signal propagating over the line, and at least one transmitter configured to transmit a first radio signal compatible with the radio signal from the global navigation satellite system based on a second timing signal and the time information obtained through demodulation by any demodulator.

Preferably, the first timing signal is periodically output, the modulator is configured to send the modulated signal over the line at a timing determined from a time point of output of the first timing signal, as a reference, and the modulated signal contains a synchronization word in addition to the time information.

Preferably, the demodulator is configured to output, when it detects the synchronization word contained in the modulated signal propagating over the line, information following the detected synchronization word as demodulated data and to output the second timing signal at a timing determined from a time point preceding a time point of detection of the synchronization word by predetermined correction time, as a reference.

Preferably, the time synchronization system further includes a calibration apparatus configured to obtain a third timing signal substantially identical to the first timing signal obtained by the reference time obtaining unit and to determine the correction time by measuring a time interval between the third timing signal and the second timing signal output from the demodulator.

Preferably, the transmitter is configured to transmit the first radio signal with a period longer than a period of the second timing signal output from the demodulator.

Preferably, the first radio signal supports at least one of a first format containing information on a week elapsed since a prescribed reference day and total seconds from the beginning of a week and a second format containing information on Christian year, month, day, hour, minute, and second.

Preferably, the first radio signal is configured as a frame consisting of a plurality of words, a head of the plurality of words which make up the frame is associated with a time point of start of a transmission period, and a first word in the frame is fixed to a predetermined value.

Preferably, the time synchronization system further includes a receiver configured to demodulate the first radio signal from the transmitter to obtain a fourth timing signal and time information corresponding to timing indicated by the fourth timing signal, and the receiver includes circuitry which performs convolution operation processing a plurality of times on the first word.

Preferably, the transmitter is configured to transmit a second radio signal replacing the radio signal from the global navigation satellite system while the first radio signal is not transmitted.

Preferably, the line includes at least any of a signal line of a common antenna system, a cable television signal line, and a signal line for communication.

Preferably, the first radio signal includes a message of a prescribed length calculated based on the time information obtained by the reference time obtaining unit.

Further preferably, the message of the prescribed length is calculated in accordance with a cryptographic hash function with a secret key and the time information being defined as input.

A time synchronization system according to one aspect of the present invention includes a reference time obtaining unit configured to obtain, based on a radio signal from a global navigation satellite system, a first timing signal and time information corresponding to timing indicated by the first timing signal, and a modulator, connected to a line branched into a plurality of branches, configured to generate a modulated signal containing corresponding time information in synchronization with the first timing signal and to send the modulated signal over the line. At least one terminal for connection of a demodulator configured to demodulate the modulated signal propagating over the line is provided at a branch of the line.

A transmission apparatus according to one aspect of the present invention includes a demodulator, connected to any position in a line branched into a plurality of branches, configured to demodulate a modulated signal propagating over the line. The modulated signal is generated based on a first timing signal defined as a reference and time information corresponding to timing indicated by the first timing signal, and sent over the line in synchronization with the first timing signal. The transmission apparatus includes a transmitter configured to transmit a radio signal compatible with a radio signal from a global navigation satellite system based on a second timing signal and the time information obtained through demodulation by the demodulator.

A transmission apparatus according to one aspect of the present invention includes a receiver configured to receive a first timing signal generated based on a first radio signal from a global navigation satellite system and a transmitter configured to transmit a second radio signal compatible with the radio signal from the global navigation satellite system based on a signal and time information received by the receiver. The second radio signal includes a position, time, a timing signal, and authentication information.

According to one embodiment of the present invention, a system capable of achieving time synchronization among a plurality of apparatuses provided at positions where they are unable to receive a GNSS signal can be provided.

BRIEF DESCRIPTION OF DRAWINGS

FIG. 2 is a schematic diagram showing one example of the mobile communication system including the time synchronization system according to the present embodiment.

FIG. 11 is a diagram showing one example of a message type (MT) of a signal transmitted from the S3 transmitter included in the time synchronization system according to the present embodiment.

FIG. 13 is a diagram showing another example of a message type (MT) of a signal transmitted from the S3 transmitter included in the time synchronization system according to the present embodiment.

FIG. 16 is a diagram showing yet another example of a message type (MT) of a signal transmitted from the S3 transmitter included in the time synchronization system according to the present embodiment.

FIG. 19 is a diagram showing yet another example of a message type (MT) of a signal transmitted from the S3 transmitter included in the time synchronization system according to the present embodiment.

FIG. 31 is a diagram showing one example of a data output format of an IMES-TAS signal in the time synchronization system according to the present embodiment.

FIG. 32 is a diagram showing one example of a data output format of an IMES-TAS signal in the time synchronization system according to the present embodiment.

FIG. 33 is a diagram showing one example of a data output format of an IMES-TAS signal in the time synchronization system according to the present embodiment.

FIG. 34 is a diagram showing one example of a data output format of an IMES-TAS signal in the time synchronization system according to the present embodiment.

FIG. 35 is a diagram showing one example of a data output format of an IMES-TAS signal in the time synchronization system according to the present embodiment.

FIG. 36 is a diagram showing one example of a data output format of an IMES-TAS signal in the time synchronization system according to the present embodiment.

FIG. 37 is a diagram showing one example of a data output format of an IMES-TAS signal in the time synchronization system according to the present embodiment.

FIG. 38 is a diagram showing one example of a data output format of an IMES-TAS signal in the time synchronization system according to the present embodiment.

FIG. 39 is a diagram showing one example of a data output format of an IMES-TAS signal in the time synchronization system according to the present embodiment.

FIG. 40 is a diagram showing one example of a data output format of an IMES-TAS signal in the time synchronization system according to the present embodiment.

DETAILED DESCRIPTION

Figure 1:
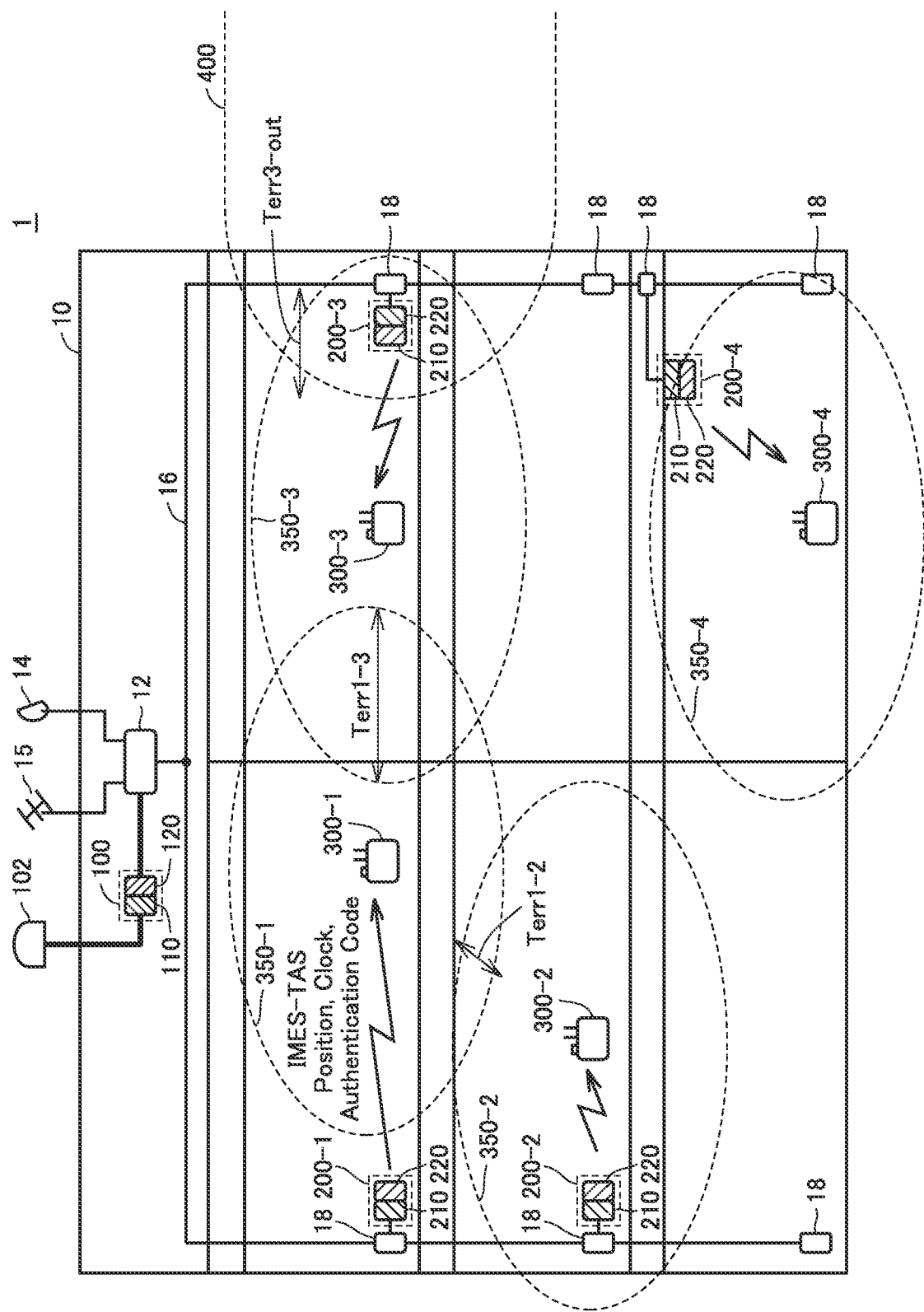
FIG. 1 is a schematic diagram showing one example of a mobile communication system including a time synchronization system according to the present embodiment.

An embodiment of the present invention will be described in detail with reference to the drawings. The same or corresponding elements in the drawings have the same reference characters allotted and description thereof will not be repeated.

A. System Overview

Overview of a time synchronization system according to the present embodiment will initially be described. Though a configuration in an example of application to time synchronization in a mobile communication system including a base station such as a femtocell is described below as a typical application of the time synchronization system according to the present embodiment, the time synchronization system is applicable to any apparatus or system without being limited to the described configuration.

a1: First Implementation Example

Figure 2:
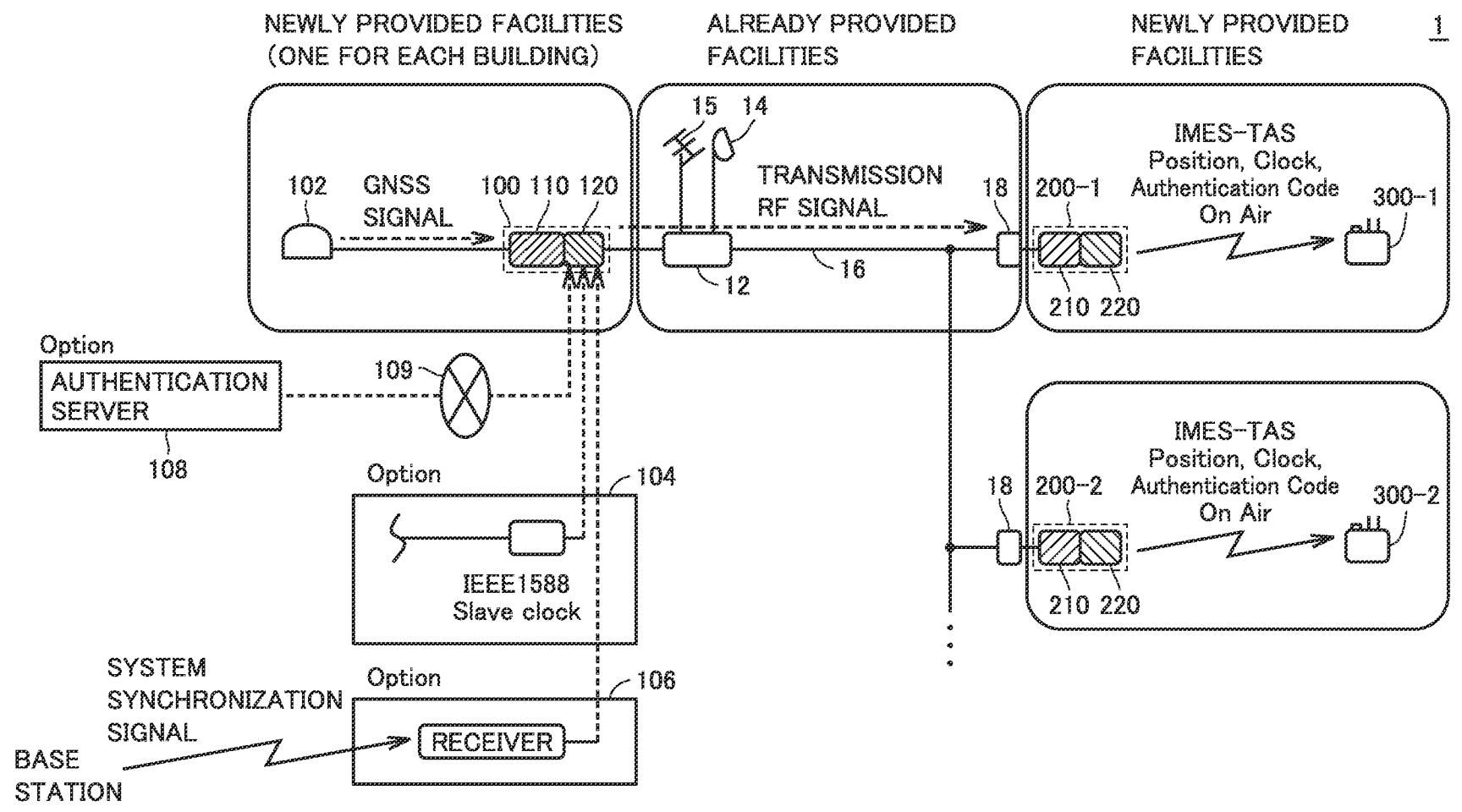
Figure 3:
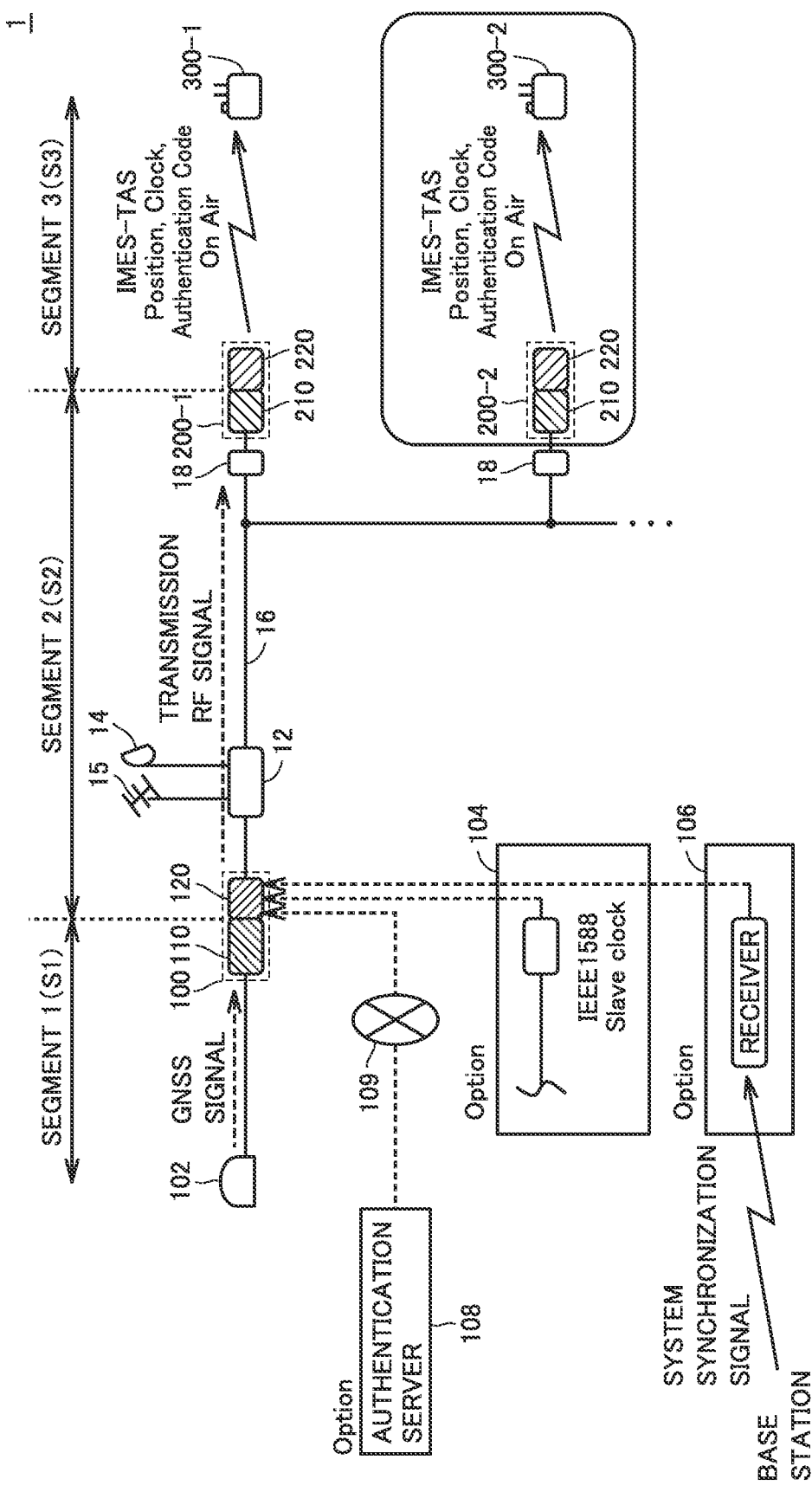
FIG. 3 is a schematic diagram showing one example of the mobile communication system including the time synchronization system according to the present embodiment.

FIGS. 1 to 3 are each a schematic diagram showing one example of a mobile communication system 1 including the time synchronization system according to the present embodiment. Mobile communication system 1 shown in FIGS. 1 to 3 is configured by way of example by newly providing a plurality of base stations 300-1, 300-2, . . . (which may also collectively be referred to as a "base station 300" below) in an already provided building 10. Typically, base station 300 is provided for each room in building 10.

Base station 300 is assumed to include a receiver which can achieve system synchronization by receiving a GNSS signal. The time synchronization system achieves system synchronization in the mobile communication system including base station 300 by providing a simulated signal which complements the GNSS signal to base station 300. In the present embodiment, by way of example, an alternative signal suitable for time synchronization based on a simulated signal for complementing the GNSS signal referred to as a known "indoor messaging system (IMES) signal" is used (for the IMES signal, see "IMES User Interface Specifications (IS-IMES)," Japan Aerospace Exploration Agency, October 2016 and the like).

In the description below, a signal for system synchronization provided to base station 300 is also denoted as "indoor messaging system-timing sync (IMES-TS)" or an "IMES-TS signal."

The IMES-TS signal typically includes a position (Position), time (Clock), and a timing signal (Timing). Details of such information will be described later. The IMES-TS signal may further include an authentication code (Authentication Code). The authentication code is typically used for ensuring integrity or authenticity of received information on a position or time. Details of such an authentication code will also be described later.

An IMES-TS signal further including an authentication code is also denoted as "indoor messaging system-timing authentication sync (IMES-TAS)" or an "IMES-TAS signal." Such an IMES-TAS signal may be provided, for example, to a mobile terminal such as a smartphone or a portable telephone.

Though an IMES-TAS signal will be described for the sake of convenience of description, the description is obviously applicable also similarly to an IMES-TS signal obtained by excluding an authentication code from an IMES-TAS signal.

Though the time synchronization system having backward compatibility and upward compatibility with existing IMES is exemplified in the present embodiment, adoption of such an IMES-based signal is for the sake of convenience and any signal format can be adopted. The technical scope of the present invention is not limited to the technology relating to known IMES but should be determined based on the terms of the claims.

In mobile communication system 1, transmission units 200-1, 200-2, . . . for supplying IMES-TAS signals (which may also collectively be referred to as a "transmission unit 200" below) are provided at positions at which respective base stations 300-1, 300-2, . . . are able to receive IMES-TAS signals. A reference unit 100 supplied with a signal (which is also referred to as a "transmission radio frequency (RF) signal" below) for generating an IMES-TAS signal is provided for transmission units 200. In mobile communication system 1 shown in FIG. 1, a configuration in which one reference unit 100 is provided for each already provided building 10 is assumed. Transmission units 200-1, 200-2, . . . generate IMES-TAS signals based on a transmission RF signal provided from reference unit 100, and base stations 300-1, 300-2, . . . can determine current time by receiving the IMES-TAS signals.

An IMES-TAS signal from transmission unit 200 to base station 300 is assumed to be transmitted wirelessly. Though a transmission RF signal may wirelessly be transmitted from reference unit 100 to transmission unit 200, wired transmission is basically assumed.

By way of example, when it is assumed that a plurality of base stations 300 are newly provided in already provided building 10, a new signal line may be laid in building 10 or an already provided cable in already provided building 10 may be used. A telephone line, a communication line, a power line, and an antenna line can be used as such an already provided cable. In addition, a conductor (a metal wire) or an optical fiber may be adopted as a medium for transmission of a signal.

In the present embodiment, an example in which a common antenna system provided in building 10 is used is assumed by way of example. In this case, an antenna line 16 which makes up the common antenna system is used. Antenna line 16 is laid all over building 10 from a mixing amplifier 12, and one terminal 18 or a plurality of terminals 18 for connection to a television apparatus is/are provided on a path of antenna line 16. For example, terminal 18 may be provided for each room.

As described above, transmission unit 200 receives a first timing signal generated based on a first radio signal from a global navigation satellite system. Then, transmission unit 200 transmits a second radio signal (an IMES-TS signal/an IMES-TAS signal) compatible with the radio signal from the global navigation satellite system based on a signal received by a receiver and time information. The IMES-TAS signal includes a position, time, a timing signal, and authentication information.

Reference unit 100 is electrically connected to antenna line 16 with mixing amplifier 12 being interposed. Each transmission unit 200 is electrically connected to reference unit 100 with any terminal 18 being interposed. Namely, a transmission RF signal output from reference unit 100 is provided to each transmission unit 200 through mixing amplifier 12 and antenna line 16, and each transmission unit 200 generates an IMES-TAS signal based on the transmission RF signal from reference unit 100 and transmits the IMES-TAS signal to base station 300. At least one terminal 18 for connection of transmission unit 200 which demodulates the transmission RF signal propagating over antenna line 16 is provided at a branch of antenna line 16. By adopting such a configuration, system synchronization in the mobile communication system including base station 300 can be achieved.

In the time synchronization system according to the present embodiment, processing and functions are hierarchically configured and each level of the processing and the function is also referred to as a "segment". More specifically, as shown in FIG. 3, processing and a function to obtain necessary information from a GNSS signal or the like are referred to as a "segment 1" or "S1". Processing and a function to transmit information necessary for generation of an IMES-TAS signal or an IMES-TS signal are referred to as a "segment 2" or "S2". Processing and a function involved with generation and transmission of an IMES-TAS signal or an IMES-TS signal are referred to as a "segment 3" or "S3".

In the description below, in order to show to which segment a function belongs, description will be given with such a denotation as "S1", "S2", or "S3" being added.

Reference unit 100 includes a GNSS receiver 110 for processing a GNSS signal received through a GNSS antenna 102 and an S2 modulator 120 (S2TX) which generates a transmission RF signal for generating an IMES-TAS signal. Though a configuration example in which GNSS receiver 110 and S2 modulator 120 are mounted on reference unit 100 is shown, each apparatus may independently be mounted. Details of GNSS receiver 110 and S2 modulator 120 will be described later.

Typically, reference unit 100 obtains information serving as a reference for time synchronization based on a GNSS signal. Information serving as the reference for time synchronization, however, is not limited to the GNSS signal but other information may be used.

Reference unit 100 may provide a secret key for generating an authentication code to transmission unit 200. In this case, reference unit 100 may receive a secret key issued by any authentication server 108 and transmit a transmission RF signal including the secret key to transmission unit 200. A secret key unique among a plurality of transmission units 200 is preferably employed as the secret key. Therefore, reference unit 100 may incorporate into the transmission RF signal, the secret key directed to one transmission unit 200 and identification information indicating a destination of the secret key as being combined.

Authentication server 108 and reference unit 100 may be configured to be able to communicate with each other through a network 109 such as the Internet or a private network.

Transmission unit 200 generates an authentication code based on time information provided by reference unit 100. The authentication code corresponds to a message of a prescribed length calculated based on time information obtained by GNSS receiver 100 functioning as a reference time obtaining unit. For example, a time-based one-time password (TOTP) dependent on a current value of time can be used as such an authentication code. The authentication code is also referred to as a "TOTP" below. By transmitting such a TOTP as being combined with information on a position and time, a position can be authenticated.

Transmission unit 200 includes an S2 demodulator 210 (S2RX) which demodulates a transmission RF signal transmitted from S2 modulator 120 and an S3 transmitter 220 (S3TX) which generates an IMES-TAS signal from a result of demodulation by S2 demodulator 210. Though a configuration example in which S2 demodulator 210 and S3 transmitter 220 are mounted on transmission unit 200 is shown, each apparatus may independently be mounted. Details of S2 demodulator 210 and S3 transmitter 220 will be described later.

Figure 4:
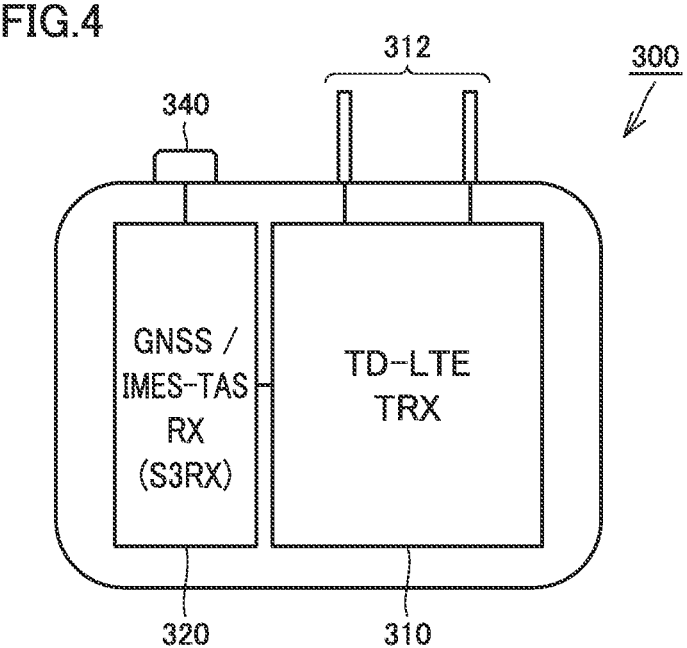
FIG. 4 is a schematic diagram showing an exemplary configuration of a base station included in the mobile communication system according to the present embodiment.

FIG. 4 is a schematic diagram showing an exemplary configuration of base station 300 included in mobile communication system 1 according to the present embodiment. Referring to FIG. 4, base station 300 includes a radio transmission and receiver 310 which exchanges a radio signal with a mobile terminal within a cell area and an S3 receiver 320 (S3RX) which receives a GNSS signal and an IMES-TAS signal.

An antenna 340 used for transmission and reception of a radio signal to and from a mobile terminal is connected to radio transmission and receiver 310, and an antenna 312 for receiving a GNSS signal or an IMES-TAS signal is connected to S3 receiver 320. Base station 300 may be configured to support any communication scheme. By way of example, when base station 300 supports time division long term evolution (TD-LTE), a configuration for exchanging data with a mobile terminal in time division multiple access is adopted also for radio transmission and receiver 310. Base station 300 may be configured to support also frequency division duplex long term evolution (FDD-LTE) in addition to TD-LTE. Since the configuration of radio transmission and receiver 310 has been known, detailed description thereof will not be provided. Details of S3 receiver 320 will be described alter.

As described above, according to the present embodiment, mobile communication system 1 can be implemented by making maximum use of already provided facilities. When base station 300 is provided by using already provided facilities, as shown in FIG. 2, it is only necessary to newly provide reference unit 100 and one transmission unit 200 or a plurality of transmission units 200. A plurality of base stations 300 may make use of an IMES-TAS signal transmitted from identical transmission unit 200. Therefore, transmission units 200 as many as newly provided base stations 300 do not have to newly be provided.

Thus, when base station 300 such as a micro base station should newly be provided, it can be implemented with lower cost by making use of the time synchronization system according to the present embodiment.

a2: Second Implementation Example

Though FIGS. 1 and 2 described above show an example in which reference unit 100 is provided for each building 10, a configuration in which single reference unit 100 is shared among a plurality of buildings 10 may be adopted. A configuration capable of achieving reduction in number of reference units 100 as compared with mobile communication system 1 shown in FIGS. 1 and 2 is exemplified below.

Figure 5:
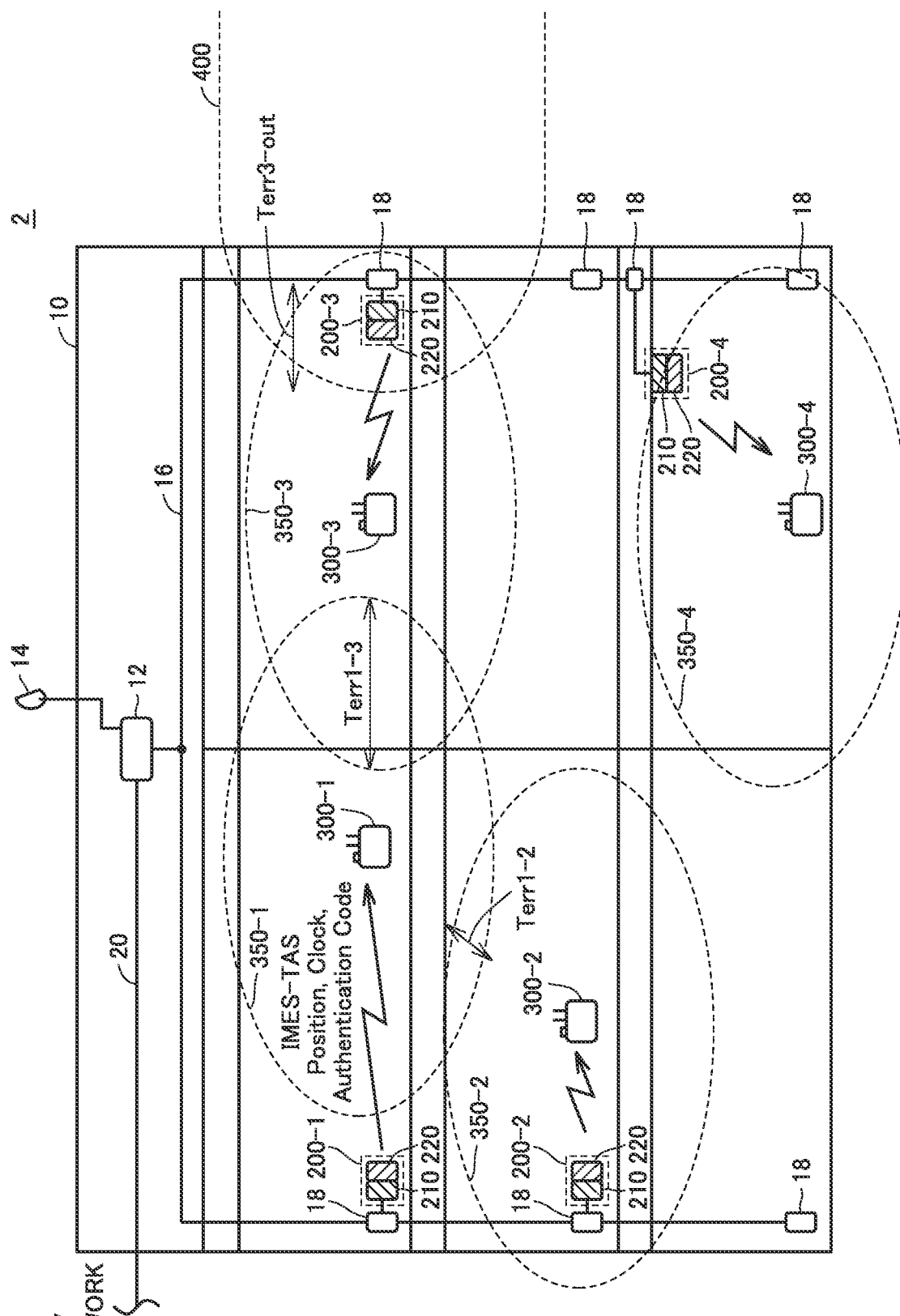
FIG. 5 is a schematic diagram showing one example of a mobile communication system including the time synchronization system according to the present embodiment.
Figure 6:
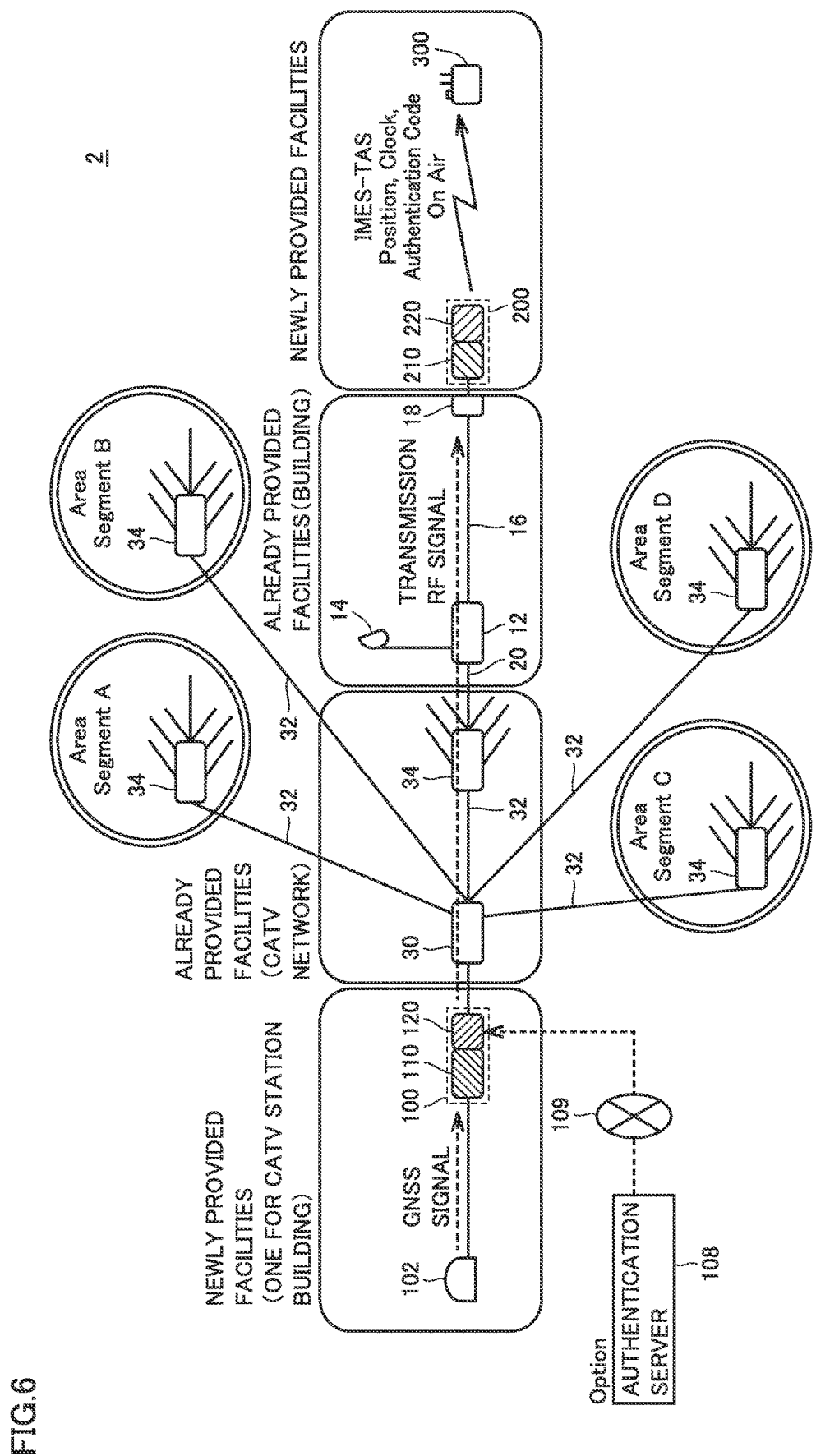
FIG. 6 is a schematic diagram showing one example of the mobile communication system including the time synchronization system according to the present embodiment.

FIGS. 5 and 6 are each a schematic diagram showing one example of a mobile communication system 2 including the time synchronization system according to the present embodiment. Mobile communication system 2 shown in FIGS. 5 and 6 is configured by newly providing a plurality of base stations 300-1, 300-2, . . . in already provided building 10, similarly to mobile communication system 1 shown in FIGS. 1 to 3.

It is assumed that cable television (CATV) has been introduced in already provided building 10. Namely, it is assumed that a lead-in wire 20 of a CATV network is connected to mixing amplifier 12. In such a configuration, an IMES-TAS signal can be made use of in a plurality of buildings 10 by providing reference unit 100 somewhere in the CATV network and transmitting a transmission RF signal through the CATV network.

In a specific configuration, as shown in FIG. 5, transmission lines 32 which make up a plurality of CATV networks are connected to a head end 30 of a CATV broadcast station, and a reception splitter 34 is connected to transmission lines 32. Reception splitter 34 demodulates and distributes a signal from the CATV broadcast station and transmits the signal to the plurality of buildings through a plurality of lead-in wires 20.

In general, a coaxial cable or an optical cable is employed for transmission line 32. The time synchronization system according to the present embodiment is applicable without being restricted by a type of transmission line 32.

As described above, according to the present embodiment, a large number of mobile communication systems 2 can be implemented with lower cost by making maximum use of already provided facilities. When base station 300 is provided by making use of already provided facilities, as shown in FIG. 6, already provided building 10, inclusive of lead-in wires 20 of the already provided CATV network, does not have to be modified. It is only necessary to provide reference unit 100 in the already provided CATV network and to provide one transmission unit 200 or a plurality of transmission units 200 at necessary location(s) by using already provided antenna line 16 and terminal 18. A plurality of base stations 300 may make use of an IMES-TAS signal transmitted from identical transmission unit 200. Therefore, transmission units 200 as many as newly provided base stations 300 do not have to newly be provided.

Thus, even though base station 300 such as a micro base station should newly be provided, system synchronization among all base stations 300 can be achieved by making use of already provided facilities such as a CATV network and by providing reference unit 100 in a CATV broadcast station or the like in addition to a necessary number of transmission units 200. Therefore, even though a large number of base stations 300 are provided, introduction cost can be suppressed and widespread use can be achieved.

Without being limited to the CATV network, when a transmission line through which some signal can be transmitted to and received from a plurality of buildings is provided, the time synchronization system according to the present embodiment can be implemented also by making use of such a transmission line. For example, an emergency communication network in a local area may be made use of.

a3: Accuracy in System Synchronization

Referring to FIGS. 1 and 5, system synchronization may include suppression of deviation in timing between cell areas provided by base stations 300 to a predetermined upper limit value or lower. For example, cell areas 350-1, 350-2, 350-3, and 350-4 provided by base stations 300-1, 300-2, 300-3, and 300-4, respectively are assumed. In the example shown in FIGS. 1 and 5, cell area 350-1 and cell area 350-2 overlap each other. By using the time synchronization system according to the present embodiment, timing deviation Terr1-2 between overlapping cell areas can be suppressed, for example, to ±500 nanoseconds or shorter. Similarly, timing deviation Terr1-3 between cell area 350-1 and cell area 350-3 can also be maintained at similar accuracy. Timing deviation Terr3-out between a cell area 400 provided by a common base station (not shown) and cell area 350-3 provided by base station 300-3 can also be maintained at similar accuracy. With regard to such accuracy, in mobile communication system 1 shown in FIGS. 1 to 3, deviation in timing between reference unit 100 and transmission unit 200 can be suppressed to ±500 nanoseconds or shorter.

a4: Summary

As described above, in the time synchronization system according to the present embodiment, a transmission RF signal based on reference time managed by reference unit 100 is distributed to a plurality of terminals 18 as being superimposed on a transmission line. Transmission unit 200 connected to each of terminals 18 receives the distributed transmission RF signal and wirelessly transmits an IMES-TAS signal compatible with a GNSS signal to base station 300 capable of receiving the GNSS signal. Base station 300 achieves system synchronization based on the IMES-TAS signal.

In the time synchronization system according to the present embodiment, an IMES-TAS signal is generated and supplied by transmission unit 200 provided in the vicinity of base station 300. Therefore, restrictions involved with a transmission path from reference unit 100 to transmission unit 200 can be less. Therefore, already provided facilities can be made use of, and even though a large number of base stations 300 should be provided, cost therefor can be reduced.

a5: Service that can be Provided

The time synchronization system according to the present embodiment can provide service as below.

(1) Providing Global Navigation Service Indoors

Global navigation service compatible with the GNSS and hierarchical information can be provided even indoors where a GNSS signal from a GNSS (GPS or quasi-zenith satellite system (QZSS)) is not successfully received.

(2) Providing Time Information in Synchronization with GNSS

Information on Christian year, month, day, hour, minute, and second in synchronization with the GNSS can be provided. A leap year or a leap second are also taken into consideration.

(3) Providing Timing Source in Synchronization with GNSS

A timing signal (for example, a one-second pulsed signal/a 1-PPS signal) in synchronization with the GNSS (GPS or QZSS) can be provided.

(4) Providing Frequency Source in Synchronization with GNSS

A frequency source (clock) which can be made use of for comparison and calibration with the GNSS (GPS or QZSS) can be provided.

(5) Providing Authentication Service Making Use of Position and Time

Authentication service (for example, a TOTP which will be described later) for proving "when" and "where" can be provided. In cloud service or e-commerce service, restrictions on "when" and "where" in addition to user authentication for proving "who" can be controlled. Such authentication service can advantageously function, for example, as geofence for cloud service.

(6) Providing Complex ID Information

Complex ID information which can be used for giving a message or issuing a ticket can be broadcast from an IMES-S3 transmitter connected to a network to a mobile terminal.

(7) Indoor Distribution or Indoor Broadcast of Disaster Message

A function to receive a disaster message broadcast by the QZSS or the like and to distribute or broadcast the disaster message to an indoor mobile terminal is provided. More specifically, reference unit 100 performs a function to receive a disaster message broadcast from the QZSS and a function to generate a message in conformity with an IMES message format. By adopting such a configuration, even a mobile terminal located at a position where it is unable to receive a radio signal from the QZSS (for example, indoors or in a house) can receive a disaster message and gives the disaster message to a user. With such a function, an indoor emergency system can be implemented.

Details of each apparatus included in a mobile communication system including the time synchronization system according to the present embodiment will be described below.

B. Obtaining Reference Time by Reference Unit 100

Reference unit 100 obtains time serving as the reference in the time synchronization system according to the present embodiment. Any method is possible as a method of obtaining time. In the time synchronization system according to the present embodiment, a GNSS signal or a precision time protocol (PTP) technique is employed.

When a GNSS signal is employed, GNSS receiver 110 is mounted on reference unit 100. GNSS receiver 110 receives a GNSS signal and obtains various types of information including at least time information.

Any GNSS signal can be adopted as a GNSS signal for GNSS receiver 110 to obtain reference time. Representatively, the GPS, the global navigation satellite system (GLO- NASS), the satellite-based augmentation system (SBAS), the BeiDou navigation satellite system, the Galileo, and the quasi-zenith satellite system (QZSS) are known as the GNSS. Any GNSS signal which can be received at a position where reference unit 100 is provided can be made use of.

A general-purpose apparatus can be adopted for GNSS receiver 110 for receiving a GNSS signal. GNSS receiver 110 performs PVT (position, velocity, and time) operation based on a received GNSS signal. GNSS receiver 110 outputs information such as position information, time information, and a frequency signal obtained by such PVT operation and a timing signal (a 1-PPS signal in an example of the GPS).

Thus, GNSS receiver 110 functions as a reference time obtaining unit configured to obtain, based on a radio signal (GNSS signal) from the GNSS, a timing signal (for example, a 1-PPS signal) and time information corresponding to timing indicated by the timing signal.

Instead of or in addition to the GNSS signal, a reference for time synchronization may be obtained by using the PTP technique. A slave clock 104 in accordance with a protocol defined under Institute of Electrical and Electronic Engineers (IEEE) 1588 (PTP) or IEEE 1588v2 (PTPv2) may be adopted as a typical example of the PTP technique (see FIGS. 2 and 3). Slave clock 104 is in time synchronization with a not-shown grand master clock, and provides information serving as the reference for time synchronization to S2 modulator 120. When a clock in synchronization with slave clock 104 is further connected, slave clock 104 may be mounted as a grand slave clock. Slave clock 104 may be provided as a backup in case of failure in reception of a GNSS signal by GNSS receiver 110.

Instead of or in addition to the GNSS signal, a reference for time synchronization may be obtained from a system synchronization signal transmitted from a base station of the mobile communication system. When this configuration is adopted, for example, a receiver 106 for receiving a system synchronization signal may be employed. Receiver 106 may include circuitry which calculates time from a decoded system synchronization signal, in addition to circuitry for receiving a radio signal and circuitry for demodulating a radio signal the same as those mounted on a mobile terminal. By adopting such a receiver 106, information serving as the reference for time synchronization can be provided to S2 modulator 120.

Reference unit 100 can obtain time information, a timing signal, or the like from slave clock 104. When the PTP technique is made use of, position information or the like cannot be obtained. So long as system synchronization is achieved, however, no problem in terms of operation arises even though position information cannot be obtained.

When mobile communication system 2 shown in FIGS. 5 and 6 is implemented, a large number of transmission units 200 make use of a transmission RF signal from reference unit 100. Therefore, high reliability is preferably achieved by enhancing redundancy. To that end, a plurality of GNSS receivers 110 may be mounted on reference unit 100 or reference unit 100 may be provided with GNSS receiver 110 and slave clock 104 together.

C. S2 Modulator 120 of Reference Unit 100 and Transmission RF Signal Processing for generating a transmission RF signal in S2 modulator 120 of reference unit 100 will now be described.

S2 modulator 120 generates a transmission RF signal by modulating various types of information such as time information included in a GNSS signal received by GNSS receiver 110. S2 modulator 120 generates a transmission RF signal in synchronization with a timing signal (1-PPS signal). The transmission RF signal is superimposed on an already provided common antenna system and/or an already provided CATV network. As described above, the transmission RF signal superimposed on the common antenna system or the CATV network is transmitted to all premises connected to the common antenna system.

Thus, S2 modulator 120 functions as a modulator connected to a line branched into a plurality of branches and configured to generate a modulated signal (transmission RF signal) including corresponding time information in synchronization with the timing signal (1-PPS signal) and to send the modulated signal over the line. Any of a conductor (metal wire) and an optical fiber may be adopted as the line over which the transmission RF signal is sent. For example, at least any of a signal line of the common antenna system, a CATV signal line, and a signal line for communication (a telephone, a digital subscriber line (DSL), and fiber to the home (FTTH)) can be used for such a line.

An audio and video signal is generally transmitted through one frequency channel or a plurality of frequency channels to the already provided common antenna system and the already provided CATV network. Therefore, in superimposing a transmission RF signal, an idle channel with a sufficient transmission band should be made use of. In consideration of such circumstances, in S2 modulator 120, an RF frequency of a generated transmission RF signal is preferably variable in accordance with an idle channel. A width of a frequency occupied by the transmission RF signal is also preferably adapted to the idle channel.

In the time synchronization system according to the present embodiment, by way of example, an input signal output from GNSS receiver 110 is converted to a digital signal by using phase-shift keying (PSK). By way of example of phase-shift keying, binary phase-shift keying (BPSK) modulation may be adopted.

Figure 7:
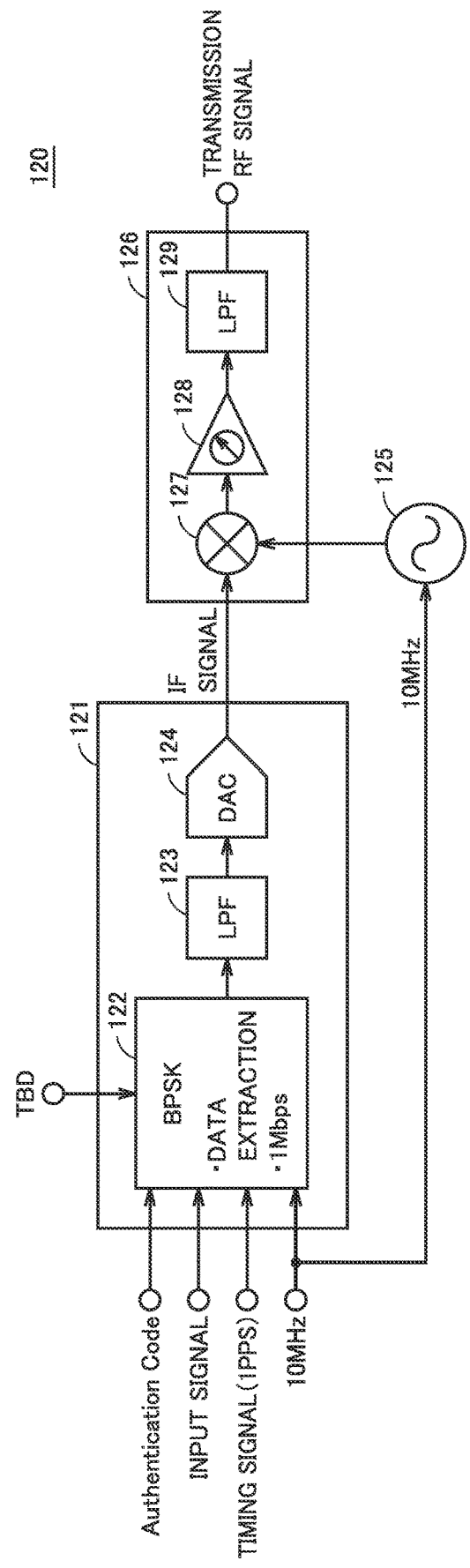
FIG. 7 is a block diagram showing an exemplary circuitry configuration of an S2 modulator included in the time synchronization system according to the present embodiment.

FIG. 7 is a block diagram showing an exemplary circuitry configuration of S2 modulator 120 included in the time synchronization system according to the present embodiment. Referring to FIG. 7, S2 modulator 120 includes intermediate frequency (IF) signal generation circuitry 121, a carrier oscillator 125, and up-conversion circuitry 126.

IF signal generation circuitry 121 outputs an IF signal resulting from processing of an input signal from GNSS receiver 110 and BPSK modulation. The input signal contains time information and a telemetry signal. A synchronization word (which is also referred to as a "SYNC word" below) is added to each set of time information and the telemetry signal to thereby facilitate demodulation processing by S2 demodulator 210 of transmission unit 200 as will be described later.

More specifically, IF signal generation circuitry 121 includes a modulation circuitry 122, a low pass filter (LPF) 123, and a digital analog converter (DAC) 124.

Modulation circuitry 122 generates a modulated signal by extracting the time information and the telemetry signal from information included in the input signal from GNSS receiver 110 based on the timing signal from GNSS receiver 110, adding a SYNC word thereto, and subjecting the same to NRZ-BPSK modulation. When an IMES-TAS signal contains an authentication code, the authentication code is input to modulation circuitry 122 so that a modulated signal including the authentication code is generated.

A band of a signal subjected to NRZ-BPSK modulation is restricted by a finite impulse response (FIR) filter. For example, upon receiving an input at a frequency TBD [MHz] in accordance with an idle channel over a transmission path on which a transmission RF signal is superimposed, modulation circuitry 122 outputs a modulated signal having a central frequency at TBD. In the present embodiment, a bit rate of a modulated signal is assumed as 1 Mbps. A modulation scheme and a bit rate of a modulated signal, however, are not particularly limited to the configuration described above but optimal modulation scheme and bit rate can be selected as appropriate in accordance with required specifications or a system configuration. For example, quadrature phase-shift keying (QPSK) modulation may be employed instead of binary phase-shift keying (BPSK) modulation, or a non return to zero inversion (NRZI) scheme instead of a non return to zero (NRZ) scheme may be employed. With such change in modulation scheme, a bit rate or the like can also be varied as appropriate.

A modulated signal output from modulation circuitry 122 is restricted in band by low pass filter 123, subjected to analog conversion by digital-analog converter 124, and output as an IF signal.

Modulation circuitry 122 or modulation circuitry 122 and peripheral circuitry thereof may perform digital processing by using a field-programmable gate array (FPGA).

Up-conversion circuitry 126 up-converts an IF signal from modulation circuitry 122 with carrier waves (for example, at 10 MHz) from carrier oscillator 125 and outputs the resultant IF signal as a transmission RF signal. Specifically, up-conversion circuitry 126 includes a mixer 127, a variable amplifier 128, and a low pass filter 129. Mixer 127 multiplies an IF signal from modulation circuitry 122 by carrier waves from carrier oscillator 125. A signal output from mixer 127 is output as a transmission RF signal through variable amplifier 128 and low pass filter 129.

Figure 8:
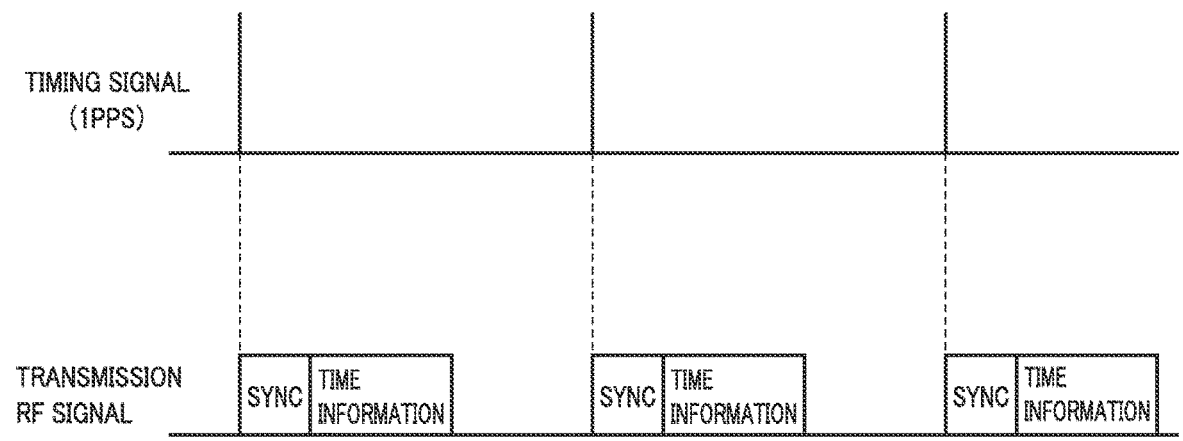
FIG. 8 is a diagram showing an exemplary structure of a transmission RF signal generated by the S2 modulator included in the time synchronization system according to the present embodiment.

FIG. 8 is a diagram showing an exemplary structure of a transmission RF signal generated by S2 modulator 120 included in the time synchronization system according to the present embodiment. Referring to FIG. 8, S2 modulator 120 generates a transmission RF signal in synchronization with a periodically output timing signal (1-PPS signal). Typically, a position of start of a SYNC word included in each transmission RF signal and rise (or fall) of the timing signal match with each other. By adopting such a configuration, S2 demodulator 210 of transmission unit 200 can reproduce a timing signal in addition to time information. The transmission RF signal includes a SYNC word in addition to time information, and the transmission RF signal including the SYNC word is sent over a line at a timing determined from a time point of output of the timing signal, as a reference.

By adopting a circuitry configuration as set forth above, a transmission RF signal including an input signal from GNSS receiver 110 can be generated.

D. S2 Demodulator 210 of Transmission Unit 200

Processing for demodulating a transmission RF signal by S2 demodulator 210 of transmission unit 200 will now be described.

S2 demodulator 210 demodulates a transmission RF signal transmitted through a common antenna system and/or a CATV network and extracts data included in the transmission RF signal.

The time synchronization system according to the present embodiment performs a function to correct transmission delay in transmission RF signal (a delay correction function) dependent on a transmission path from S2 modulator 120 of reference unit 100 to S2 demodulator 210 of transmission unit 200. An amount of correction (correction time) for transmission delay may be set to a fixed value determined in advance or a variable value which is dynamically varied in accordance with a state of a transmission path.

When real common antenna system and CATV network are assumed as a transmission path, a direction of transmission of a transmission RF signal is unidirectional and the transmission RF signal occupies a frequency of a specific idle channel. Therefore, use of certain transmission delay determined in advance is enough. A function to automatically correct delay time as will be described later, however, may be provided.

Figure 9:
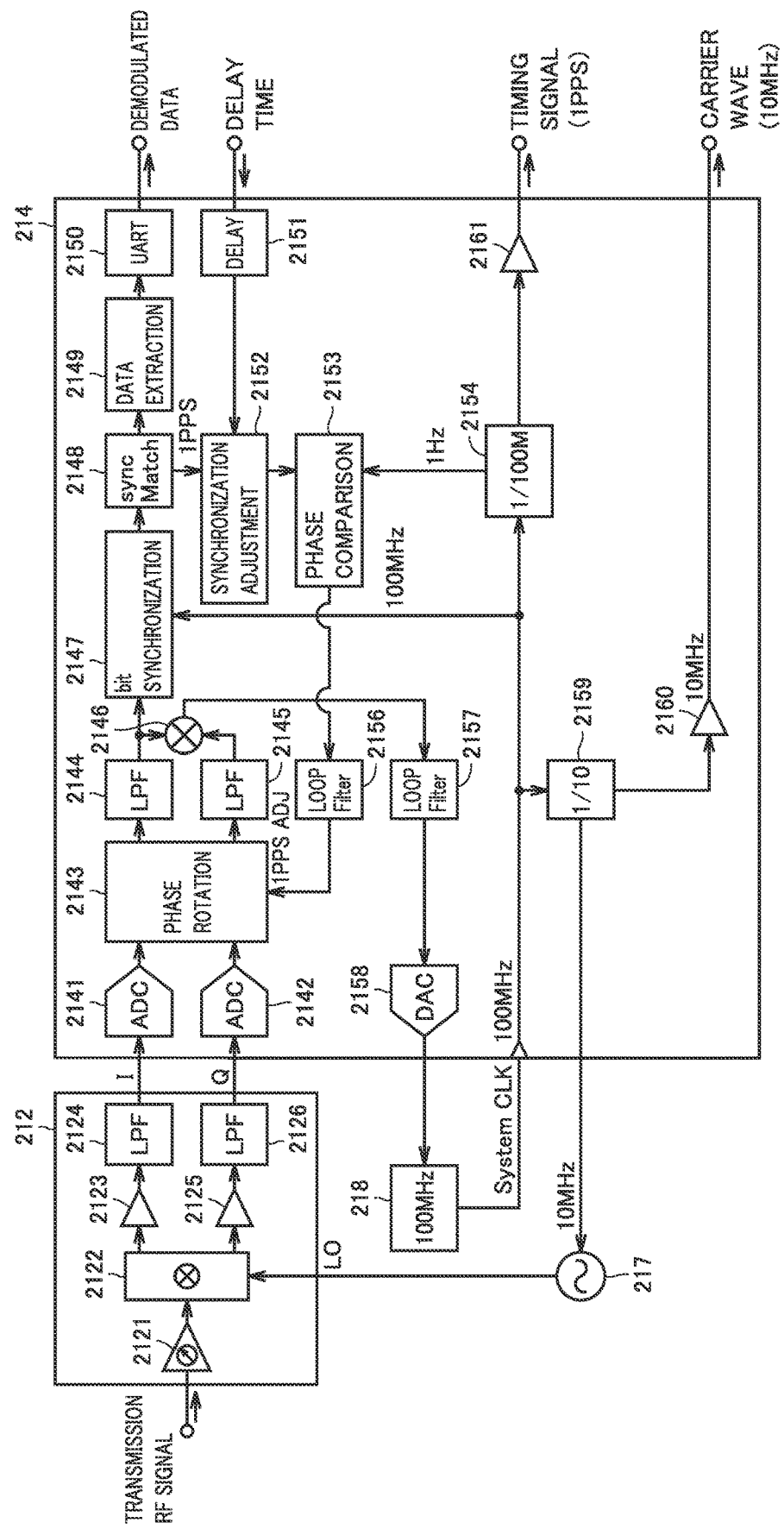
FIG. 9 is a block diagram showing an exemplary circuitry configuration of an S2 demodulator included in the time synchronization system according to the present embodiment.

FIG. 9 is a block diagram showing an exemplary circuitry configuration of S2 demodulator 210 included in the time synchronization system according to the present embodiment. Referring to FIG. 9, S2 demodulator 210 outputs demodulated data in synchronization with a timing signal (1-PPS signal) by converting a transmission RF signal received from S2 modulator 120 into an IF signal, demodulating the IF signal into a digital signal, and detecting a SYNC word included in the demodulated digital signal. Specifically, S2 demodulator 210 includes down-conversion circuitry 212, demodulation circuitry 214, a carrier oscillator 217, and a system oscillator 218.

Down-conversion circuitry 212 down-converts a received transmission RF signal with carrier waves from carrier oscillator 217 and outputs the resultant transmission RF signal as an IF signal (an I component and a Q component). Carrier oscillator 217 generates carrier waves in accordance with a clock obtained by frequency-dividing a loop-controlled system clock from system oscillator 218. Specifically, down-conversion circuitry 212 includes a variable amplifier 2121, a mixer 2122, amplifiers 2123 and 2125, and low pass filters 2124 and 2126.

A transmission RF signal is adjusted in amplitude by variable amplifier 2121 and thereafter multiplied in mixer 2122 by carrier waves from carrier oscillator 217 so that an I component and a Q component as an IF signal are output. The I component of the transmission RF signal output from mixer 2122 is output to demodulation circuitry 214 through amplifier 2123 and low pass filter 2124. Similarly, the Q component of the transmission RF signal output from mixer 2122 is output to demodulation circuitry 214 through amplifier 2125 and low pass filter 2126.

Demodulation circuitry 214 outputs demodulated data by demodulating the IF signal output from down-conversion circuitry 212. Specifically, demodulation circuitry 214 includes analog-digital converters 2141 and 2142, a phase rotator 2143, low pass filters 2144 and 2145, a mixer 2146, a bit synchronization portion 2147, a SYNC sensing portion 2148, a data extraction portion 2149, a serial/parallel conversion portion 2150, a delay correction amount holding portion 2151, a synchronization adjustment portion 2152, a phase comparison portion 2153, frequency dividers 2154 and 2159, loop filters 2156 and 2157, a digital-analog converter 2158, and an amplifier 2160. The entirety or a part of demodulation circuitry 214 may perform digital processing by using an FPGA.

The I component and the Q component from down-conversion circuitry 212 are converted into digital signals by respective analog-digital converters 2141 and 2142 and output to phase rotator 2143. The I component and the Q component are subjected to BPSK demodulation in phase rotator 2143, and a result to demodulation is output to mixer 2146. The result of demodulation of the I component is input to bit synchronization portion 2147 and demodulated to a bit string. SYNC sensing portion 2148 generates a timing signal (1-PPS signal) by sensing a SYNC word included in the bit string output from bit synchronization portion 2147. The timing signal from SYNC sensing portion 2148 is output to synchronization adjustment portion 2152. Data extraction portion 2149 extracts data following the SYNC word sensed by SYNC sensing portion 2148. Finally, data extracted by data extraction portion 2149 is shaped into a prescribed data format in serial/parallel conversion portion 2150 and output as demodulated data. Demodulated data is provided to S3 transmitter 220. Serial/parallel conversion portion 2150 can be implemented, for example, by circuitry such as a universal asynchronous receiver transmitter (UART).

When an IMES-TAS signal contains a secret code, an interface for securely outputting a secret code included in a result of demodulation of a transmission RF signal may further be mounted.

Mixer 2146 forms a part of a loop referred to as a costas loop, and an output from mixer 2146 is fed back to system oscillator 218 through loop filter 2157 and digital-analog converter 2158. System oscillator 218 is an oscillator configured to provide a system clock for demodulation circuitry 214, and it is assumed to generate, for example, a clock at 100 MHz which is a frequency ten times as high as carrier waves (for example, 10 MHz) of a transmission RF signal. System oscillator 218 varies an oscillation frequency in accordance with a feedback signal from digital-analog converter 2158. A voltage controlled crystal oscillator (VCXO) or a temperature compensated crystal oscillator (TCXO) may be adopted as system oscillator 218.

A system clock from system oscillator 218 is frequency-divided into $\frac{1}{10}$ by frequency divider 2159 and reproduced as carrier waves of a received transmission RF signal. Thus, the carrier waves (10 MHz) of the transmission RF signal are output by demodulating a signal subjected to BPSK modulation through the costas loop and reproducing the signal through a carrier reproduction loop.

SYNC sensing portion 2148 reproduces a timing signal (1-PPS signal) by sensing a SYNC word included in a transmission RF signal. The timing signal from SYNC sensing portion 2148 is corrected in transmission delay by synchronization adjustment portion 2152 and compared in phase with a timing signal (1 Hz) generated in demodulation circuitry 214 by system oscillator 218. Namely, a timing signal from synchronization adjustment portion 2152 and a timing signal obtained by frequency division of a system clock by frequency divider 2154 are input to phase comparison portion 2153. A phase difference detected by phase comparison portion 2153 is fed back to phase rotator 2143 through loop filter 2156. As a result of such a loop operation, a phase input to the costas loop is appropriately rotated so that the timing signal (1-PPS signal) and the system clock can be synchronized with each other. For example, a timing signal obtained by frequency division of the system clock by frequency divider 2154 is output as a 1-PPS signal. At this time, the timing signal (1-PPS signal) is output before the timing of sensing of the SYNC word included in the transmission RF signal, in consideration of transmission delay. Namely, the timing signal (1-PPS signal) is output before extraction of data following the SYNC word.

As set forth above, S2 demodulator 210 functions as a demodulator connected to any branch of the line branched into a plurality of branches and configured to demodulate a modulated signal (transmission RF signal) propagating over the line. As shown in FIGS. 1 and 5, basically, a plurality of S2 demodulators 210 are provided for one reference unit 100.

The function to correct transmission delay of a transmission RF signal (a delay correction function) adopted in the time synchronization system according to the present embodiment is mainly performed by delay correction amount holding portion 2151 and synchronization adjustment portion 2152. By setting certain delay time determined in advance in delay correction amount holding portion 2151, a timing signal (1-PPS signal) is corrected by the set time so that transmission delay of the transmission RF signal can be corrected. More specifically, when S2 demodulator 210 detects a SYNC word included in a modulated signal (transmission RF signal) propagating over a line, it outputs information following the detected SYNC word as demodulated data and outputs a timing signal (1-PPS signal) at a timing determined from a time point preceding the time point of detection of the SYNC word by predetermined correction time, as a reference. By applying such a delay correction function, output of the timing signal (1-PPS signal) deviates from output of demodulated data. The 1-PPS signal, however, is high in accuracy in its period. Therefore, by making use of such periodicity, no problem arises in generation and transmission of an IMES-TAS signal.

With the delay correction function of S2 demodulator 210 according to the present embodiment, transmission RF signals processed by transmission units 200 connected to an identical time synchronization system can be maintained in a synchronized state with accuracy of ±500 ns (a target value).

By adopting a configuration as set forth above, S2 demodulator 210 connected to terminal 18 in each premise outputs information such as position information, time information, and a frequency signal and a timing signal (1-PPS signal) through demodulation processing and synchronization tracking processing for a transmission RF signal.

E. S3 Transmitter 220 of Transmission Unit 200

Processing for generating and transmitting an IMES-TAS signal in S3 transmitter 220 of transmission unit 200 will now be described. S3 transmitter 220 generates and transmits an IMES-TAS signal based on demodulated data and a timing signal from S2 demodulator 210. For example, when S3 receiver 320 of base station 300 is adapted to the GPS representing the GNSS, an RF frequency of an IMES-TAS signal is set to 1.57542 GHz. The RF frequency may be varied as appropriate in accordance with restrictions imposed by the radio wave administration at a venue where the present system is operated. When the present system is mounted as a system compatible with a global navigation satellite system other than the GPS, one RF frequency or a plurality of RF frequencies in accordance with the global navigation satellite system of interest may be adopted.

e1: Circuitry Configuration

Figure 10:
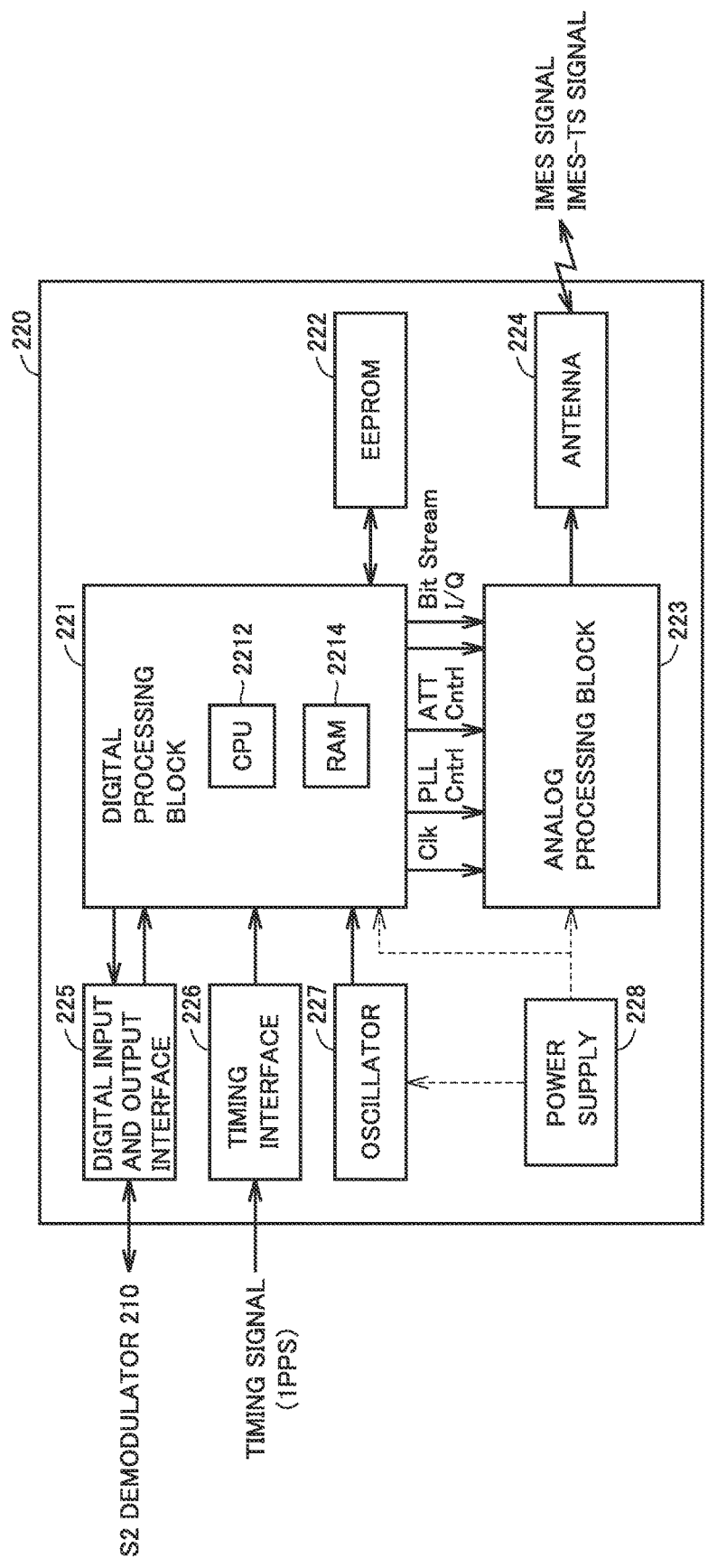
FIG. 10 is a block diagram showing an exemplary circuitry configuration of an S3 transmitter included in the time synchronization system according to the present embodiment.

FIG. 10 is a block diagram showing an exemplary circuitry configuration of S3 transmitter 220 included in the time synchronization system according to the present embodiment. Referring to FIG. 10, S3 transmitter 220 includes a digital processing block 221, an electronically erasable and programmable read only memory (EEPROM) 222, an analog processing block 223, an antenna 224, a digital input and output interface 225, a timing interface 226, an oscillator 227, an analog processing block 223 electrically connected to digital processing block 221, and a power supply 228.

Digital processing block 221 includes a central processing unit (CPU) 2212 and a random access memory (RAM) 2214. EEPROM 222, digital input and output interface 225, timing interface 226, and oscillator 227 are electrically connected to digital processing block 221. Antenna 224 is electrically connected to analog processing block 223.

EEPROM 222 stores a program executed by CPU 2212 of digital processing block 221 and data necessary for generating an IMES signal and an IMES-TAS signal. The program and the necessary data stored in EEPROM 222 are read at the time of start-up of S3 transmitter 220 and transferred to RAM 2214. EEPROM 222 can further store data input from the outside of S3 transmitter 220. A storage for storing the program and the necessary data is not limited to EEPROM 222 and at least a storage capable of saving data in a non-volatile manner is applicable.

Digital processing block 221 receives through digital input and output interface 225, demodulated data (information such as position information, time information, and a frequency signal) obtained from S2 demodulator 210 and receives through timing interface 226, a timing signal (1-PPS signal) obtained from S2 demodulator 210, and generates data which is to be a source of generation of an IMES signal and an IMES-TAS signal. Digital processing block 221 sends the generated data as a bit stream to analog processing block 223.

Oscillator 227 supplies a clock which defines operations by CPU 2212 or a clock for generating carrier waves to digital processing block 221.

Analog processing block 223 generates a transmission signal by modulating the bit stream output from digital processing block 221 with carrier waves at 1.57542 GHz and sends the transmission signal to antenna 224. The signal is sent from antenna 224. The IMES signal and the IMES-TAS signal are thus sent from S3 transmitter 220.

Power supply 228 supplies electric power to each portion which makes up S3 transmitter 220. Power supply 228 may be contained in S3 transmitter 220 as shown in FIG. 10 or may receive supply of electric power from the outside.

Though CPU 2212 is employed as a processor for performing processing in digital processing block 221 in the description above, another processor may be employed. Alternatively, digital processing block 221 may be implemented by an FPGA.

Though a clock (Clk) is supplied from digital processing block 221 to analog processing block 223 in FIG. 10, it may directly be supplied from oscillator 227 to analog processing block 223.

Though digital processing block 221 and analog processing block 223 are separately shown for clarifying the description in the present embodiment, they may be mounted together on a single chip in an implementation.

e2: Message Format: Example of IMES-TS Signal (No. 1)

One example of a message format of an IMES-TS signal emitted from S3 transmitter 220 will now be described. In the time synchronization system according to the present embodiment, by way of example, an IMES-based signal is adopted. Therefore, a signal configuration adopted as an IMES-TS signal is also preferably capable of achieving backward compatibility with an IMES signal. Namely, S3 transmitter 220 functions as a transmitter configured to transmit a radio signal compatible with a radio signal from the GNSS (a GNSS signal) based on a timing signal (1-PPS signal) and time information obtained through demodulation by corresponding S2 demodulator 210.

FIG. 11 is a diagram showing one example of a message type (MT) of a signal transmitted from S3 transmitter 220 included in the time synchronization system according to the present embodiment. Referring to FIG. 11, in addition to four message types (MT0, MT1, MT3, and MT4) defined as known IMES signals, a message format 260A (MT7) may be adopted for an IMES-TS signal. The message shown in FIG. 11 is by way of example and any message format may be made use of so long as it includes information necessary for time synchronization.

By way of example, message format 260A includes information on GPS Nav message compatible GPS week and time of week (TOW), month, day, hour, minute, and second. Details of message format 260A are described.

Figure 12:
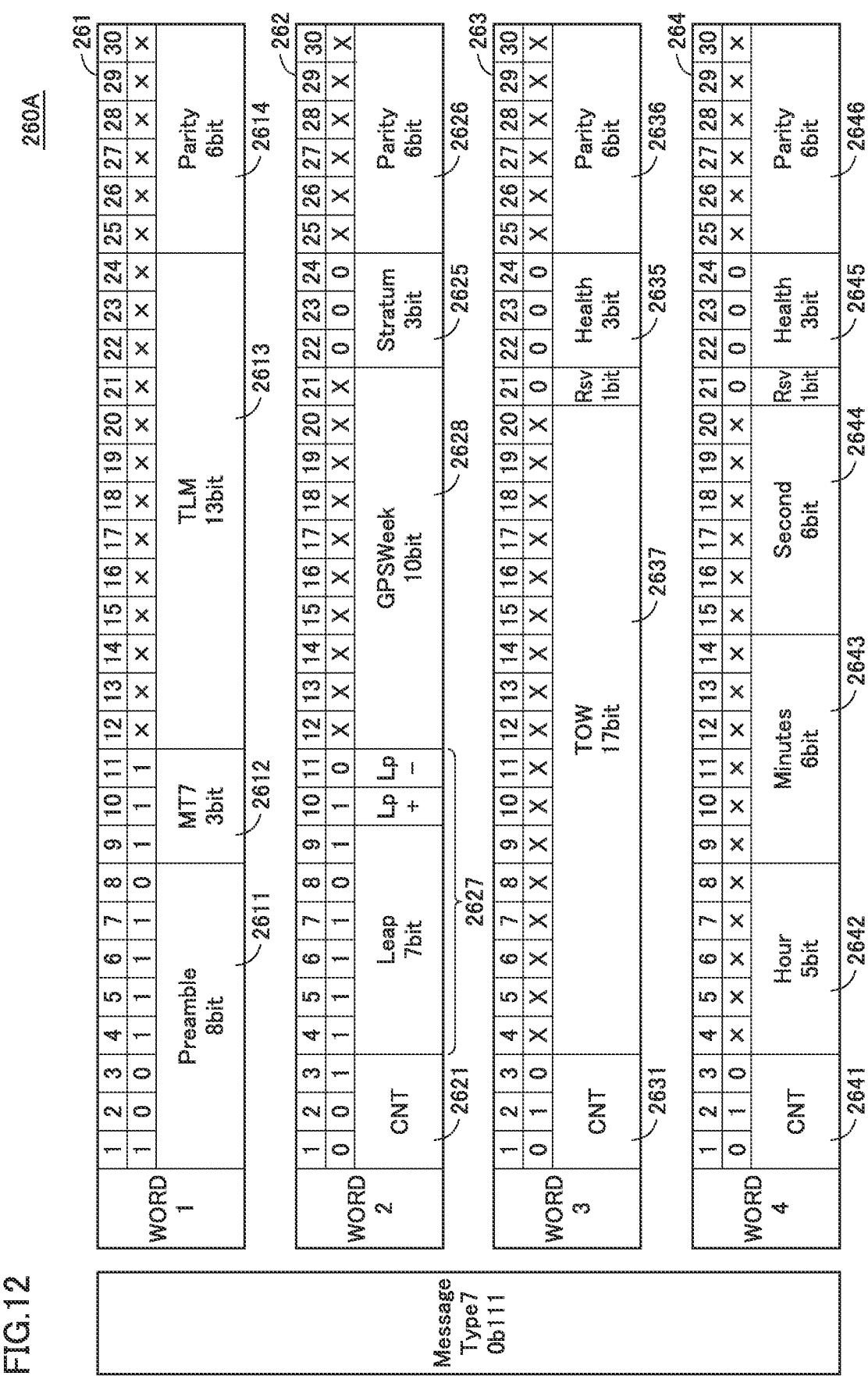
FIG. 12 is a diagram showing one example of a frame structure of a message format used as an IMES-TS signal in the time synchronization system according to the present embodiment.

FIG. 12 is a diagram showing one example of a frame structure of message format 260A used as an IMES-TS signal in the time synchronization system according to the present embodiment. Referring to FIG. 12, message format 260A shown in FIG. 12 is in conformity with a GPS Nav message compatible format.

Specifically, message format 260A is constituted of four words 261, 262, 263, and 264. Each of words 261, 262, 263, and 264 is constituted of thirty bits. A first word 261 includes a preamble region 2611, a message type region 2612, a telemetry region 2613, and a parity bit region 2614. A second word 262 includes a counter region 2621, a leap second region 2627, a GPS week region 2628, a time source region 2625, and a parity bit region 2626. A third word 263 includes a counter region 2631, a TOW region 2637, a satellite healthy region 2635, and a parity bit region 2636. Time of week (TOW) means total seconds since the beginning of a week. A fourth word 264 includes a counter region 2641, an hour region 2642, a minute region 2643, a second region 2644, a satellite healthy region 2645, and a parity bit region 2646.

By using information stored in GPS week region 2628 (week(s) elapsed since a reference day (Jan. 6, 1980)) and information stored in TOW region 2637 included in message format 260A, Christian year, month, day, hour, minute, and second can be calculated as time information.

As shown in FIG. 11, an IMES-TS signal is configured as a frame constituted of a plurality of words.

e3: Message Format: Example of IMES-TS Signal (No. 2)

Another example of a message format of an IMES-TS signal emitted from S3 transmitter 220 will now be described. In the time synchronization system according to the present embodiment, by way of example, an IMES-based signal is adopted. Therefore, a signal configuration adopted as an IMES-TS signal is also preferably capable of achieving backward compatibility with an IMES signal. Namely, S3 transmitter 220 functions as a transmitter configured to transmit a radio signal compatible with a radio signal from the GNSS (a GNSS signal) based on a timing signal (1-PPS signal) and time information obtained through demodulation by corresponding S2 demodulator 210.

FIG. 13 is a diagram showing another example of a message type (MT) of a signal transmitted from S3 transmitter 220 included in the time synchronization system according to the present embodiment. Referring to FIG. 13, in addition to four message types defined as known IMES signals, two types of message formats 250 and 260 may be adopted as IMES-TS signals. Both of the two types of message formats do not necessarily have to be mounted, and any one of them may be mounted. The message shown in FIG. 13 is by way of example, and any message format may be made use of so long as it includes information necessary for time synchronization.

By way of example, message format 250 includes information on GPS Nav message compatible GPS week and TOW. Message format 260 includes information on Christian year, month, day, hour, minute, and second. Which of message format 250 and message format 260 is to be used is determined as appropriate in accordance with a manner of mount of S3 receiver 320. Thus, the IMES-TS signal may support at least one of message format 250 and message format 260. Details of each message format will be described below.

Figure 14:
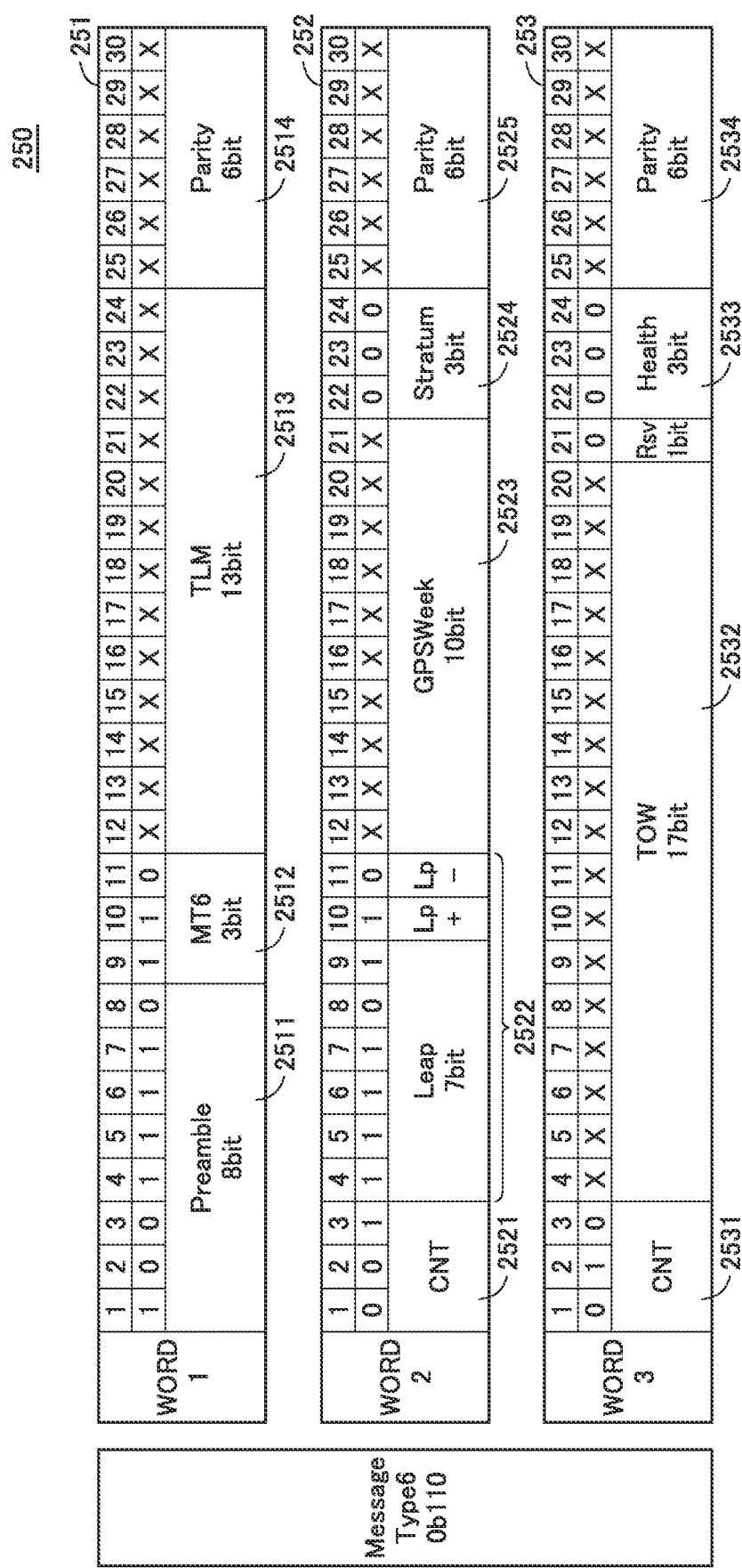
FIG. 14 is a diagram showing one example of a frame structure of a message format used as an IMES-TS signal in the time synchronization system according to the present embodiment.

FIG. 14 is a diagram showing one example of a frame structure of message format 250 used as an IMES-TS signal in the time synchronization system according to the present embodiment. Message format 250 shown in FIG. 14 is a GPS Nav message compatible format. When S3 receiver 320 is adapted to the GPS, it includes a message decoder configured to process message format 250. Therefore, Christian year, month, day, hour, minute, and second can be obtained as time information without modifying the message decoder.

Specifically, message format 250 is constituted of three words 251, 252, and 253. Each of words 251, 252, and 253 is constituted of thirty bits. A first word 251 includes a preamble region 2511, a message type region 2512, a telemetry region 2513, and a parity bit region 2514. A second word 252 includes a counter region 2521, a leap second region 2522, a GPS week region 2523, a time source region 2524, and a parity bit region 2525. A third word 253 includes a counter region 2531, a TOW region 2532, a satellite healthy region 2533, and a parity bit region 2534.

By using information stored in GPS week region 2523 (week(s) elapsed since a reference day (Jan. 6, 1980)) and information stored in TOW region 2532 included in message format 250, Christian year, month, day, hour, minute, and second can be calculated as time information.

Figure 15:
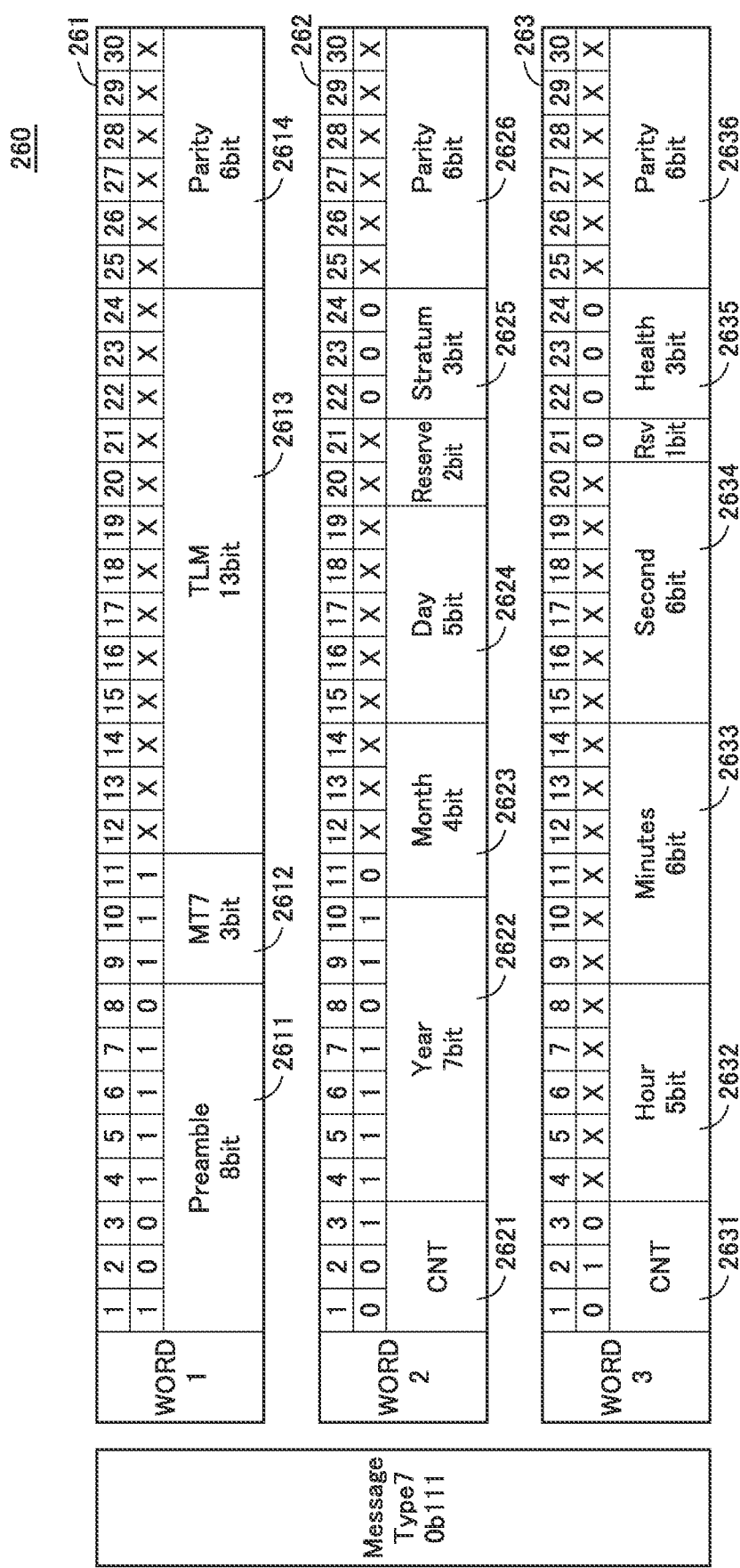
FIG. 15 is a diagram showing one example of a frame structure of a message format used as an IMES-TS signal in the time synchronization system according to the present embodiment.

FIG. 15 is a diagram showing one example of a frame structure of message format 260 used as an IMES-TS signal in the time synchronization system according to the present embodiment. Referring to FIG. 15, message format 260 shown in FIG. 15 is a format which directly expresses Christian year, month, day, hour, minute, and second.

Specifically, message format 260 is constituted of three words 261, 262, and 263. Each of words 261, 262, and 263 is constituted of thirty bits. First word 261 includes preamble region 2611, message type region 2612, telemetry region 2613, and parity bit region 2614. Second word 262 includes counter region 2621, a year region 2622, a month region 2623, a day region 2624, time source region 2625, and parity bit region 2626. Third word 263 includes counter region 2631, an hour region 2632, a minute region 2633, a second region 2634, satellite healthy region 2635, and parity bit region 2636.

By making use of information stored in each of year region 2622, month region 2623, day region 2624, hour region 2632, minute region 2633, and second region 2634 included in message format 260 as it is, Christian year, month, day, hour, minute, and second can be obtained as time information.

As shown in FIGS. 14 and 15, an IMES-TS signal is configured as a frame constituted of a plurality of words.

e4: Message Format: Example of IMES-TAS Signal (No. 1)

One example of a message format of an IMES-TAS signal emitted from S3 transmitter 220 will now be described. In the time synchronization system according to the present embodiment, by way of example, an IMES-based signal is adopted. Therefore, a signal configuration adopted as an IMES-TAS signal is also preferably capable of achieving backward compatibility with an IMES signal. Namely, S3 transmitter 220 functions as a transmitter configured to transmit a radio signal compatible with a radio signal from the GNSS (a GNSS signal) based on a timing signal (1-PPS signal) and time information obtained through demodulation by corresponding S2 demodulator 210.

FIG. 16 is a diagram showing yet another example of a message type (MT) of a signal transmitted from S3 transmitter 220 included in the time synchronization system according to the present embodiment. Referring to FIG. 16, in addition to four message types defined as known IMES signals, a message format 270 may be adopted as an IMES-TAS signal. The message shown in FIG. 16 is by way of example and any message format may be made use of so long as it includes information necessary for time synchronization.

Message format 270 (MT7) of the IMES-TAS signal shown in FIG. 16 is expanded to be able to transmit more information while it maintains compatibility with an existing message format by introducing a concept of a "page". Specifically, by combining a value of a message type and a value of a page for message format 270, a message including words more than existing words can be transmitted as a message of a specific message type. Though FIG. 16 shows an example in which three pages of data of four words may be present in message format 270, the number of pages may be expanded to a necessary number of pages without being limited thereto.

Figure 17:
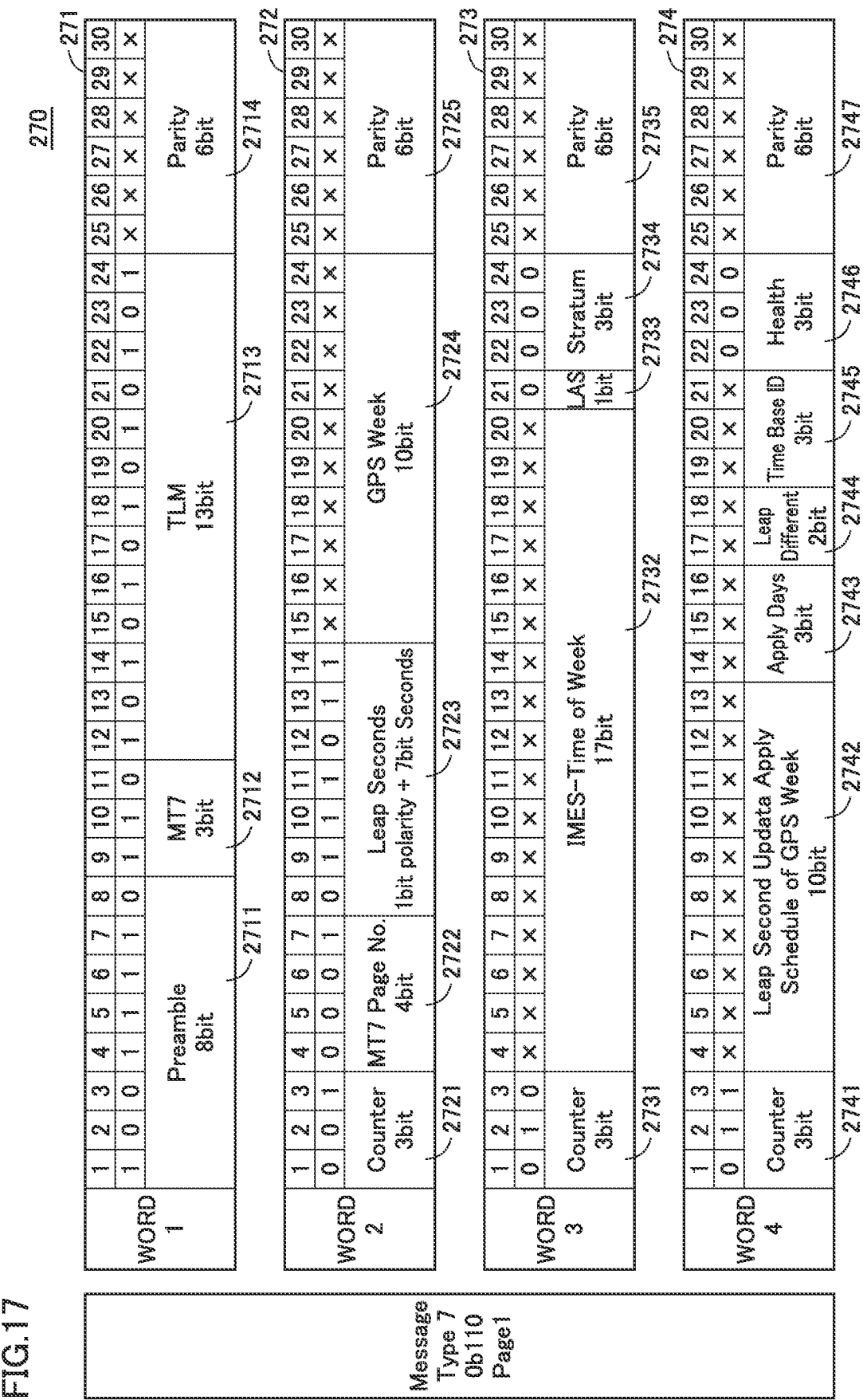
FIG. 17 is a diagram showing one example of a frame structure of a message format used as an IMES-TAS signal in the time synchronization system according to the present embodiment.
Figure 18:
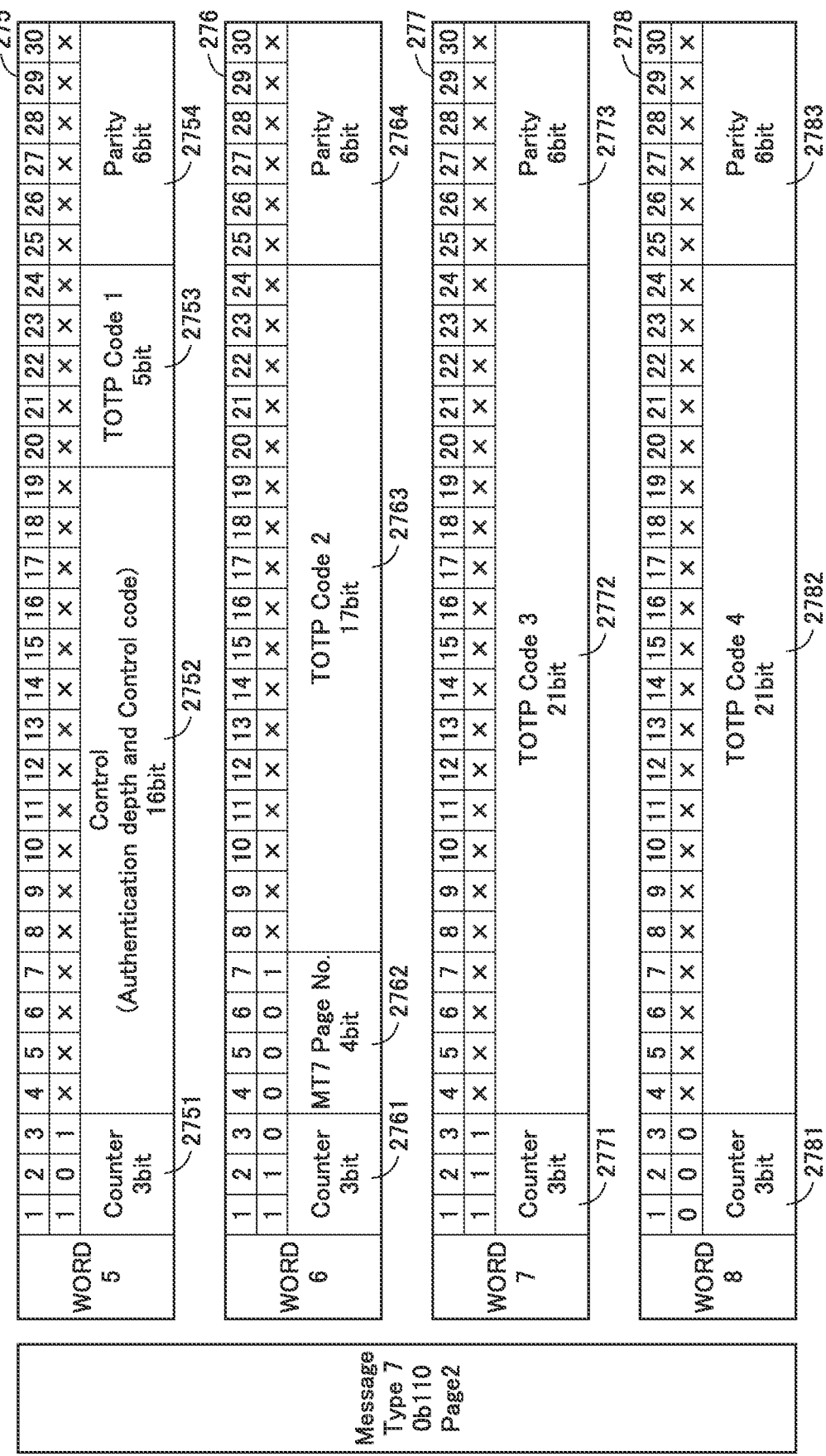
FIG. 18 is a diagram showing one example of a frame structure of a message format used as an IMES-TAS signal in the time synchronization system according to the present embodiment.

FIGS. 17 and 18 are each a diagram showing one example of a frame structure of message format 270 used as an IMES-TAS signal in the time synchronization system according to the present embodiment. Message format 270 can include a variable number of pages depending on an application. In addition to an example including only a message format (four words/for one page) shown in FIG. 17, a configuration of the message format shown in FIG. 17 and the message format shown in FIG. 18 as being combined (eight words in total/for two pages) can also be adopted. A configuration of the message format (four words) shown in FIG. 18 as being repeatedly combined (four words×the number of pages in total) can also be adopted. A length (the number of words/the number of pages) of such a message format can be variable depending on an application.

Message format 270 shown in FIGS. 17 and 18 is a GPS Nav message compatible format. When S3 receiver 320 is adapted to the GPS, it includes a message decoder configured to process message format 270. Therefore, Christian year, month, day, hour, minute, and second can be obtained as time information without modifying the message decoder.

Specifically, message format 270 is constituted of at least four words 271, 272, 273, and 274. When an authentication code is added, words 275, 276, 277, and 278 shown in FIG. 18 may be combined. Each of words 271, 272, 273, 274, 275, 276, 277, and 278 is constituted of thirty bits.

A first word 271 includes a preamble region 2711, a message type region 2712 in which information for specifying a message type is stored, a telemetry region 2713 in which telemetry information is stored, and a parity bit region 2714.

A second word 272 includes a counter region 2721 in which the number of counted messages is stored, a message page region 2722, a leap second region 2723, a GPS week region 2724 in which week(s) elapsed since a reference day (for example, Jan. 6, 1980)) is (are) stored, and a parity bit region 2725. In leap second region 2723, information indicating timing of a leap second to be inserted or deleted and information indicating either insertion or deletion are stored.

Since message format 270 may be configured across a plurality of pages (four words per one page), information for specifying on how manyeth page each message is located is stored in message page region 2722.

A third word 273 includes a counter region 2731, a TOW region 2732, an LAS region 2733, a time source region 2734, and a parity bit region 2735. In TOW region 2732, a count value incremented by one every 1.5 second with 0 am on Sunday being defined as a starting point is stored. When message format 270 is transmitted every three seconds, a value incremented by two counts between a preceding IMES-TAS signal and a subsequent IMES-TAS signal is stored in TOW region 2732. In LAS region 2733, a state value indicating whether or not application of a leap second is activated is stored.

A fourth word 274 includes a counter region 2741, a leap second application week region 2742, a leap second application day region 2743, an application leap second region 2744, a transmitter ID 2745, a satellite healthy region 2746, and a parity bit region 2747. Timing of application of a leap second is scheduled based on elapsed week(s) stored in leap second application week region 2742 and a day of a week stored in leap second application day region 2743. A length of a leap second to be applied is defined in application leap second region 2744. For example, whether to apply "one second" as a leap second or information indicating whether to apply "one second" is stored in application leap second region 2744. Identification information for identifying transmission unit 200 which has generated an IMES-TAS signal is stored in transmitter ID 2745.

For information stored in message format 270 shown in FIG. 17, description of the message format shown in FIGS. 12, 14, and 15 described above is also to be referred to.

Referring to FIG. 18, words 275, 276, 277, and 278 of message format 270 each provide a region for transmitting a TOTP. As will be described later, words 275, 276, 277, and 278 allow transmission of a TOTP of sixty-four bits in total. By successively transmitting message formats the same as words 275, 276, 277, and 278, a TOTP of 128 bits can be transmitted.

A fifth word 275 includes a counter region 2751, a control region 2752, a TOTP region 2753, and a parity bit region 2747. A control code which represents a procedure necessary for authentication processing by using a TOTP is stored in control region 2752. Six bits of data which makes up a TOTP are stored in TOTP region 2753.

A sixth word 276 includes a counter region 2761, a message page region 2762, a TOTP region 2763, and a parity bit region 2764. Seventeen bits of data which makes up a TOTP are stored in TOTP region 2763.

A seventh word 277 includes a counter region 2771, a TOTP region 2772, and a parity bit region 2773. Twenty-one bits of data which makes up a TOTP are stored in TOTP region 2772. An eighth word 278 includes a counter region 2781, a TOTP region 2782, and a parity bit region 2783 similarly to seventh word 277.

e5: Message Format: Example of IMES-TAS Signal (No. 2)

Another example of a message format of an IMES-TAS signal emitted from S3 transmitter 220 will now be described. Instead of the IMES-based message format defined in FIGS. 16 to 18, a message format as shown below may be adopted.

FIG. 19 is a diagram showing yet another example of a message type (MT) of a signal transmitted from S3 transmitter 220 included in the time synchronization system according to the present embodiment. Referring to FIG. 19, in addition to four message types defined as known IMES signals, two types of message formats 250A and 270A may be adopted as IMES-TAS signals. The message shown in FIG. 19 is by way of example and any message format may be made use of so long as it includes information necessary for time synchronization.

Message format 250A (MT6) and message format 270A (MT7) of the IMES-TAS signals shown in FIG. 19 are expanded to be able to transmit more information while they maintain compatibility with an existing message format by introducing a concept of a "page".

Figure 20:
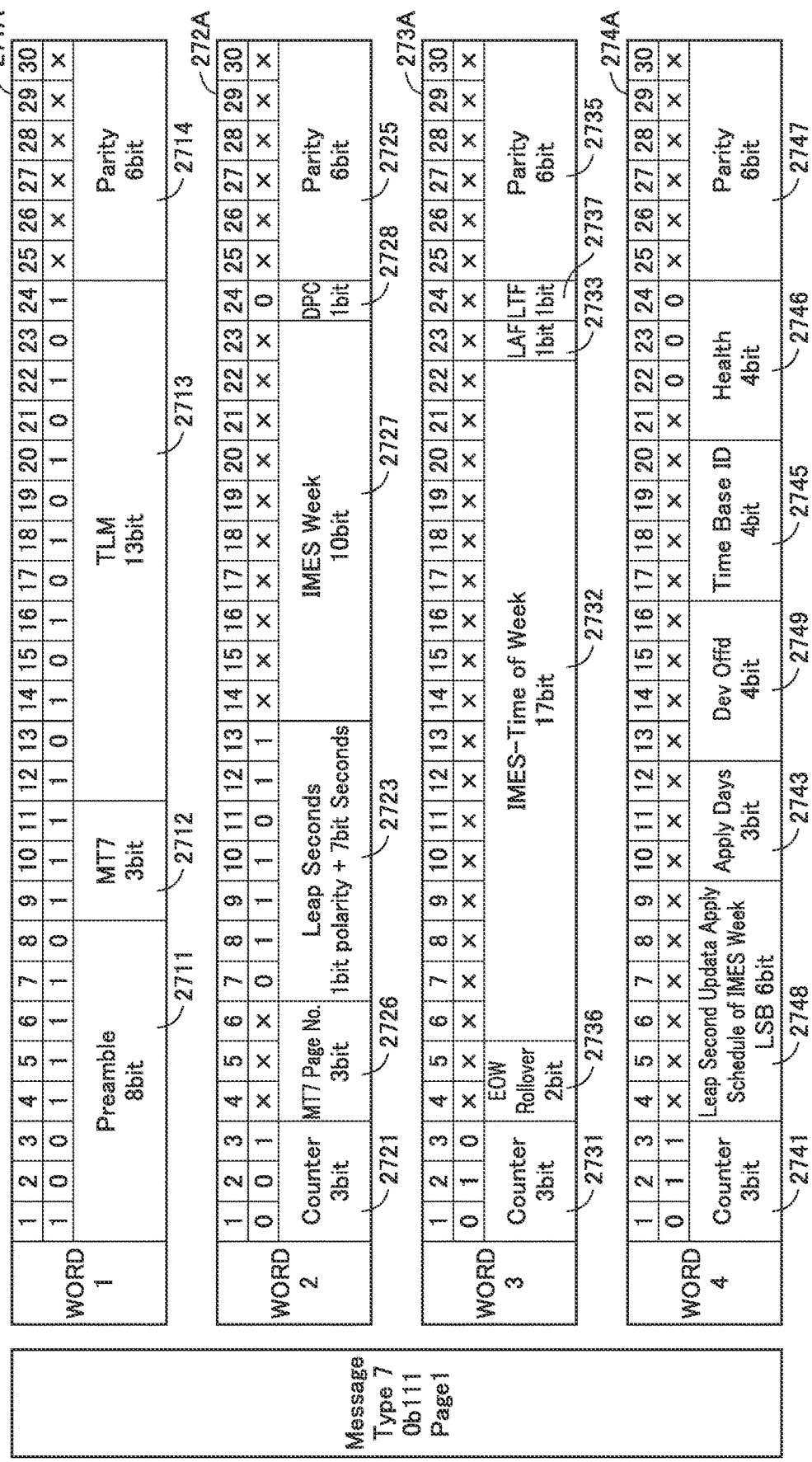
FIG. 20 is a diagram showing one example of a frame structure of a message format used as an IMES-TAS signal in the time synchronization system according to the present embodiment.

FIG. 20 is a diagram showing one example of a frame structure of message format 270A used as an IMES-TAS signal in the time synchronization system according to the present embodiment. Message format 270A can include a variable number of pages depending on an application. In addition to an example including only a message format (four words/for one page) shown in FIG. 20, a configuration of the message format shown in FIG. 20 and the message format shown in FIG. 18 described above as being combined (eight words in total/for two pages) can also be adopted. A configuration of the message format (four words) shown in FIG. 20 as being repeatedly combined (four words×the number of pages in total) can also be adopted. A length (the number of words/the number of pages) of such a message format can be variable depending on an application.

Message format 270A shown in FIG. 20 is a GPS Nav message compatible format. When S3 receiver 320 is adapted to the GPS, it includes a message decoder configured to process message format 270A. Therefore, Christian year, month, day, hour, minute, and second can be obtained as time information without modifying the message decoder.

Specifically, message format 270A is constituted of at least four words 271A, 272A, 273A, and 274A. Each of words 271A, 272A, 273A, and 274A is constituted of thirty bits.

A first word 271A includes preamble region 2711, message type region 2712 in which information for specifying a message type is stored, telemetry region 2713 in which telemetry information is stored, and parity bit region 2714.

A second word 272A includes counter region 2721 in which the number of counted messages is stored, a message page region 2726, leap second region 2723, an IMES week region 2727 in which week(s) elapsed since a reference day (for example, Jan. 6, 1980)) is (are) stored, and a DPC region 2728.

A third word 273A includes counter region 2731, an EOW rollover region 2736, TOW region 2732, LAS region 2733, an LTF region 2737, and parity bit region 2735.

A fourth word 274A includes counter region 2741, a leap second application second region 2748, leap second application day region 2743, a delay time region 2749, transmitter ID 2745, satellite healthy region 2746, and parity bit region 2747.

For information stored in message format 270A shown in FIG. 20, description of the message format shown in FIGS. 12, 14, 15, and 18 described above is also to be referred to.

Figure 21:
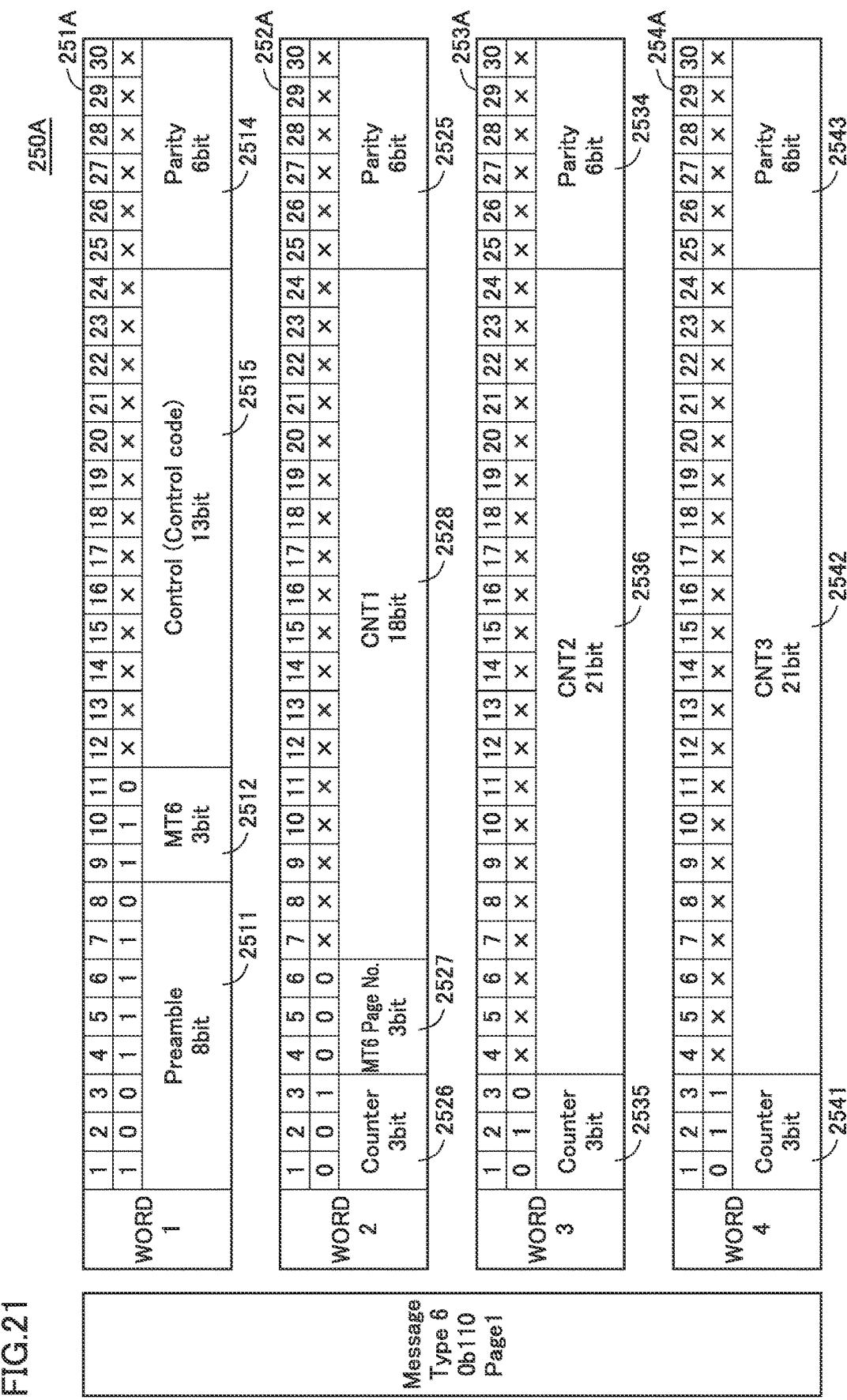
FIG. 21 is a diagram showing one example of a frame structure of a message format used as an IMES-TAS signal in the time synchronization system according to the present embodiment.

FIG. 21 is a diagram showing one example of a frame structure of message format 250A used as an IMES-TAS signal in the time synchronization system according to the present embodiment. Message format 250A shown in FIG. 21 is used for providing authentication service making use of a position and time. Referring to FIG. 21, words 251A, 252A, 253A, and 254A of message format 250A are used for storing data to be used for the authentication service.

Specifically, message format 250A is constituted of four words 251A, 252A, 253A, and 254A. Each of words 251A, 252A, 253A, and 254A is constituted of thirty bits.

A first word 251A includes preamble region 2511, message type region 2512, telemetry region 2513, and parity bit region 2514. A second word 252A includes a counter region 2526, a message type region 2527, a content region 2528, and parity bit region 2525. A third word 253A includes a counter region 2535, a content region 2536, and parity bit region 2534. A fourth word 254A includes a counter region 2541, a content region 2542, and a parity bit region 2543.

In addition to message format 250A shown in FIG. 21, description of the message format shown in FIGS. 12, 14, 15, and 18 described above is also to be referred to.

e6: Transmission Period/Transmission Sequence

A period of transmission of an IMES-TAS signal transmitted from S3 transmitter 220 will now be described. In the time synchronization system according to the present embodiment, a message including a telemetry word stored in telemetry region 2513 is transmitted as a timing code of an IMES-TAS signal every prescribed transmission period. A predetermined fixed code is employed as a telemetry word. By using such a fixed code, it can function as a SYNC word for synchronization.

By way of example, S3 transmitter 220 repeatedly transmits a message including a telemetry word as a timing code every three seconds defined as an interval. In this case, for example, by setting a bit rate of a signal transmitted from S3 transmitter 220 to 250 bps, transmission of twenty five words per three seconds (250 bps×3 seconds÷30 bits) can be achieved.

In the description below, though an example in which a bit rate of a signal transmitted from S3 transmitter 220 is set to 250 bps is described by way of example, the bit rate is not limited thereto and a value suitable for a system can be employed. For example, a message is transmitted from a GPS satellite at 50 bps, and a bit rate of a signal transmitted from S3 transmitter 220 may be set to 50 bps so as to be adapted to this existing specification. In this case, since an amount of data which can be transmitted per unit time is ⅕ (=50/250), a transmission period set on the premise of 250 bps as described below should only be changed to five times longer. The interval is not limited to three seconds either, and it may be changed, for example, to six seconds. Optimal interval and bit rate can be selected as appropriate in accordance with required specifications or a system configuration.

Figure 22:
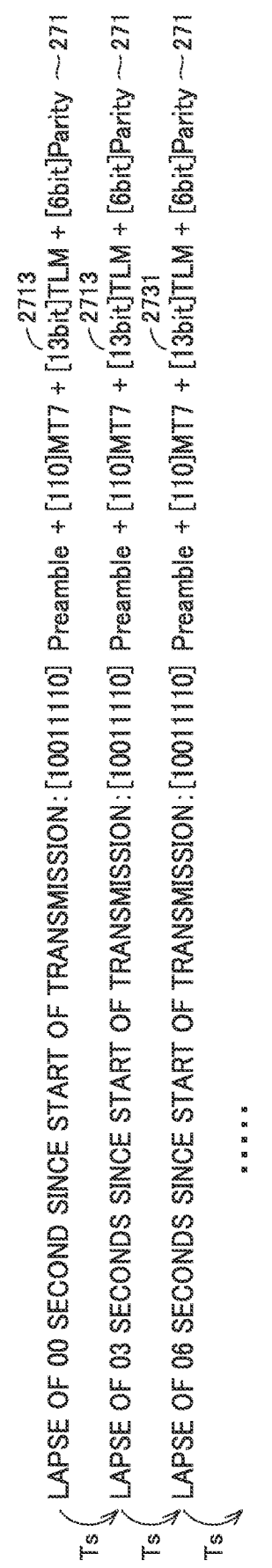
FIG. 22 is a diagram for illustrating one example of a timing code transmitted as an IMES-TAS signal in the time synchronization system according to the present embodiment.

FIG. 22 is a diagram for illustrating one example of a timing code transmitted as an IMES-TAS signal in the time synchronization system according to the present embodiment. Referring to FIG. 22, when a transmission period of an IMES-TAS signal from S3 transmitter 220 comes, transmission of each word which makes up message format 270 (MT7) shown in FIGS. 17 and 18 is started. Specifically, words 271, 272, 273, 274, 275, 276, 277, and 278 which make up message format 270 (MT7) are successively transmitted. When transmission of the message of MT7 is completed, another message is transmitted.

After lapse of a transmission period Ts (three seconds in this example) since transmission of first word 271, a transmission period of a next IMES-TAS signal comes. Therefore, transmission of words 271, 272, 273, 274, 275, 276, 277, and 278 which make up message format 270 (MT7) is repeated. Similarly hereafter, data in connection with message format 270 (MT7) and another message format are repeatedly transmitted every transmission period Ts. The head (the first word) of a plurality of words which make up the frame of the IMES-TAS signal is associated with a time point of start of the transmission period of S3 transmitter 220. Since a telemetry word at a fixed value is employed for the IMES-TAS signal, the head word is fixed to a predetermined value. Therefore, the entire head word can also be employed as a SYNC word or a replica in demodulation. S3 receiver 320 achieves time synchronization based on a thus periodically repeatedly transmitted timing code.

Actually, since message format 270 which is an IMES-TAS signal is constituted of eight words, the IMES-TAS signal occupies eight words in a message (twenty five words) which can be transmitted with a transmission period of three seconds. A message of a known IMES signal (MT0, MT1, MT3, and MT4 shown in FIGS. 11, 13, and 16) can freely be allocated to seventeen words other than the above.

So long as only a condition of transmission of a message (MT7 or MT6) including a telemetry word every transmission period Ts without fail is satisfied, a type of a message transmitted during a period other than that period can arbitrarily be determined. Some extra words may be present before timing of transmission of a message including a telemetry word. In such a case, padding is required by inserting a message consisting of a single word such as MT3.

S3 transmitter 220 transmits an IMES-TAS signal with a period (three seconds) longer than a period (one second) of timing (1-PPS) output from S2 demodulator 210. By thus extending a period of transmission of an IMES-TAS signal, an IMES signal can also be transmitted during idle time, and a method of providing information to base station 300 can be various. Namely, S3 transmitter 220 can also transmit a radio signal (IMES signal) replacing a radio signal from the GNSS (GNSS signal) while no IMES-TAS signal is transmitted.

Figure 23:
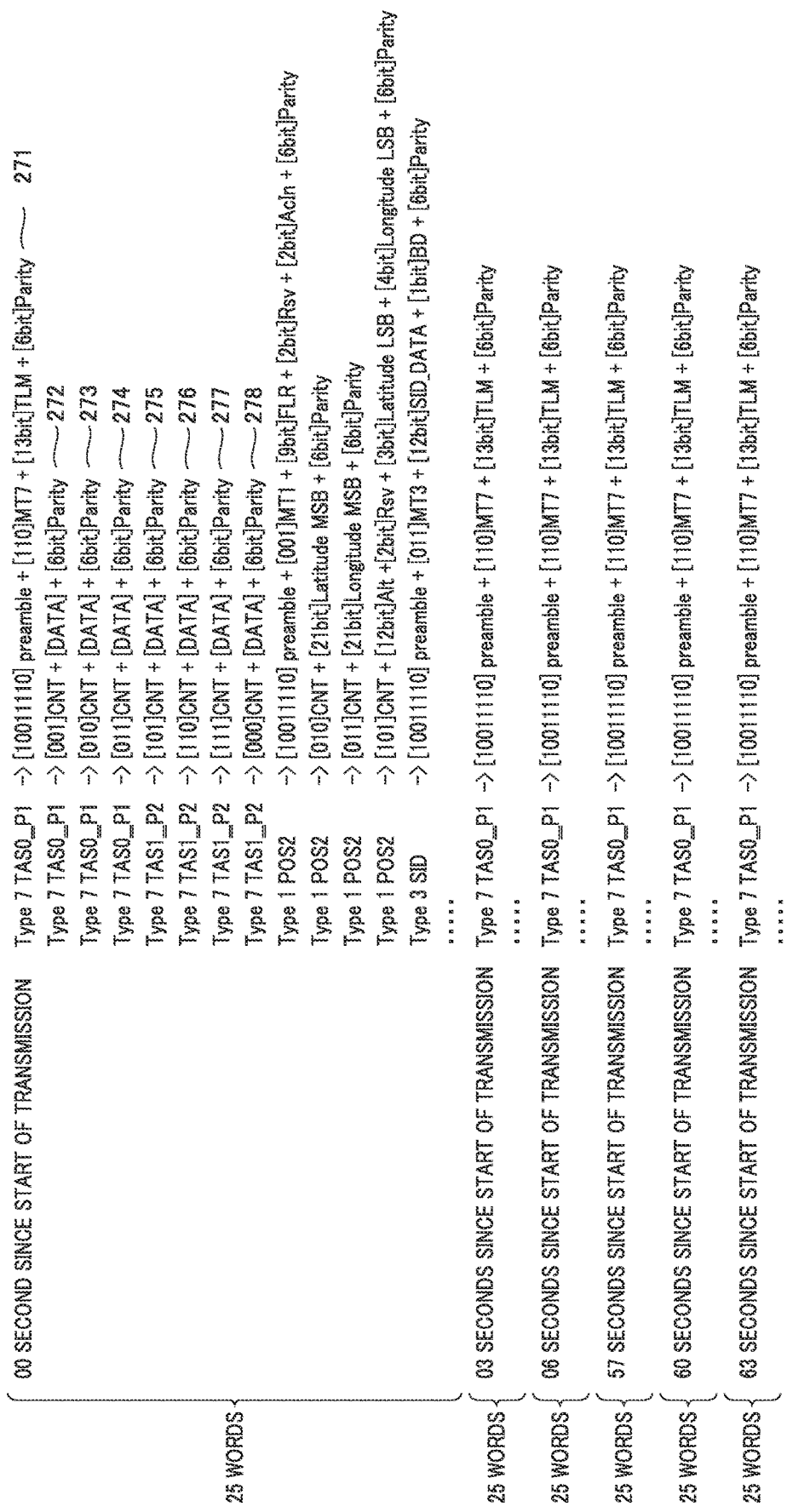
FIG. 23 is a diagram for illustrating one example of a message transmitted from the S3 transmitter in the time synchronization system according to the present embodiment.

FIG. 23 is a diagram for illustrating one example of a message transmitted from S3 transmitter 220 in the time synchronization system according to the present embodiment. As shown in FIG. 23, it can be seen that eight words which make up message format 270 are transmitted without fail every transmission period Ts (three seconds in this example). Any message is transmitted during a period other than that period.

As described above, since an IMES-TAS signal transmitted from S3 transmitter 220 has backward compatibility with a GNSS signal and an IMES signal, simultaneous operations can be performed. Specifically, S3 receiver 320 can receive and decode a GNSS signal and it can also receive and decode an IMES signal and an IMES-TAS signal.

Coverage by S3 transmitter 220 (a distance between S3 transmitter 220 and S3 receiver 320) is assumed to be from several meters to more than ten meters, and delay time required for transmission of an IMES-TAS signal is approximately 33 nanoseconds per ten meters. Therefore, delay time involved with transmission of an IMES-TAS signal is ignorable in terms of system specifications of the time synchronization system according to the present embodiment.

Though FIG. 23 described above shows an example of transmission of message format 270 which is an IMES-TAS signal with a period of three seconds, a longer transmission period may be adopted. For example, S3 transmitter 220 is assumed to repeatedly transmit a message including a telemetry word (a message in accordance with message format 250) as a timing code every six seconds defined as an interval. In this case, for example, when a bit rate of a signal transmitted from S3 transmitter 220 is set to 250 bps, transmission of fifty words per six seconds (250 bps×6 seconds÷30 bits) can be achieved.

Figure 24:
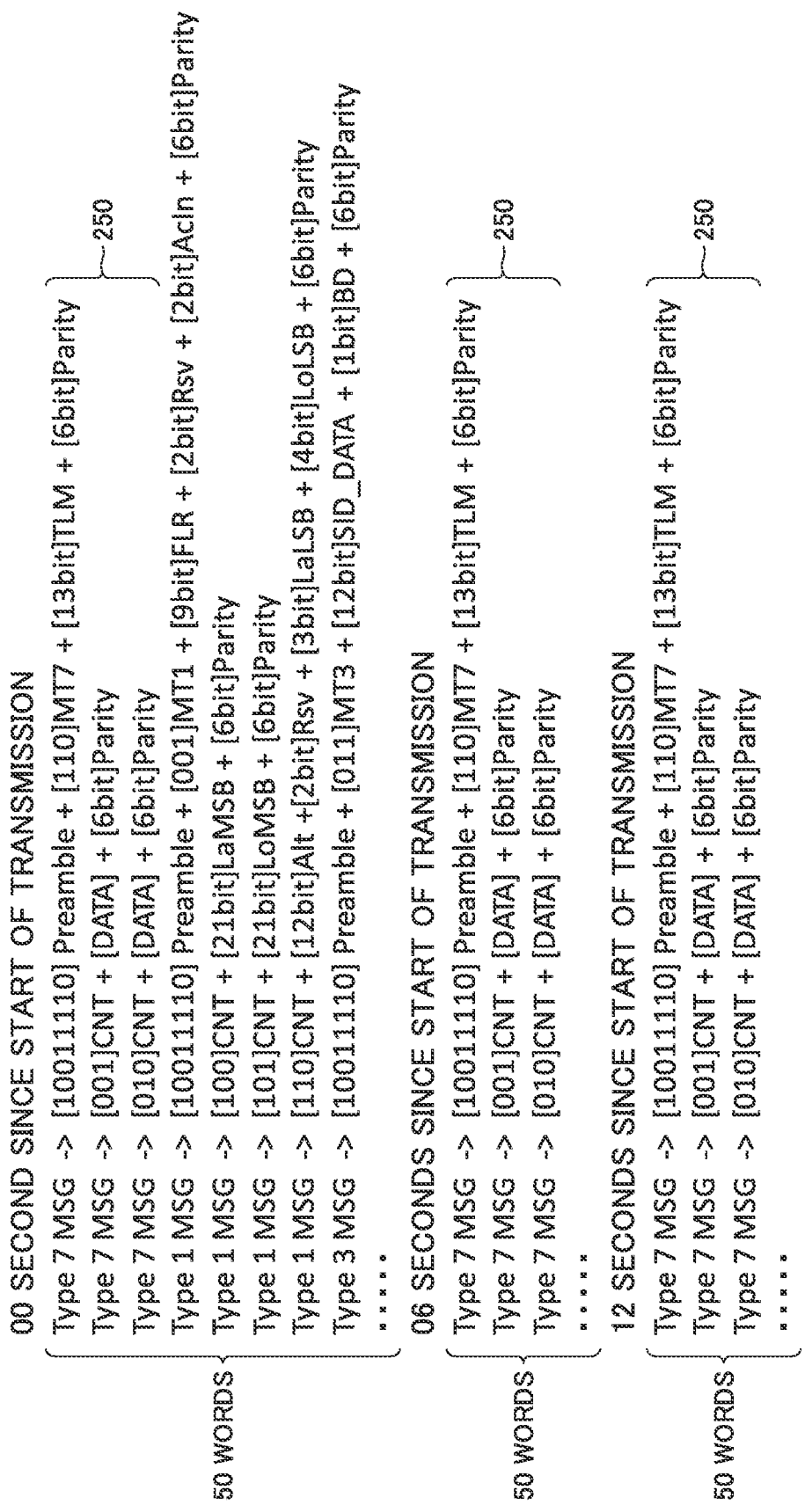
FIG. 24 is a diagram for illustrating another example of a message transmitted from the S3 transmitter in the time synchronization system according to the present embodiment.

FIG. 24 is a diagram for illustrating another example of a message transmitted from S3 transmitter 220 in the time synchronization system according to the present embodiment. As shown in FIG. 24, it can be seen that three words which make up message format 250 is transmitted without fail every transmission period Ts (six seconds in this example). Any message is transmitted during a period other than that period.

As described above, since an IMES-TS signal transmitted from S3 transmitter 220 has backward compatibility with a GNSS signal and an IMES signal, simultaneous operations can be performed. Specifically, S3 receiver 320 can receive and decode a GNSS signal and it can also receive and decode an IMES signal and an IMES-TS signal.

e7: Processing Procedure in Generation/Transmission of IMES-TAS Signal

One example of a processing procedure involved with generation and transmission of an IMES-TAS signal in S3 transmitter 220 will now be described.

Figure 25:
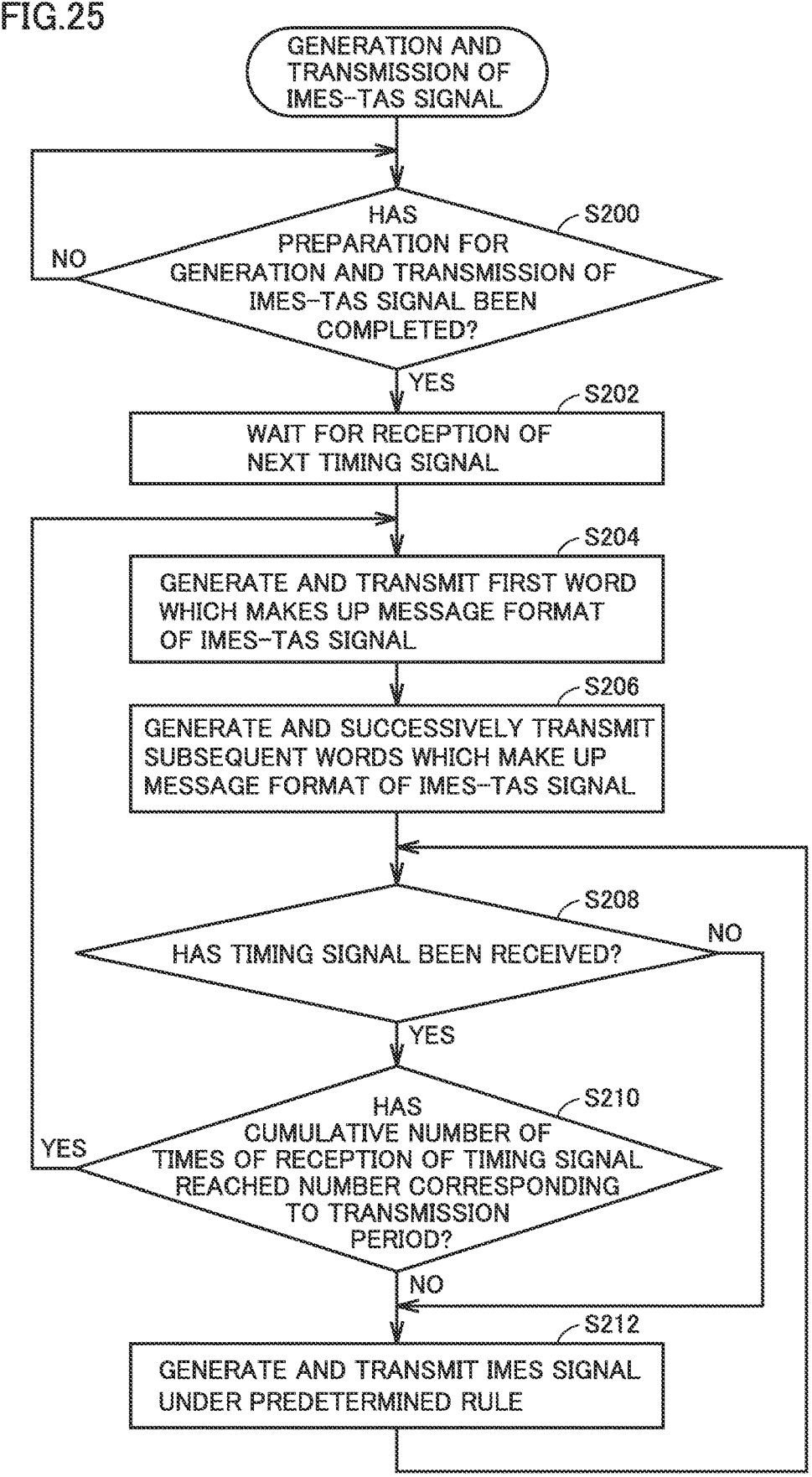
FIG. 25 is a flowchart showing a processing procedure in generation and transmission of an IMES-TAS signal from the S3 transmitter included in the time synchronization system according to the present embodiment.

FIG. 25 is a flowchart showing a processing procedure in generation and transmission of an IMES-TAS signal from S3 transmitter 220 included in the time synchronization system according to the present embodiment. Each step shown in FIG. 25 is basically performed by digital processing block 221 of S3 transmitter 220.

Referring to FIG. 25, S3 transmitter 220 determines whether or not preparation for generation and transmission of an IMES-TAS signal has been completed (step S200). Whether or not preparation for transmission has been completed may be determined based on whether or not demodulated data and a timing signal have successfully been received from S2 demodulator 210. When preparation for generation and transmission of an IMES-TAS signal has not been completed (NO in step S200), processing in step S200 is repeated.

When preparation for generation and transmission of an IMES-TAS signal has been completed (YES in step S200), S3 transmitter 220 waits for reception of a next timing signal from S2 demodulator 210 (step S202). When S3 transmitter 220 has received a next timing signal from S2 demodulator 210, S3 transmitter 220 generates and transmits the first word which makes up message format 270 (or message format 250 or 260) of the IMES-TAS signal based on demodulated data from S2 demodulator 210 at that time (step S204). Namely, a message of MT7 or MT6 is generated and transmitted. In succession, S3 transmitter 220 generates subsequent words which make up message format 270 (or message format 250 or 260) of the IMES-TAS signal based on the same demodulated data from S2 demodulator 210 and successively transmits the words (step S206).

In succession, S3 transmitter 220 determines whether or not it has received a timing signal from S2 demodulator 210 (step S208). When S3 transmitter 220 has received a timing signal from S2 demodulator 210 (YES in step S208), it determines whether or not the cumulative number of times of reception of the timing signal after immediately preceding transmission of the IMES-TAS signal has reached the number corresponding to transmission period Ts (step S210). When transmission period Ts has been set to three seconds, whether or not reception of the timing signal is the third time after immediately preceding transmission of the IMES-TAS signal is determined.

When the cumulative number of times of reception of the timing signal after immediately preceding transmission of the IMES-TAS signal has reached the number corresponding to transmission period Ts (YES in step S210), processing in step S204 and subsequent steps is repeated.

In contrast, when a timing signal has not been received from S2 demodulator 210 (NO in step S208) or when the cumulative number of times of reception of the timing signal after immediately preceding transmission of the IMES-TAS signal has not reached the number corresponding to transmission period Ts (NO in step S210), S3 transmitter 220 generates and transmits an IMES signal under a predetermined rule (step S212). Namely, a message of any of MT0, MT1, MT3, and MT4 is generated and transmitted. Processing in step S208 and subsequent steps is then repeated.

An IMES-TAS signal is transmitted from S3 transmitter 220 to S3 receiver 320 through the processing procedure as set forth above.

F. S3 Receiver 320 of Base Station 300

Processing for receiving and demodulating an IMES-TAS signal in S3 receiver 320 of base station 300 will now be described.

Figure 26:
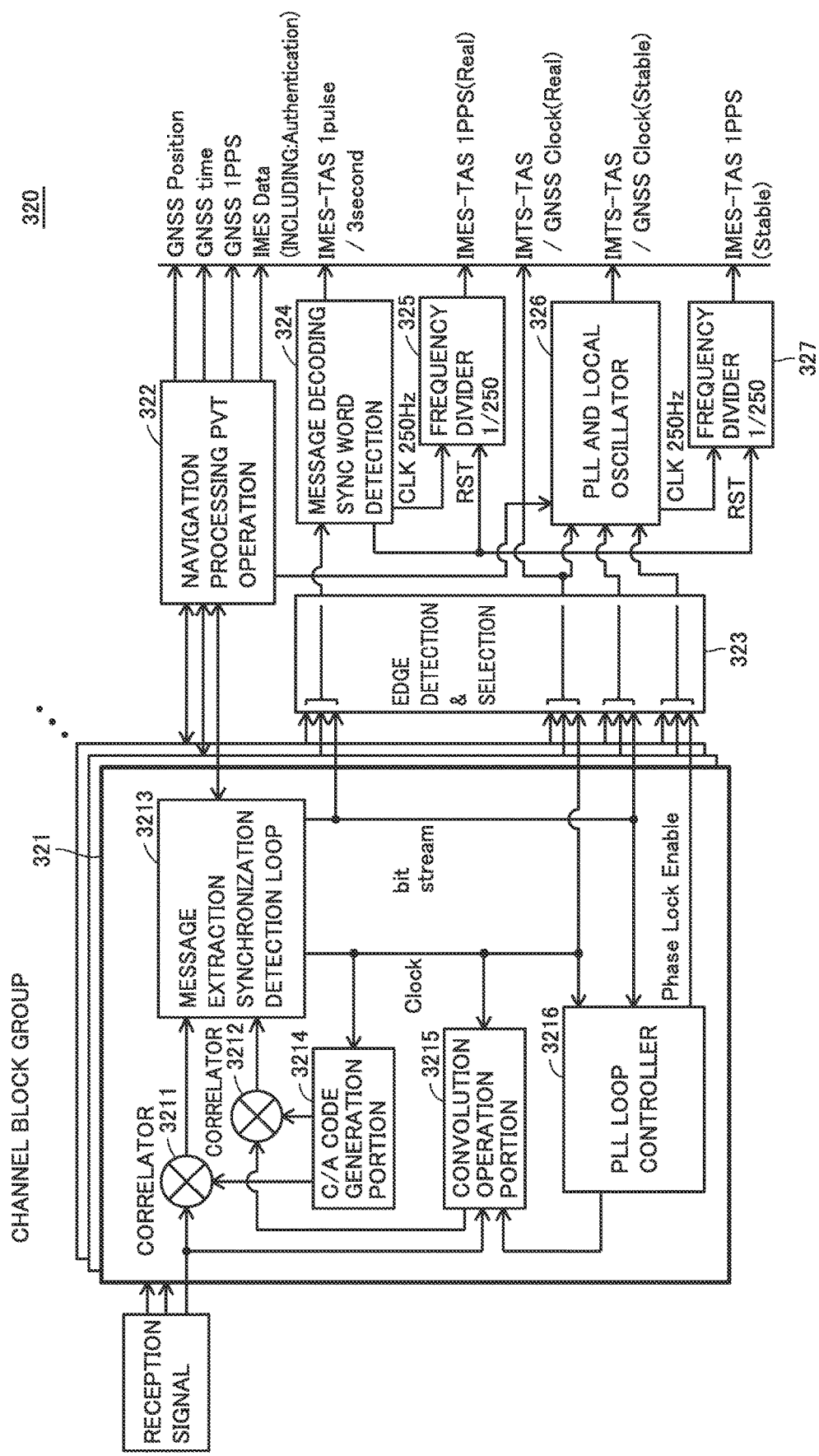
FIG. 26 is a block diagram showing an exemplary circuitry configuration of an S3 receiver included in the time synchronization system according to the present embodiment.

FIG. 26 is a block diagram showing an exemplary circuitry configuration of S3 receiver 320 included in the time synchronization system according to the present embodiment. Referring to FIG. 26, S3 receiver 320 includes a plurality of channel blocks 321, a navigation processing portion 322, a selection control portion 323, a synchronization detection portion 324, frequency dividers 325 and 327, and a stabilization loop portion 326.

Each of the plurality of channel blocks 321 demodulates a reception signal (an RF signal) and outputs a message included therein. The plurality of channel blocks 321 demodulate reception signals and output messages in parallel, and selection control portion 323 selectively provides outputs from channel blocks 321 to subsequent stages.

Specifically, each of channel blocks 321 includes correlators 3211 and 3212, a message extraction portion 3213, a coarse/access (C/A) code generation portion 3214, a convolution operation portion 3215, and an integration circuit 3216.

Correlator 3211 calculates correlation between a reception signal and a C/A code which is a spread code output from C/A code generation portion 3214.

Message extraction portion 3213 extracts a message (a frame) included in the output from correlator 3211. Message extraction portion 3213 outputs a bit stream representing the extracted message. Concurrently, message extraction portion 3213 manages synchronization detection timing in channel block 321 by adjusting a phase of a clock (Clock) generated under loop control.

Integration circuit 3216 synchronizes the phase in accordance with the clock from message extraction portion 3213 and provides an output thereof to convolution operation portion 3215. Convolution operation portion 3215 performs convolution operation between the reception signal and a synchronization signal from integration circuit 3216 and outputs a result thereof to correlator 3212. Correlator 3212 calculates correlation between the result of convolution operation from convolution operation portion 3215 and the C/A code output from C/A code generation portion 3214. Namely, C/A code coherent integration processing is performed by using correlator 3212 and convolution operation portion 3215. The output from correlator 3212 is provided to message extraction portion 3213. Message extraction portion 3213 adjusts a phase of a clock based on outputs from correlator 3211 and correlator 3212. Under such loop control, a message included in the reception signal can highly accurately be detected.

The number of times of loop processing (convolution operation processing) of a message by integration circuit 3216 may be different depending on a type of a message. For example, convolution operation processing may be performed 120 times for an IMES-TAS signal (MT6 and MT7), convolution operation processing may be performed four times for an IMES signal (MT0, MT1, MT3, and MT4), and convolution operation processing may be performed twenty times for a GNSS signal. Convolution operation processing of an IMES-TAS signal will be described later.

When a message included in a GNSS signal or an IMES signal is output from any channel block 321, navigation processing portion 322 performs PVT operation onto that message. Navigation processing portion 322 outputs a position (GNSS Position), time (GNSS time), a timing signal (GNSS 1 PPS), and IMES data (including authentication data) resulting from PVT operation.

Selection control portion 323 detects a message output as a result of input of an IMES-TAS signal to channel block 321 and outputs the detected message to synchronization detection portion 324 and stabilization loop portion 326.

Synchronization detection portion 324 detects a message including a periodically transmitted telemetry word and outputs the message as a timing signal for an IMES-TAS signal. Since a message including a telemetry word is transmitted with a period of three seconds as described above, synchronization detection portion 324 outputs one pulsed signal every three seconds (IMES-TAS 1 pulse/3 second).

Synchronization detection portion 324 outputs timing of each input bit as a clock (CLK). When a bit rate of a signal transmitted from S3 transmitter 220 is set to 250 bps as described above, synchronization detection portion 324 outputs a clock at 250 Hz. Frequency divider 325 serves as a kind of a counter, and outputs one pulse for 250 clocks. Namely, a timing signal output from frequency divider 325 (IMES-TAS 1 PPS (Real)) corresponds to a 1-PPS signal. When a bit rate of a signal transmitted from S3 transmitter 220 is set to 50 bps, a frequency divider which outputs one pulse for fifty clocks should only be adopted.

Stabilization loop portion 326 outputs a clock (IMES-TAS/GNSS Clock (Stable)) for an IMES-TAS signal and a GNSS signal by locking a phase by making use of a phase locked loop (PLL) loop including a local oscillator upon receiving a clock from message extraction portion 3213 and a bit string from navigation processing portion 322. An output clock is more stabilized by the PLL loop provided by stabilization loop portion 326.

Similarly to frequency divider 325, frequency divider 327 serves as a kind of a counter and outputs one pulse for 250 clocks. Namely, a timing signal output from frequency divider 327 (IMES-TAS 1 PPS (Stable)) becomes a more stable signal corresponding to a 1-PPS signal.

Stabilization loop portion 326 and frequency divider 327 are optional and they are provided as appropriate depending on accuracy in time synchronization required in radio transmission and receiver 310 in base station 300.

As set forth above, S3 receiver 320 functions as a receiver configured to demodulate an IMES-TAS signal from S3 transmitter 220 and to obtain a timing signal (1 PPS) and time information corresponding to timing indicated by the timing signal. When an IMES-TAS signal of MT7 is received, GPS Nav message compatible GPS week and TOW can be obtained (see FIG. 17). When an IMES-TAS signal of MT8 is received, Christian year, month, day, hour, minute, and second can directly be obtained (see FIG. 18).

An IMES-TAS signal (MT7 or MT8) is repeatedly transmitted every transmission period Ts (three seconds in this example). In a message including a telemetry word (first word 271 shown in FIG. 22 or first word 271 shown in FIG. 23), all of thirty bits from the preamble region to the parity bit region are set to fixed values. Therefore, as a result of C/A code coherent integration processing by correlator 3212, a higher carrier to noise (C/N) ratio can be obtained. Consequently, accuracy in synchronization can be improved.

Figure 27:
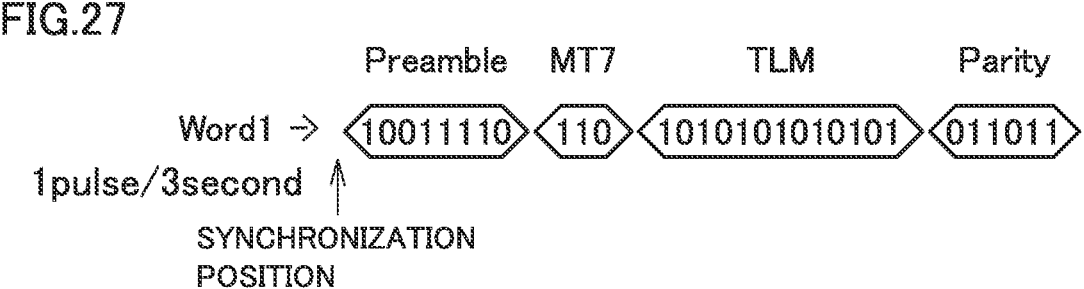
FIG. 27 is a diagram for illustrating processing for receiving a message including a telemetry word in the S3 receiver included in the time synchronization system according to the present embodiment.

FIG. 27 is a diagram for illustrating processing for receiving a message including a telemetry word in S3 receiver 320 included in the time synchronization system according to the present embodiment. Referring to FIG. 27, S3 receiver 320 can determine that rise of a head bit of a message (word 251 or word 261) including a telemetry word is any integer multiple of transmission period Ts (three seconds in this example). Then, by receiving two messages (words 252 and 253 or words 262 and 263) transmitted subsequent to the message including the telemetry word, all necessary information about time can be obtained.

For example, it is assumed that S3 receiver 320 has received MT7 as an IMES-TAS signal and the signal has been decoded to indicate time as "ten twenty three and thirty seconds on Jun. 30, 2016." Thereafter, when new MT7 is received after transmission period Ts (three seconds), the time of reception of the head bit of a frame of newly received MT7 can be interpreted as "ten twenty three and thirty-three seconds on Jun. 30, 2016." Such processing is repeated every transmission period Ts (three seconds).

Since a bit rate of a signal transmitted from S3 transmitter 220 has been set to 250 bps, by detecting 250 counts (one count per one bit) with the counter after reception of a message including a telemetry word, a 1-PPS signal as a timing signal can be output. Namely, synchronization detection portion 324 and frequency divider 325 shown in FIG. 26 reproduce a 1-PPS signal based on an IMES-TAS signal transmitted from S3 transmitter 220. Since a modulated signal at 250 bps transmitted from S3 transmitter 220 constantly maintains accuracy necessary for time synchronization, the 1-PPS signal output from synchronization detection portion 324 and frequency divider 325 shown in FIG. 26 is sufficiently accurate in practical use unless special stability is required.

When a bit rate of a signal transmitted from S3 transmitter 220 is set to 50 bps, by sensing synchronization with a time period five times longer being spent, accuracy as high as in the example of the bit rate of 250 bps can be achieved.

When special stability is required, stabilization loop portion 326 and frequency divider 327 shown in FIG. 26 are made use of. Stabilization loop portion 326 extracts a clearer signal and reduces phase noise of a timing signal by improving a C/N ratio by performing integration processing by using a telemetry word and performing correlation processing. Stabilization loop portion 326 does not simply count a bit which makes up a message but includes a mechanism to synchronize a phase with a telemetry word by using PLL. Furthermore, an oscillator high in accuracy and stability such as an oven controlled crystal oscillator (OCXO) or a temperature compensated crystal oscillator (TCXO) is employed for stabilization loop portion 326 in order to establish a stable loop also for a relatively long transmission period of three seconds.

MT7 and MT8 used as IMES-TAS signals are thus scalable, and they are able to also sufficiently meet demands for higher stability.

S3 receiver 320 may simultaneously receive a GNSS signal and an IMES-TAS signal. In an environment where an IMES-TAS signal can be received, however, reliability of time information and a timing signal obtained from the GNSS signal may be very low. This is because S3 transmitter 220 is generally provided in an environment where a GNSS signal is not successfully received or an environment significantly low in reliability of a received GNSS signal (for example, indoors).

In consideration of such reasons, when a GNSS signal and an IMES-TAS signal are simultaneously received, time information and a timing signal obtained from the GNSS signal are preferably not to be used. Alternatively, when an IMES-TAS signal is received, a configuration which does not receive any GNSS signal may be adopted. Further alternatively, reception of a GNSS signal may be set in advance in S3 receiver 320. For example, setting a binary decoder (BD) for MT3 to "0" in S3 receiver 320 indicates that the S3 receiver is an indoor receiver, that is, indicates its low reliability in global navigation based on a GNSS signal or inability to receive a GNSS signal. By not permitting processing of a GNSS signal, power consumption in S3 receiver 320 can be reduced and a stable synchronization signal can be obtained.

When S3 receiver 320 receives IMES-TAS signals transmitted from a plurality of S3 transmitters 220 provided in proximity to one another, an IMES-TAS signal received at earliest timing may be selected. Since this difference in timing is merely an order of nanosecond, a signal earlier in timing is preferably detected by using a correlator or the like.

An approach to improvement in C/N ratio in S3 receiver 320 will now be described.

Figure 28:
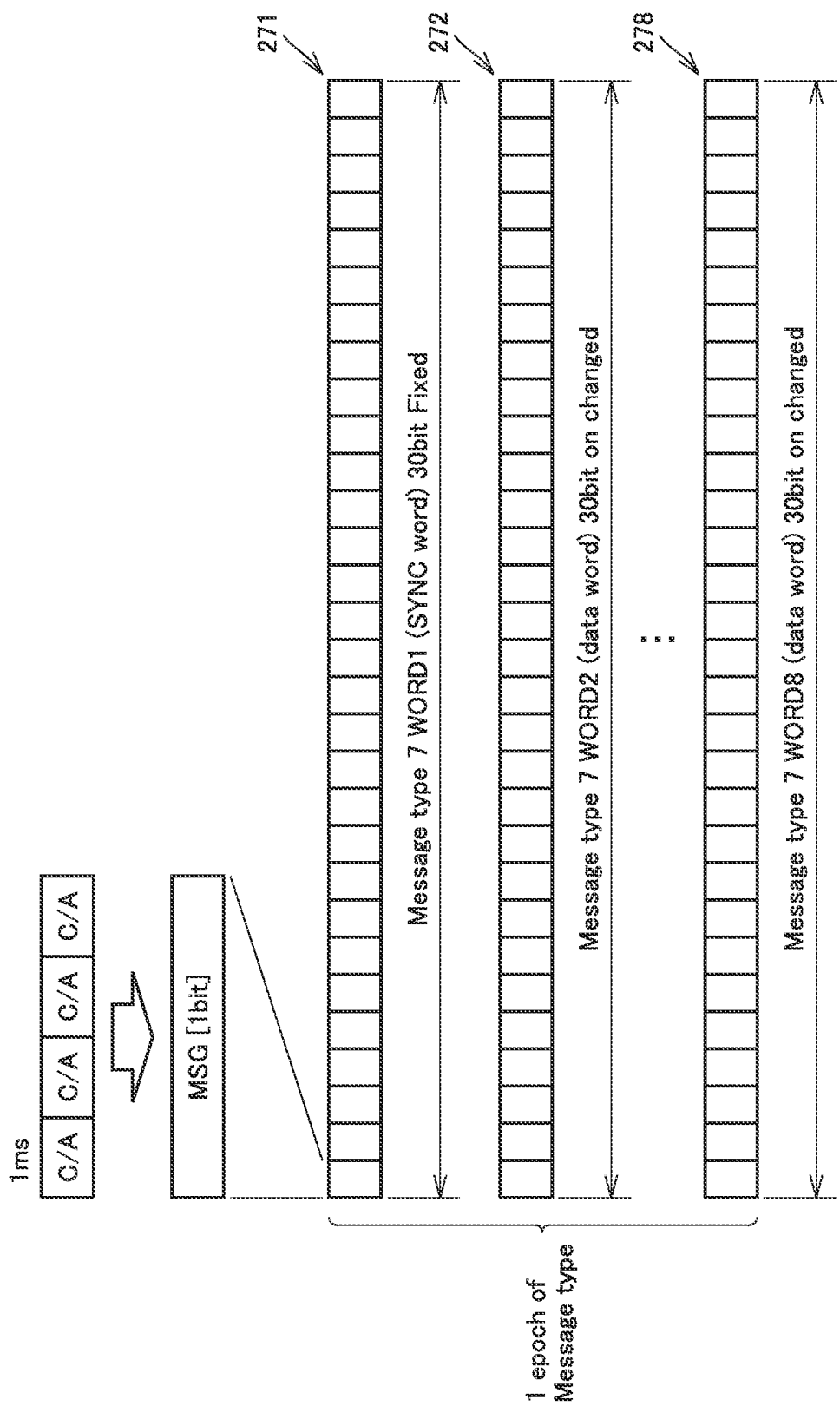
FIG. 28 is a diagram for illustrating a configuration of a message adopted in the time synchronization system according to the present embodiment.

FIG. 28 is a diagram for illustrating a configuration of a message adopted in the time synchronization system according to the present embodiment. FIG. 28 shows relation between a C/A code and an IMES-TAS signal (message format 270 of MT7). The IMES-TAS signal expresses one bit of a message by repeating four times the C/A code representing the spread code. A common GNSS signal expresses one bit of a message by repeating a C/A code twenty times.

Therefore, when a general GNSS receiver captures a C/A code, it forms a signal tracking loop and performs coherent integration processing (convolution operation processing) on a reception signal at the timing of the C/A code. The C/N ratio is thus improved and stability of the signal tracking loop is improved.

In contrast, an IMES-TAS signal used in the time synchronization system according to the present embodiment expresses one bit by repeating a C/A code four times. Therefore, convolution operation similar to that in a general GNSS receiver is low in effect of improvement in C/N ratio.

Then, for an IMES-TAS signal, a message for tracking a signal and performing integration processing is prepared. Specifically, first word 271 of the IMES-TAS signal (message format 270 of MT7) can function as a synchronization word. Since first word 271 has all thirty bits set to fixed values as described above, it can be used as a replica similarly to the C/A code in S3 receiver 320. By using such a message including a telemetry word, coherent integration processing (convolution operation processing) can be performed 120 times at the maximum. Namely, circuitry which performs convolution operation processing a plurality of times on the first word which makes up the IMES-TAS signal is mounted on S3 receiver 320. Frequency and timing performance which is the keystone of the IMES-TAS signal can be enhanced by improving stability of the signal tracking loop by improving the C/N ratio by using convolution operation processing performed a plurality of times.

As set forth above, S3 receiver 320 can output highly accurate time information and timing signal by improving a C/N ratio by using a characteristic of an IMES-TAS signal transmitted from S3 transmitter 220.

G. Generation and Use of Authentication Code

Generation and use of an authentication code will now be described.

Figure 29:
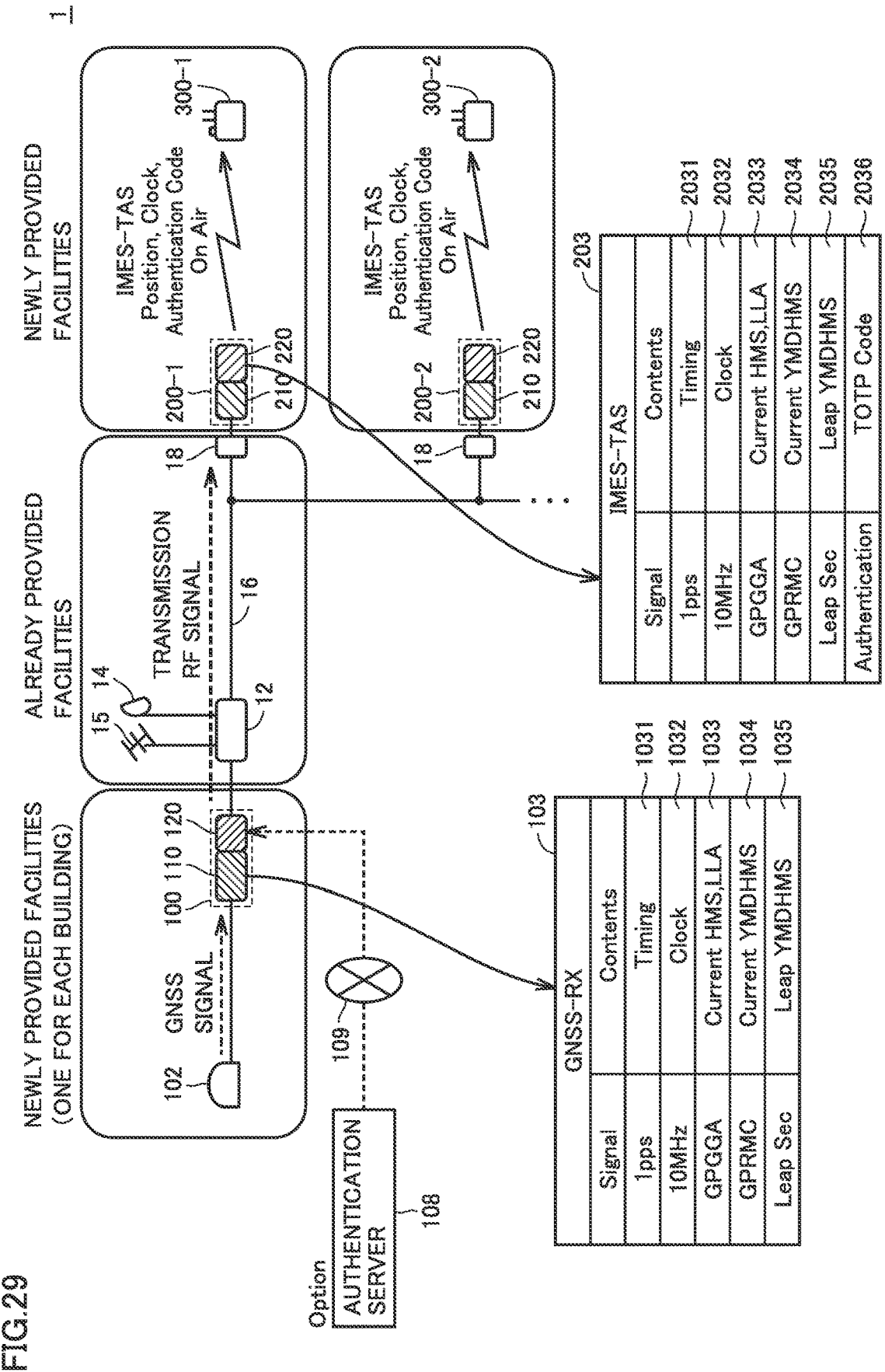
FIG. 29 is a diagram for illustrating one example of information contained in a signal transmitted in the time synchronization system according to the present embodiment.

FIG. 29 is a diagram for illustrating one example of information included in a signal transmitted in the time synchronization system according to the present embodiment. Referring to FIG. 29, a GNSS signal 103 received by reference unit 100 typically includes a timing signal 1031, a clock 1032, position information 1033, time information 1034, and leap second information 1035.

Timing signal 1031 is, for example, information for providing a timing signal in synchronization with the GNSS, and includes, for example, a one-second pulsed signal (1-PPS signal).

Clock 1032 is, for example, information for providing a frequency source in synchronization with the GNSS, and includes, for example, a 10-MHz pulsed signal.

Position information 1033 is information for providing global navigation service, and includes for example, a latitude, a longitude, an altitude, and floor information.

Time information 1034 is information for providing time information in synchronization with the GNSS, and includes, for example, information on Christian year, month, day, hour, minute, and second. Similarly, leap second information 1035 is also information for providing time information in synchronization with the GNSS, and includes information for correcting a leap second.

An IMES-TAS signal 203 transmitted from S3 transmitter 220 of transmission unit 200 typically includes a timing signal 2031, a clock 2032, position information 2033, time information 2034, leap second information 2035, and an authentication code 2036.

Since timing signal 2031, clock 2032, position information 2033, time information 2034, and leap second information 2035 are similar to corresponding information included in GNSS signal 103, detailed description will not be repeated.

Authentication code 2036 includes, for example, a value of a TOTP as a one-time password dependent on a current value of a position and time.

Base station 300 or a mobile terminal which has received IMES-TAS signal 203 from S3 transmitter 220 of transmission unit 200 can perform also authentication processing for ensuring integrity or authenticity of a position and time in addition to a position and time by receiving IMES-TAS signal 203.

Figure 30:
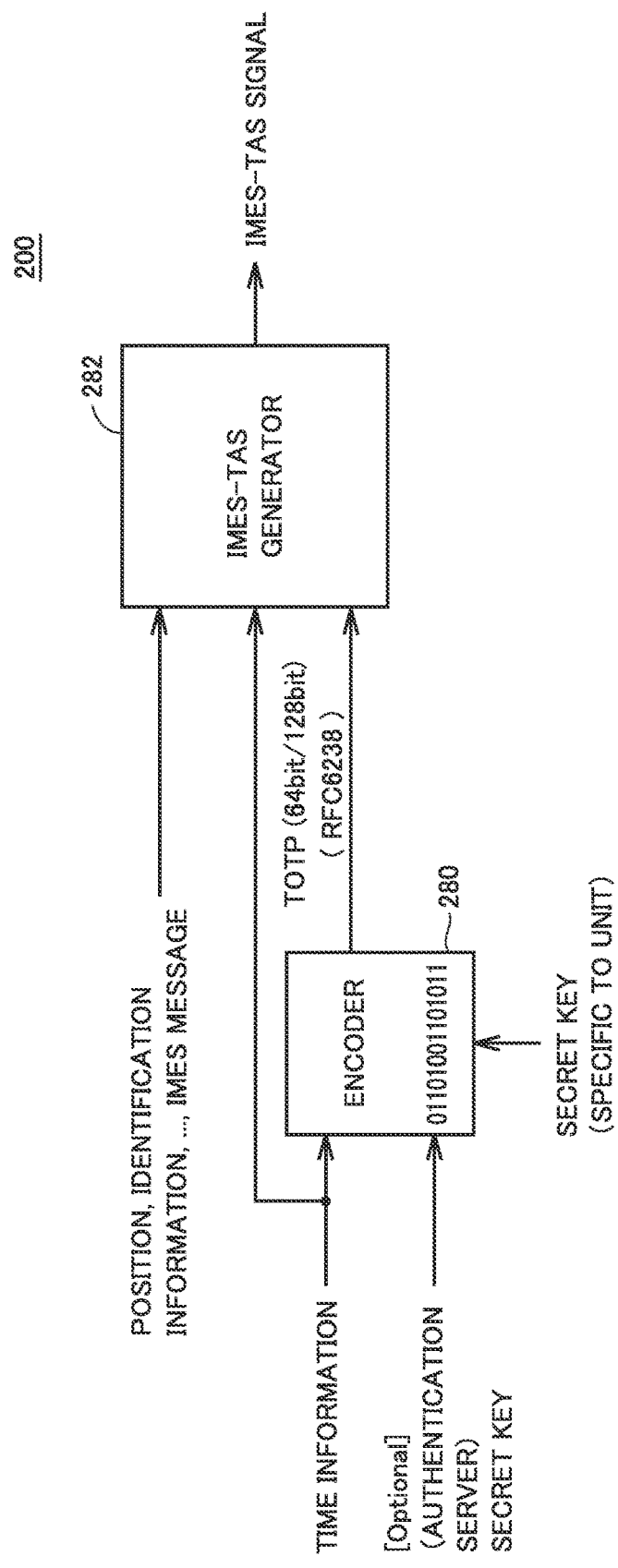
FIG. 30 is a diagram for illustrating one example of a method of generating an authentication code in the time synchronization system according to the present embodiment.

FIG. 30 is a diagram for illustrating one example of a method of generating an authentication code in the time synchronization system according to the present embodiment. Referring to FIG. 30, S3 transmitter 220 of transmission unit 200 includes an encoder 280 for generating a TOTP and an IMES-TAS generator 282 which generates an IMES-TAS signal (message) including the TOTP generated by encoder 280.

Encoder 280 generates a TOTP including a prescribed number of bits by performing prescribed irreversible operation onto time information obtained by demodulating a transmission RF signal and any seed code. Typically, the TOTP can include 64 bits or 128 bits. Naturally, a TOTP constituted of a larger number of bits or a TOTP constituted of a smaller number of bits may be adopted.

Typically, a cryptographic hash function is preferably employed for the irreversible operation for generating a TOTP. A function of a secure hash algorithm (SHA) series can be employed as such a cryptographic hash function. A message digest output from such a cryptographic hash function corresponds to the TOTP. Alternatively, a TOTP generated in accordance with a generation algorithm defined as RFC6238 may be adopted.

In encoder 280, time information and a secret key set for each transmission unit 200 are provided to the cryptographic hash function. A TOTP which is a message of a prescribed length is thus calculated in accordance with the cryptographic hash function with the secret key and time information being provided as input.

The secret key is used as a seed code for generating a message digest (TOTP). When such a configuration is adopted, hardware high in resistance against tampering such as an attack on reference unit 100 is preferably adopted. For example, such a configuration as realizing generation of a key pair or computation of a message digest within a single chip is preferably adopted. A trusted platform module (TPM) has been known as one example of such a configuration. The TPM is also devised such that, when physical reverse engineering is attempted, an embedded memory is broken and a value stored therein is not read. By adopting such highly tamper-resistant hardware, security against attack over a network or physical reverse engineering can be maintained.

Alternatively, instead of setting a secret key in advance in transmission unit 200, a secret key generated by authentication server 108 may be used. Authentication server 108 randomly generates a secret key. The secret key generated by authentication server 108 may be included in a transmission RF signal transmitted from reference unit 100 to transmission unit 200. Since it is not necessary to hold a static secret key in reference unit 100 itself by making use of the secret key from authentication server 108, security strength can be enhanced.

IMES-TAS generator 282 generates an IMES-TAS signal as described above from a TOTP generated by encoder 280 in addition to position information, time information, an IMES message, and identification information.

By mounting the configuration as shown in FIG. 30 on reference unit 100, an IMES-TAS signal including a TOTP can be broadcast.

H. Demodulated Data Output Format

Information obtained by receiving an IMES-TAS signal transmitted from transmission unit 200 and decoding the received IMES-TAS signal may be output, for example, in conformity with an NMEA format used in output of reception data from a general GPS reception module.

FIGS. 31 to 40 are each a diagram showing one example of a data output format of an IMES-TAS signal in the time synchronization system according to the present embodiment.

FIG. 31 shows one example of a format (IMTCS) for outputting information for receiving service of a position and time. In the format shown in FIG. 31, basic information including current time is stored.

FIG. 32 shows one example of a format (IMTCR) for outputting more primitive information for receiving service of a position and time. In the format shown in FIG. 32, information included in a received IMES-TAS signal is stored as it is.

FIG. 33 shows one example of a format (IMASC) for outputting information for receiving service by using an authentication code. In the format shown in FIG. 33, in addition to position information, an authentication code (TOTP) associated with the position information is stored.

FIG. 34 shows one example of a format (IMMSG) for outputting information on processing for receiving an IMES-TAS signal. In the format shown in FIG. 34, a type of the received IMES-TAS signal or a received bit stream itself is stored.

FIG. 35 shows one example of a format (IMIPI) for outputting position information alone. In the format shown in FIG. 35, information on current position included in an IMES-TAS signal received from specific transmission unit 200 is stored.

FIG. 36 shows one example of a format (IMSPI) for outputting synthesized position information. In the format shown in FIG. 36, information on a current position synthesized based on a plurality of pieces of information is stored.

FIG. 37 shows one example of a format (IMSID) for outputting a short ID included in a transmitted message. In the format shown in FIG. 37, information on a short ID obtained from the received message and a boundary bit is stored.

FIG. 38 shows one example of a format (IMMID) for outputting a medium ID included in a transmitted message. In the format shown in FIG. 38, information on a medium ID obtained from the received message and a boundary bit is stored.

FIG. 39 shows one example of a format (IMDSA) in transmission of a disaster message broadcast by the QZSS by using the time synchronization system according to the present embodiment. In the format shown in FIG. 39, information for giving a disaster message is stored.

FIG. 40 shows one example of a format (GPGGA) for outputting contents of a broadcast IMES-TAS signal. In FIG. 40, for debugging or the like, contents themselves contained in the IMES-TAS signal are output.

The formats shown in FIGS. 31 to 40 are merely by way of example and any NMEA format can be adopted.

I. Delay Correction Function and Measurement and Setting of Delay Time

Processing for measuring and setting delay time for having a delay correction function performed in the time synchronization system according to the present embodiment will now be described.

Figure 41:
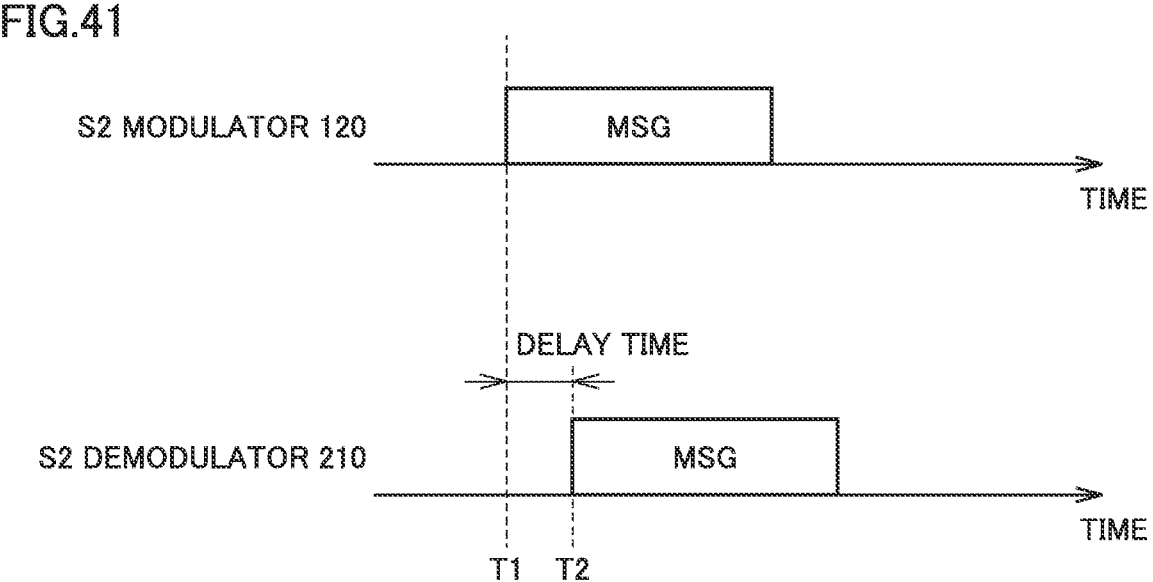
FIG. 41 is a diagram for illustrating transmission delay caused in the time synchronization system according to the present embodiment.

FIG. 41 is a diagram for illustrating transmission delay caused in the time synchronization system according to the present embodiment. Referring to FIG. 41, for example, it is assumed that a message is transmitted from S2 modulator 120 of reference unit 100 at certain time T1. It is assumed that the same message is received by S2 demodulator 210 of transmission unit 200 at time T2. A difference between time T1 and time T2 corresponds to delay time. In particular, in mobile communication system 2 shown in FIGS. 5 and 6, a transmission path from S2 modulator 120 of reference unit 100 to S2 demodulator 210 of transmission unit 200 is relatively long. Therefore, the delay time is not ignorable and it should be corrected. In order to have such a delay correction function effectively performed, an amount of correction (correction time) for transmission delay should be set for each S2 demodulator 210.

In order to facilitate measurement and setting of such delay time, a timing calibration apparatus may be adopted.

Figure 42:
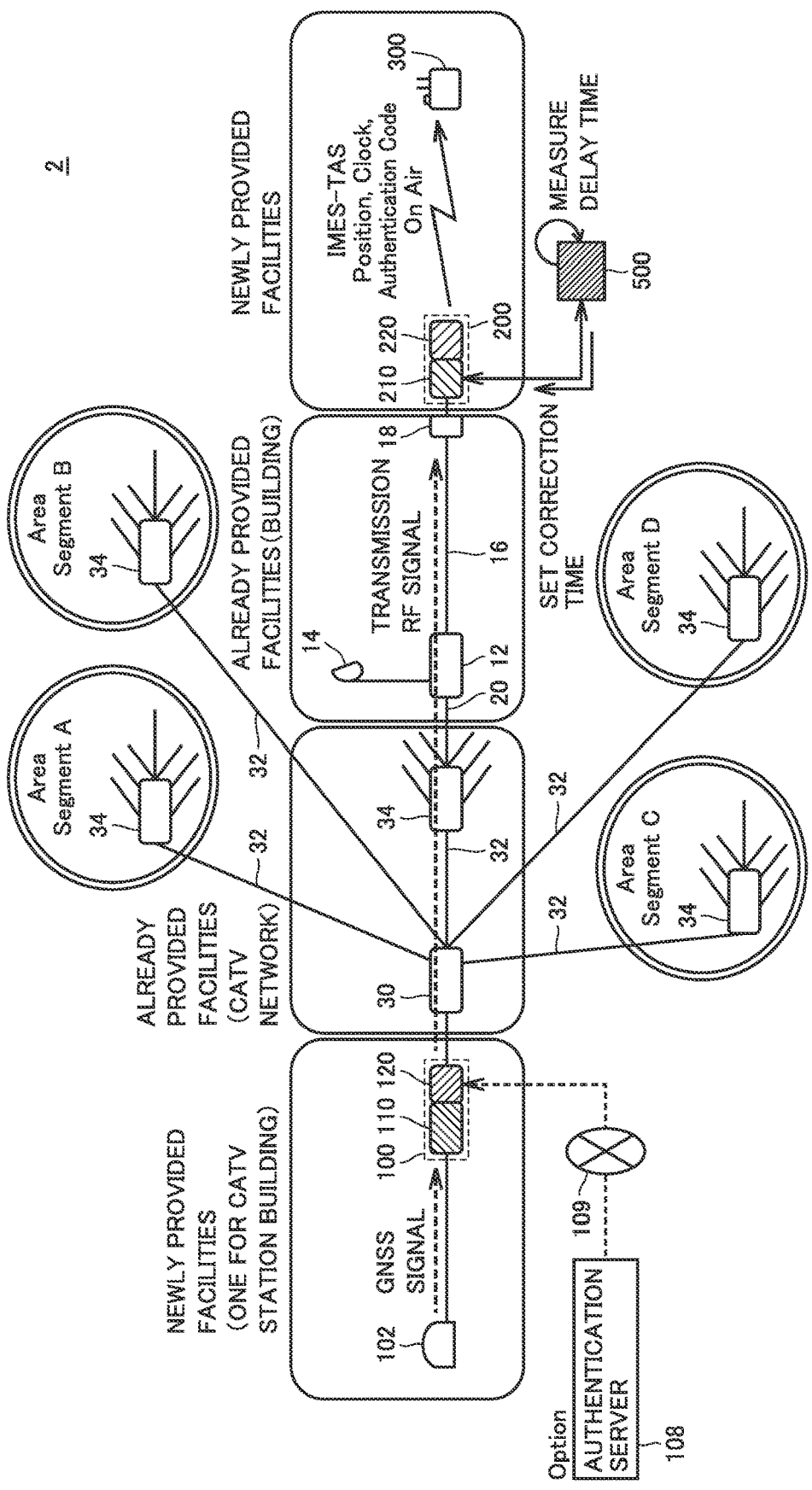
FIG. 42 is a diagram for illustrating an application of a timing calibration apparatus in the time synchronization system according to the present embodiment.

FIG. 42 is a diagram for illustrating an application of a timing calibration apparatus 500 in the time synchronization system according to the present embodiment. Referring to FIG. 42, the timing calibration apparatus is connected to S2 demodulator 210 of transmission unit 200 after the time synchronization system according to the present embodiment is configured so that delay time is automatically measured and an amount of correction (correction time) for transmission delay can be set for S2 demodulator 210 based on a result of measurement. Timing calibration apparatus 500 typically measures delay time and sets correction time.

Figure 43:
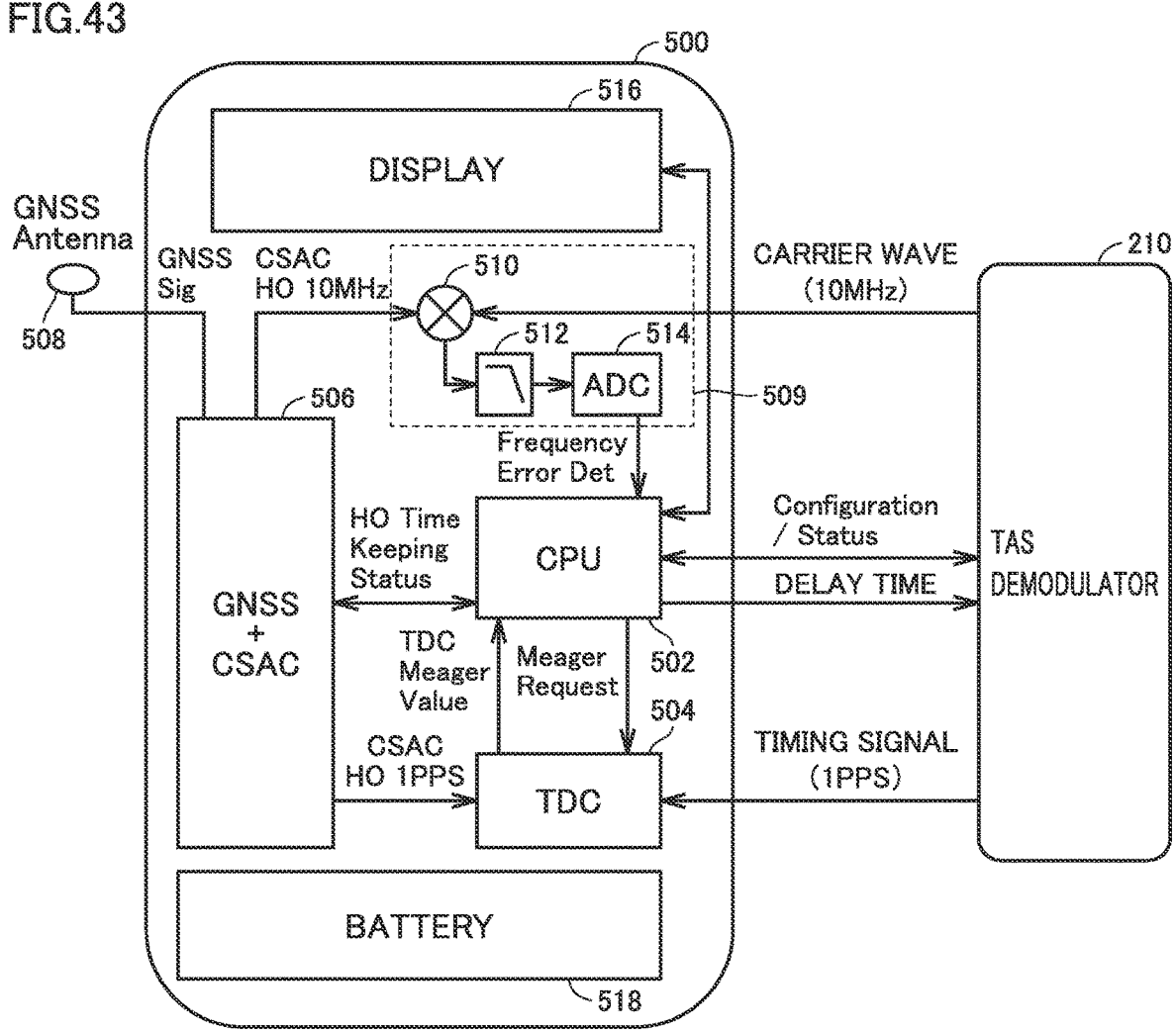
FIG. 43 is a block diagram showing an exemplary circuitry configuration of the timing calibration apparatus provided in the time synchronization system according to the present embodiment.

FIG. 43 is a block diagram showing an exemplary circuitry configuration of timing calibration apparatus 500 provided in the time synchronization system according to the present embodiment. Referring to FIG. 43, timing calibration apparatus 500 measures delay time by comparing an internally generated timing signal (1-PPS signal) with a timing signal (1-PPS signal) reproduced from a transmission RF signal by S2 demodulator 210.

Specifically, timing calibration apparatus 500 obtains an internally generated timing signal (1-PPS) substantially identical to a timing signal (1-PPS) obtained by GNSS receiver 110 of reference unit 100 and determines an amount of correction (correction time) for transmission delay by measuring a time lag between the internally generated timing signal (1-PPS) and the timing signal (1-PPS) output from S2 demodulator 210.

Specifically, timing calibration apparatus 500 includes a CPU 502, a time lag detector 504, a reference timing generation portion 506, a mixer 510, a high pass filter 512, an analog-digital converter 514, a display 516, and a battery 518.

CPU 502 provides an instruction to each portion and sets correction time for S2 demodulator 210 based on a result of processing. CPU 502 can also set a difference in connection with carrier waves, various setting values, and status information for S2 demodulator 210.

Time lag detector 504 detects delay time (phase difference) between a timing signal (1-PPS) from reference timing generation portion 506 and a timing signal (1-PPS) from S2 demodulator 210 in response to a command from CPU 502 and outputs the detected delay time to CPU 502. This delay time is adopted as an amount of correction to be set for S2 demodulator 210.

Reference timing generation portion 506 includes a chip scale atomic clock (CSAC) and outputs a highly accurate reference timing signal with information obtained by decoding a GNSS signal received through an antenna 508 being defined as the reference. Specifically, reference timing generation portion 506 outputs a timing signal (1-PPS signal) and an RF signal (10 MHz) corresponding to carrier waves.

Mixer 510 multiplies the RF signal from reference timing generation portion 506 and carrier waves from S2 demodulator 210 by each other. A result of multiplication by mixer 510 is converted to a digital signal by analog-digital converter 514 via high pass filter 512. A value output from analog-digital converter 514 represents a frequency shift of carrier waves.

Thus, mixer 510, high pass filter 512, and analog-digital converter 514 implement a frequency deviation detection portion 509 for detecting a frequency deviation. A signal output from frequency deviation detection portion 509 is counted by CPU 502. Frequency deviation detection portion 509 may be implemented by using an external counter.

Display 516 may show measured delay time or correction time and a state of output of a timing signal in reference timing generation portion 506, in addition to information on a state of operations by timing calibration apparatus 500 (for example, measurement or setting being in progress).

A series of operations including measurement of delay time and setting of correction time by timing calibration apparatus 500 can automatically be performed. By automating such a series of operations, necessary correction time can be set in a simplified procedure even though a large number of transmission units 200 (S2 demodulator 210 and S3 transmitter 220) are provided.

For performing the delay correction function adopted in the time synchronization system according to the present embodiment, correction time should be set for each of S2 demodulators 210. By using timing calibration apparatus 500, however, time for such operations can be shortened.

J. Function to Automatically Correct Delay Time

A function to automatically correct delay time in the time synchronization system according to the present embodiment will now be described.

Figure 44:
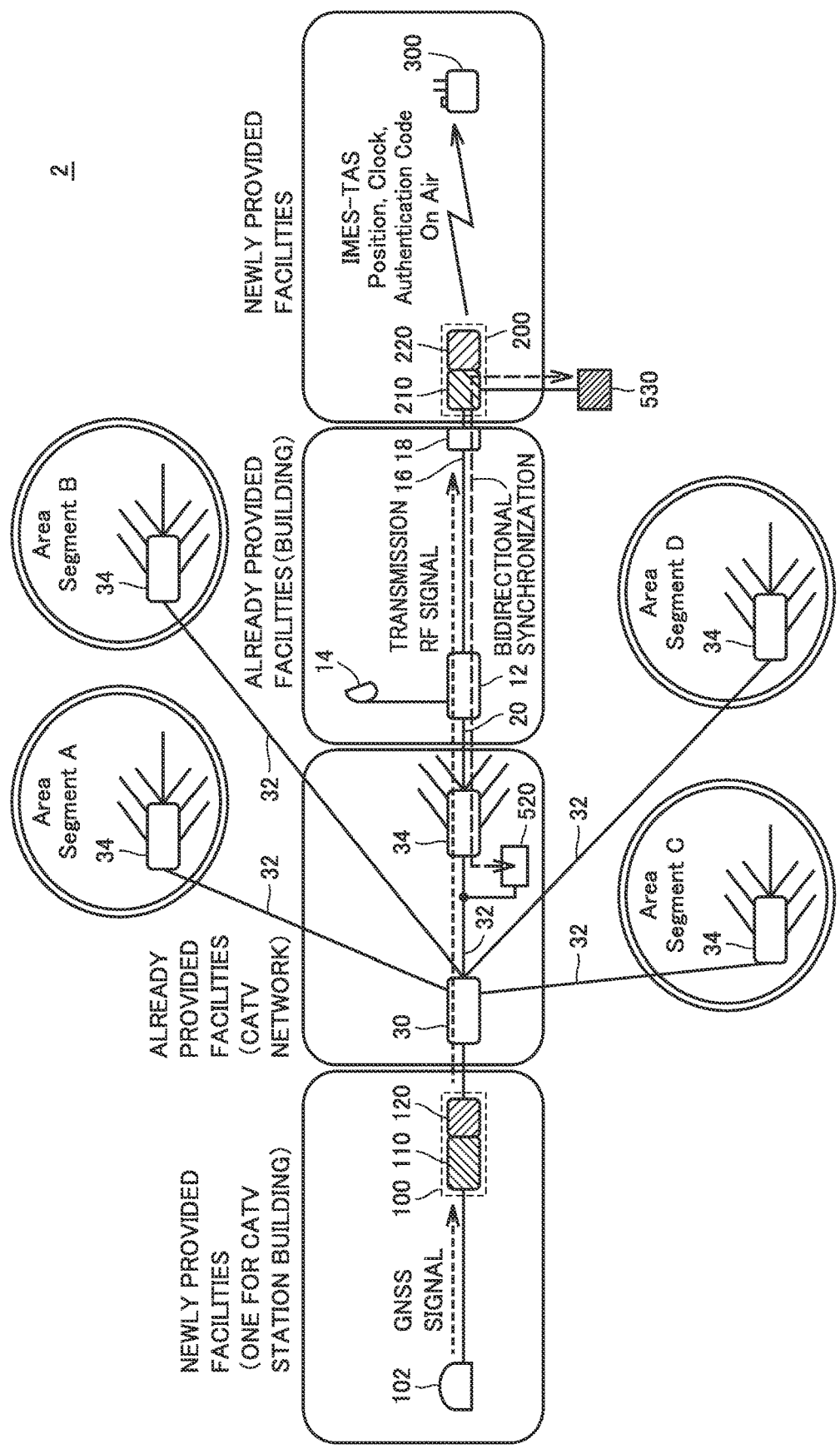
FIG. 44 is a diagram for illustrating a function to automatically correct delay time in the time synchronization system according to the present embodiment.

FIG. 44 is a diagram for illustrating a function to automatically correct delay time in the time synchronization system according to the present embodiment. Referring to FIG. 44, for example, a TAS transceiver master (TASTRX-M) 520 is provided downstream from head end 30 of a CATV broadcast station and a TAS transceiver slave 530 is provided as being connected to S2 demodulator 210. A bidirectional synchronization mechanism is configured between TAS transceiver master 520 and TAS transceiver slave 530. When a CATV network is made use of, the bidirectional synchronization mechanism may be configured in a BS/CS band.

In this case, by issuing a measurement request to TAS-TRX-SID included in a TASTRX-M broadcast packet, delay time between TAS transceiver master 520 and TAS transceiver slave 530 is measured. By establishing a frequency locked loop (FLL) correction loop by using the measured delay time, a loop through which delay time can automatically be corrected can be established. By applying a result of such an FLL correction loop to the function to automatically correct the delay time of S2 demodulator 210, correction time can dynamically be optimized even in an environment in which a state of a transmission path frequently varies. Therefore, highly accurate time synchronization can constantly be maintained regardless of a condition of a transmission path.

K. Modification k1: Generation and Transmission of Transmission RF Signal

A configuration in which a transmission RF signal transmitted from one reference unit 100 is received by a plurality of transmission units 200 is exemplified in the embodiment described above. For enhancing redundancy, however, a plurality of reference units 100 may be provided. In this case, a plurality of reference units 100 may transmit transmission RF signals at different frequencies (channels). Transmission units 200 can receive transmission RF signals through a plurality of channels and may selectively receive a predetermined transmission RF signal among those receivable transmission RF signals.

Alternatively, by mutual monitoring among a plurality of reference units 100, only any one reference unit 100 may transmit a transmission RF signal and other reference units 100 may stand by for immediately replacing, in the event of failure of reference unit 100 responsible for transmission of the transmission RF signal, the failed unit.

The time synchronization system according to the present embodiment transmits a timing signal (1 PPS) and time information by using a transmission RF signal. Therefore, quality of a transmission path from reference unit 100 to transmission unit 200 is not much demanded. Therefore, a plurality of transmission paths or any transmission path such as combination of a coaxial cable and an optical cable or combination of a CATV network and a telephone line can be employed, and the scope of application is broader.

k2: Transmission of Signal from Transmission Unit

Though an example using an IMES-TAS signal based on an IMES signal representing a simulated signal complementing a GPS signal is exemplified in the description above, a signal serving as a base is not limited thereto. For example, information such as position information, a system clock, and time information may wirelessly be transmitted in accordance with a format compatible with a radio signal from a global navigation satellite system such as the GLONASS, the SBAS, the BeiDou navigation satellite system, and the Galileo other than the GPS.

Alternatively, so long as reception circuitry of base station 300 is adaptable, information such as a system clock and time information may wirelessly be transmitted by using a radio signal in accordance with a known or unique protocol. For example, a radio signal may be transmitted by a more accurate method while a protocol similar to what is called atomic clock is adopted.

Figure 45:
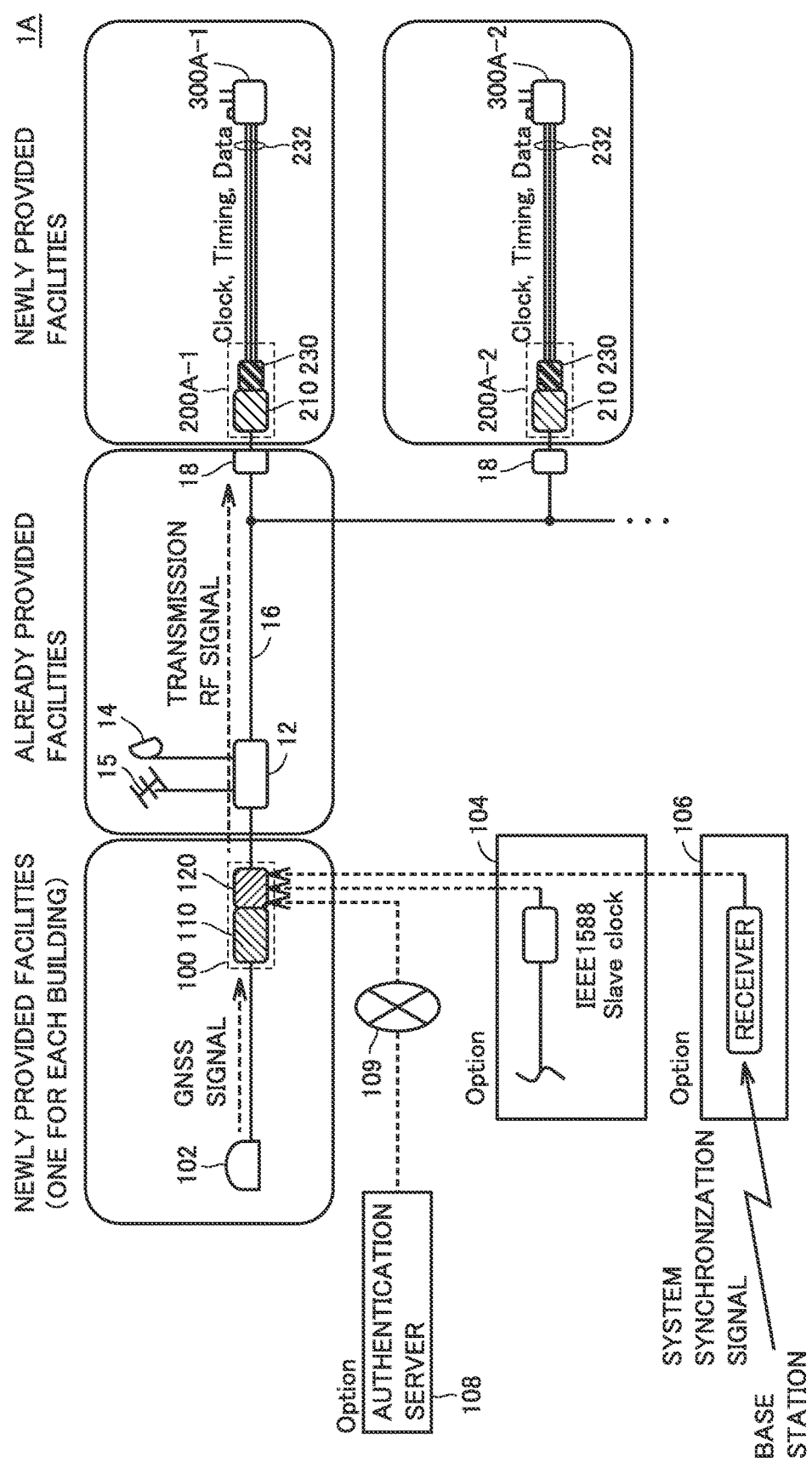
FIG. 45 is a schematic diagram showing one example of a mobile communication system including a time synchronization system according to a first modification of the present embodiment.
Figure 46:
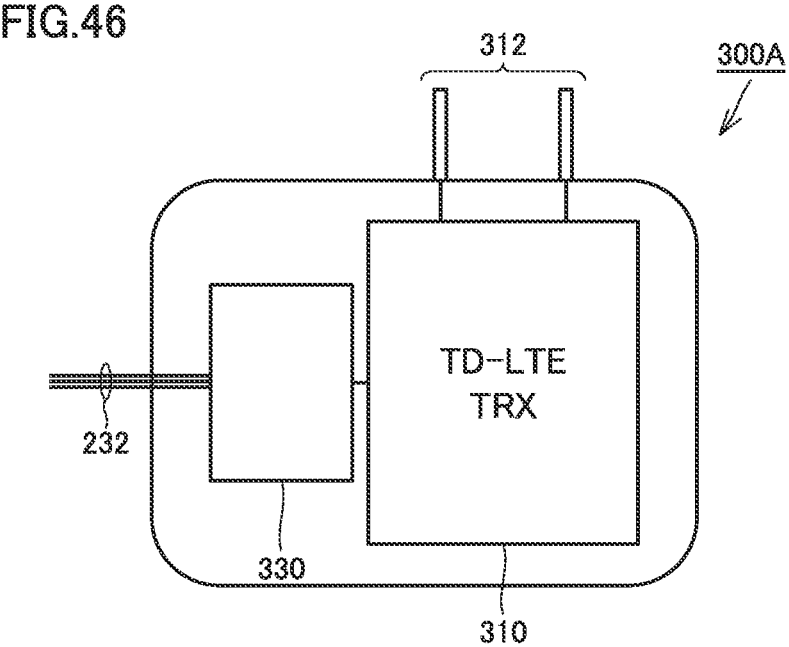
FIG. 46 is a schematic diagram showing an exemplary configuration of a base station included in the mobile communication system shown in FIG. 45.

Furthermore, as will be exemplified below, a transmission unit and a base station may be connected to each other through a wire. In this case, a signal in any format can be adopted.

k3: First Example of Wired Connection Between Transmission Unit and Base Station FIG. 45 is a schematic diagram showing one example of a mobile communication system 1A including a time synchronization system according to a first modification of the present embodiment. FIG. 46 is a schematic diagram showing an exemplary configuration of a base station 300A included in mobile communication system 1A shown in FIG. 45.

Transmission units 200A-1, 200A-2, . . . (which may also collectively be referred to as a "transmission unit 200A" below) in mobile communication system 1A shown in FIG. 45 each include S2 demodulator 210 which demodulates a transmission RF signal transmitted from S2 modulator 120 and a transmission interface 230 for transmitting a result of demodulation by S2 demodulator 210 to base station 300A. Respective one of transmission units 200A is electrically connected to any one of base stations 300A-1, 300A-2, . . . (which may also collectively be referred to as a "base station 300A" below) through a signal line 232.

Time information, a timing signal, and various types of data included in a result of demodulation by S2 demodulator 210 are transmitted from transmission unit 200A to transmission unit 300A through signal line 232. A signal may be transmitted in any scheme and procedure. Referring to FIG. 46, in base station 300A, instead of S3 receiver 320 (see FIG. 4), a transmission interface 330 is arranged. Specifically, transmission interface 230 of transmission unit 200A and transmission interface 330 of base station 300A are features for transmitting necessary information through signal line 232.

Figure 47:
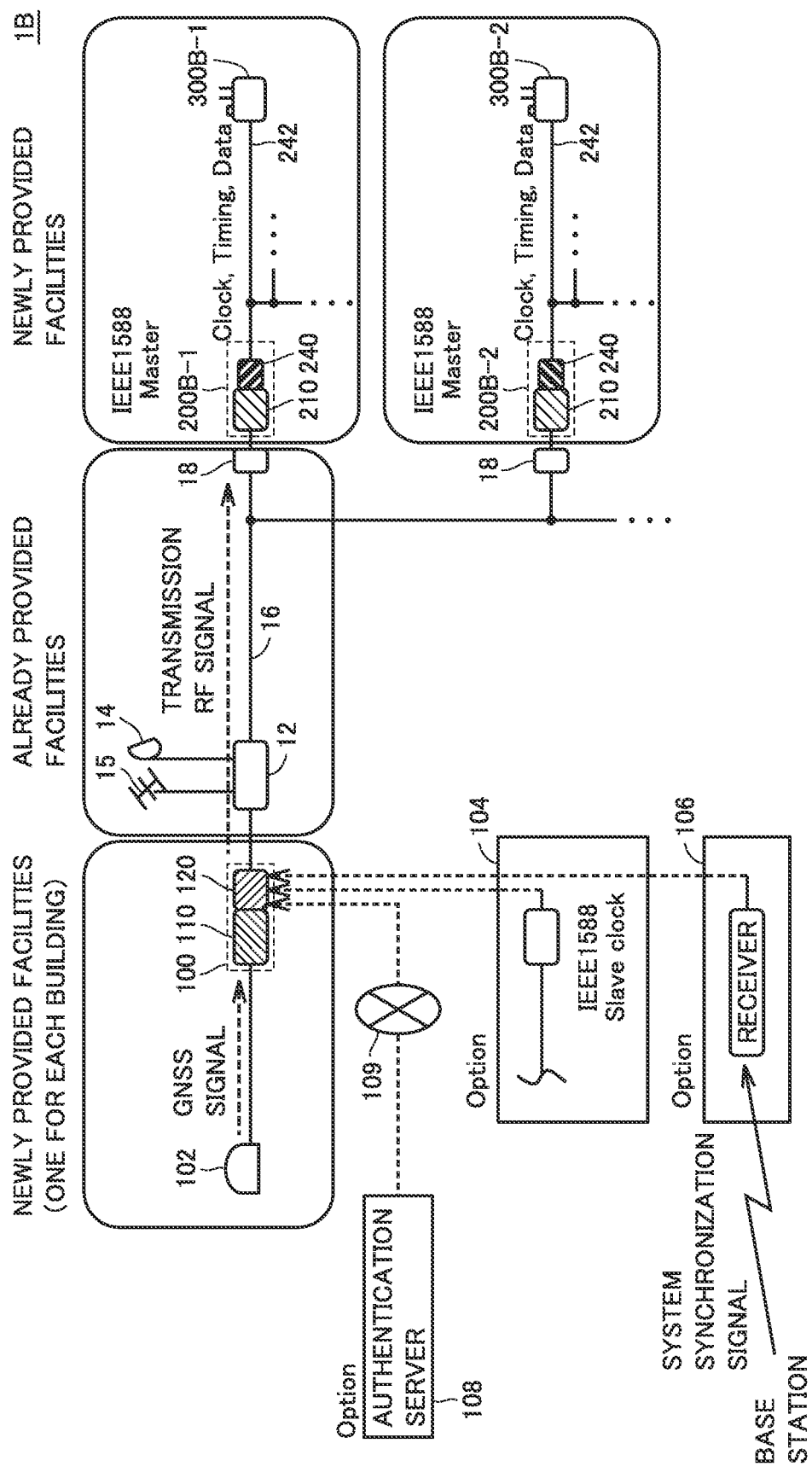
FIG. 47 is a schematic diagram showing one example of a mobile communication system including a time synchronization system according to a second modification of the present embodiment.
Figure 48:
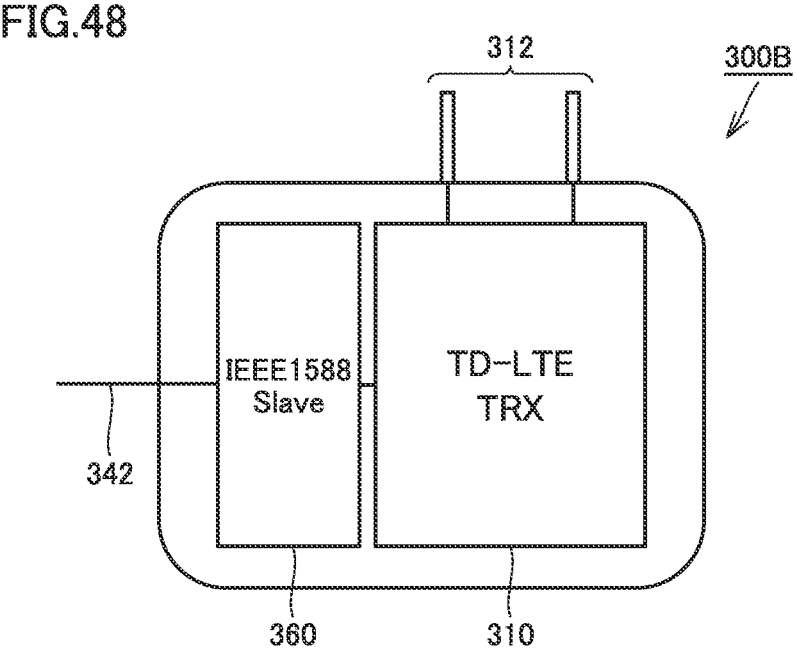
FIG. 48 is a schematic diagram showing an exemplary configuration of a base station included in the mobile communication system shown in FIG. 47.

By adopting such a configuration, base station 300A can be arranged even at a location where transmission of a radio signal such as an IMES-TAS signal is restricted.

k4: Second Example of Wired Connection Between Transmission Unit and Base Station FIG. 47 is a schematic diagram showing one example of a mobile communication system 1B including a time synchronization system according to a second modification of the present embodiment. FIG. 48 is a schematic diagram showing an exemplary configuration of a base station 300B included in mobile communication system 1B shown in FIG. 47.

In mobile communication system 1B shown in FIG. 47, transmission units 200B-1, 200B-2, . . . (which may also collectively be referred to as a "transmission unit 200B" below) are connected to one base station or a plurality of base stations of base stations 300B-1, 300B-2, . . . (which may also collectively be referred to as a "base station 300B" below) through a network cable 242. For example, by adopting a cable in conformity with Ethernet™ as network cable 242, a kind of network can be configured. When such a network is configured, a plurality of base stations 300B may be connected to a single transmission unit 200B.

In mobile communication system 1B shown in FIG. 47, each of transmission units 200B includes S2 demodulator 210 which demodulates a transmission RF signal transmitted from S2 modulator 120 and a master clock 240 which generates reference time based on a result of demodulation by S2 demodulator 210. Master clock 240 is, for example, a reference time generation apparatus for achieving time synchronization with the use of the PTP technique, and for example, a master clock in accordance with a protocol defined under IEEE 1588 (PTP) or IEEE 1588v2 (PTPv2) may be adopted. Referring to FIG. 48, in base station 300B, a slave clock 360 is arranged instead of S3 receiver 320 (see FIG. 4). Slave clock 360 is in time synchronization with master clock 240 through network cable 242 and provides synchronized time information to radio transmission and receiver 310.

By adopting such a configuration, base station 300B can be arranged even at a location where transmission of a radio signal such as an IMES-TAS signal is restricted. Since a plurality of base stations 300B can also be connected to single transmission unit 200B, arrangement of base station 300B is flexible.

k5: Exemplary Use of Signal Transmitted from Transmission Unit

Though an example of application of the time synchronization system to an application of time synchronization between base station 300 and another base station 300 is exemplified as a typical example in the description above, limitation thereto is not intended and another apparatus may make use of information such as position information, a system clock, and time information.

Figure 49:
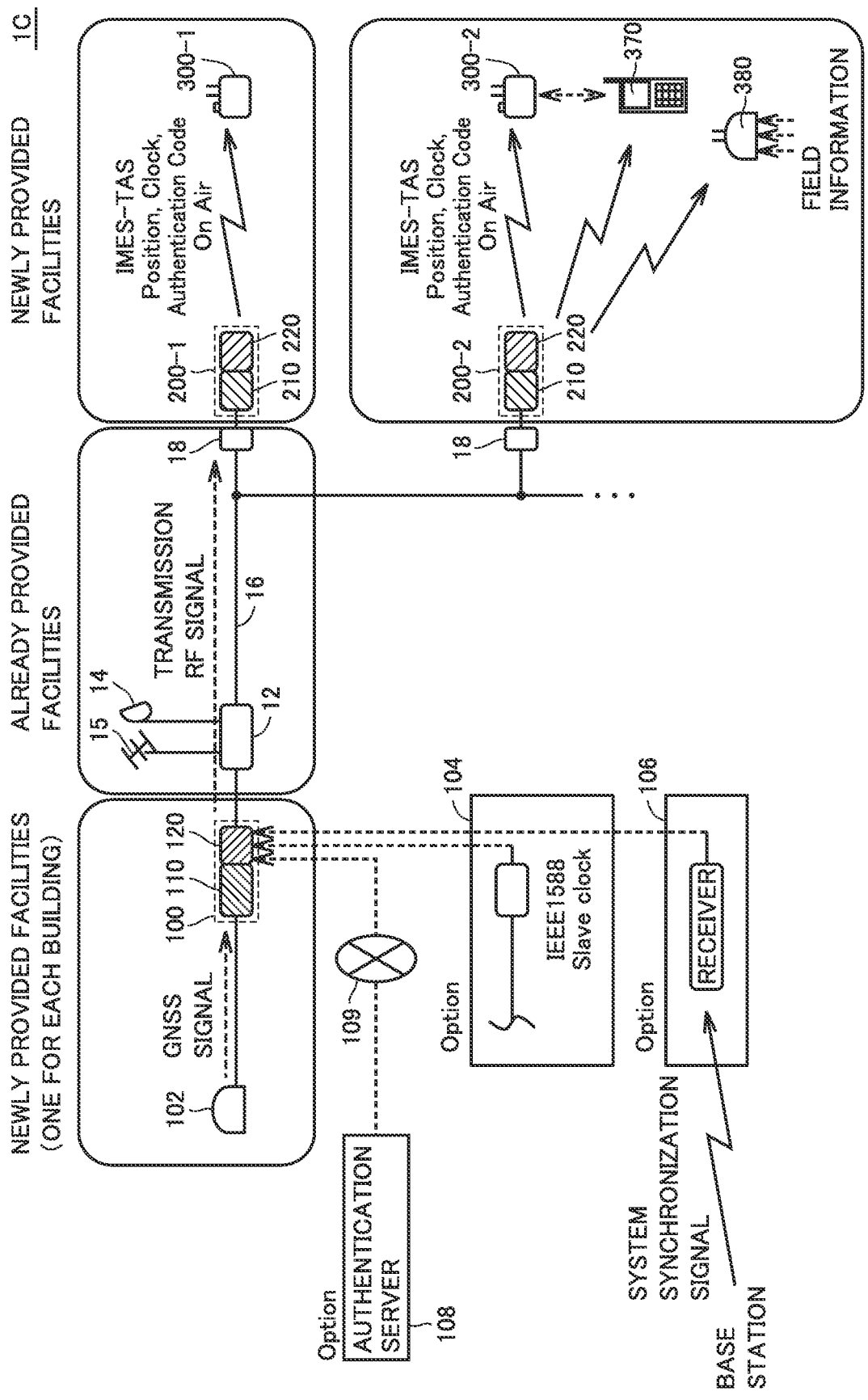
FIG. 49 is a schematic diagram showing one example of a mobile communication system including a time synchronization system according to a third modification of the present embodiment.

FIG. 49 is a schematic diagram showing one example of a mobile communication system 1C including a time synchronization system according to a third modification of the present embodiment. In mobile communication system 1C shown in FIG. 49, though a mobile terminal 370 present within a cell area provided by any base station (base station 300-2 in the example shown in FIG. 49) can obtain necessary information from base station 300-2, it may receive together a radio signal from transmission unit 200-2 and obtain position information, a system clock, and time information transmitted over the radio signal. In a condition as shown in FIG. 49, mobile terminal 370 is highly likely to be unable to make use of a GNSS signal. Therefore, position information is obtained through a radio signal from transmission unit 200-2 and a user can receive necessary service.

Various types of information transmitted over a radio signal from transmission unit 200 may be provided also to any communication device 380. For example, any communication device 380 can obtain position information and time information of the communication device itself through a radio signal from transmission unit 200 and provide the information together with other types of collected information to a higher-order server apparatus or the like. By adopting such a configuration, position information and time information can be collected outdoors and indoors simply by mounting radio transmission circuitry and circuitry for receiving a GNSS signal on communication device 380, and collected field information can be provided in association with such position information and time information. Therefore, various systems in which an Internet of Things (IoT) technology is applied can inexpensively be provided.

k6: Exemplary Use of Signal Transmitted from Transmission Unit

Figure 50:
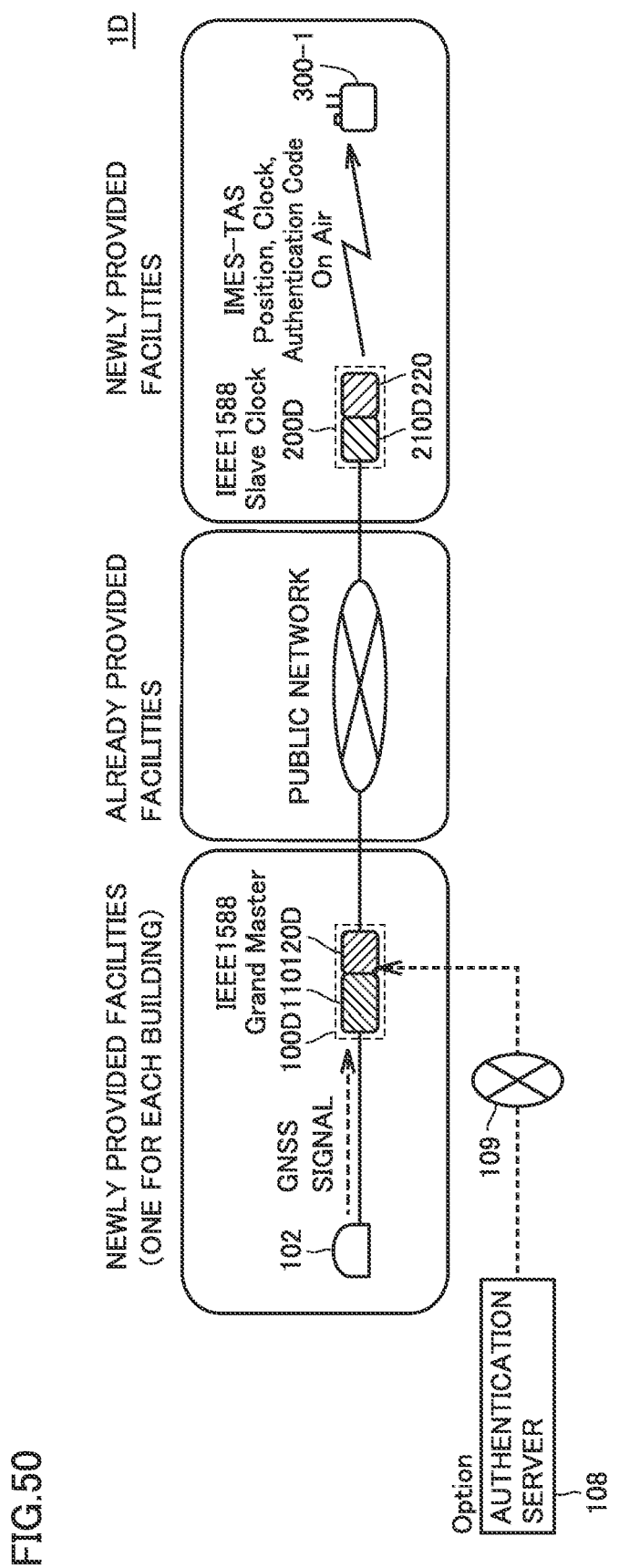
FIG. 50 is a schematic diagram showing one example of a mobile communication system including a time synchronization system according to a fourth modification of the present embodiment.

FIG. 50 is a schematic diagram showing one example of a mobile communication system 1D including a time synchronization system according to a fourth modification of the present embodiment. In mobile communication system 1D shown in FIG. 50, a reference unit 100D includes an S2 modulator 120D including an interface for connection to a network such as Ethernet™ instead of an interface for generating a transmission RF signal. S2 modulator 120D further contains a (grand) master clock in accordance with a protocol defined under IEEE 1588 (PTP) or IEEE 1588v2 (PTPv2).

Each transmission unit 200D includes an S2 demodulator 210D including an interface for connection to a network such as Ethernet™ instead of an interface for receiving a transmission RF signal. S2 demodulator 210D contains a slave clock in accordance with a protocol defined under IEEE 1588 (PTP) or IEEE 1588v2 (PTPv2). S2 demodulator 210D manages time in synchronization with the master clock contained in S2 modulator 120D.

Similarly to the configuration described above, information for generating an IMES-TAS signal is provided through a network from reference unit 100D to transmission unit 200D. Transmission unit 200D then provides an IMES-TS signal or an IMES-TAS signal to a base station. The IMES-TS signal typically includes a position (Position), time (Clock), and a timing signal (Timing). The IMES-TAS signal includes an authentication code (Authentication Code) in addition to information included in the IMES-TS signal.

By adopting such a configuration, facility requirements necessary for transmission of information from reference unit 100D to transmission unit 200D can be relaxed and wide spread use of the mobile communication system according to the present embodiment can further be promoted.

L. Advantage

In the time synchronization system according to the present embodiment, a timing signal and time information necessary for time synchronization are transmitted to S2 demodulator 210 in a form of a transmission RF signal, and by using data demodulated by S2 demodulator 210, S3 transmitter 220 transmits the signal and information in a form of any signal (typically, an IMES-TAS signal as described above) wirelessly or through a wire. By adopting such a form of signal transmission, already provided facilities such as a common antenna system or a CATV network can be made use of, and facilities in which an on-premises terminal (a connector for TV wiring) can easily be connected can also be made use of. Therefore, when a large number of micro base stations such as femtocells are provided indoors, time synchronization in the entire system including the plurality of micro base stations can readily be achieved while cost required for installation is reduced.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1, 1A, 1B, 1C, 2 mobile communication system; 10 building; 12 mixing amplifier; 16 antenna line; 18 terminal; 20 lead-in wire; 30 head end; 32 transmission line; 34 reception splitter; 100 reference unit; 102 GNSS antenna; 103 GNSS signal; 104, 360 slave clock; 106 receiver; 108 authentication server; 109 network; 110 GNSS receiver; 120 S2 modulator; 121 IF signal generation circuitry; 122 modulation circuitry; 123, 129 low pass filter; 124, 2141, 2142, 2158 digital-analog converter; 125, 217 carrier oscillator; 126 up-conversion circuitry; 127, 510, 2122, 2146 mixer; 128, 2121 variable amplifier; 200, 200A, 200B, 200D transmission unit; 203 IMES-TAS signal; 210 S2 demodulator; 212 down-conversion circuitry; 214 demodulation circuitry; 218 system oscillator; 220 S3 transmitter; 221 digital processing block; 222 EEPROM; 223 analog processing block; 224, 340, 508 antenna; 225 digital input and output interface; 226 timing interface; 227 oscillator; 228 power supply; 230, 330 transmission interface; 232 signal line; 240 master clock; 242 network cable; 280 encoder; 282 IMES-TAS generator; 300, 300A, 300B base station; 310 radio transmission and receiver; 320 S3 receiver; 321 channel block; 322 navigation processing portion; 323 selection control portion; 324 synchronization detection portion; 325, 327, 2154, 2159 frequency divider; 326 stabilization loop portion; 350, 400 cell area; 370 mobile terminal; 380 communication device; 500 timing calibration apparatus; 502, 2212 CPU; 504 time lag detector; 506 reference timing generation portion; 509 frequency deviation detection portion; 512 high pass filter; 514 analog-digital converter; 516 display; 518 battery; 520 transceiver master; 530 transceiver slave; 1031, 2031 timing signal; 1032, 2032 clock; 1033, 2033 position information; 1034, 2034 time information; 1035, 2035 leap second information; 2036 authentication code; 2123, 2125, 2160 amplifier; 2124, 2126, 2144, 2145 low pass filter; 2143 phase rotator; 2147 bit synchronization portion; 2148 SYNC sensing portion; 2149 data extraction portion; 2150 parallel conversion portion; 2151 delay correction amount holding portion; 2152 synchronization adjustment portion; 2153 phase comparison portion; 2156, 2157 loop filter; 2214 RAM; 3211, 3212 correlator; 3213 message extraction portion; 3214 code generation portion; 3215 convolution operation portion; 3216 integration circuit

The invention claimed is:

1. A time synchronization system comprising:
a reference time obtaining unit configured to obtain, based on a radio signal from a global navigation satellite system, a first timing signal and time information corresponding to timing indicated by the first timing signal;
a modulator, connected to a line branched into a plurality of branches, configured to generate a modulated signal containing corresponding time information in synchronization with the first timing signal and to send the modulated signal over the line;
at least one demodulator, connected to any branch of the line, configured to demodulate the modulated signal propagating over the line; and
at least one transmitter configured to transmit a first radio signal compatible with the radio signal from the global navigation satellite system based on a second timing signal and the time information obtained through demodulation by any demodulator, wherein:
the first timing signal is periodically output,
the modulator is configured to send the modulated signal over the line at a timing determined from a time point of output of the first timing signal, as a reference, and
the modulated signal contains a synchronization word in addition to the time information.

2. The time synchronization system according to claim 1, wherein the demodulator is configured to output, when the demodulator detects the synchronization word contained in the modulated signal propagating over the line, information following the detected synchronization word as demodulated data and to output the second timing signal at a timing determined from a time point preceding a time point of detection of the synchronization word by predetermined correction time, as a reference.

3. The time synchronization system according to claim 2, further comprising a calibration apparatus configured to obtain a third timing signal substantially identical to the first timing signal obtained by the reference time obtaining unit and to determine the correction time by measuring a time interval between the third timing signal and the second timing signal output from the demodulator.

4. The time synchronization system according to claim 1, wherein the transmitter is configured to transmit the first radio signal with a period longer than a period of the second timing signal output from the demodulator.

5. The time synchronization system according to claim 1, wherein
the first radio signal supports at least one of
a first format containing information on a week elapsed since a prescribed reference day and total seconds from beginning of a week, and
a second format containing information on Christian year, month, day, hour, minute, and second.

6. The time synchronization system according to claim 1, wherein
the first radio signal is configured as a frame consisting of a plurality of words,
a head of the plurality of words which make up the frame is associated with a time point of start of a transmission period, and
a first word in the frame is fixed to a predetermined value.

7. The time synchronization system according to claim 6, further comprising a receiver configured to demodulate the first radio signal from the transmitter to obtain a fourth timing signal and time information corresponding to timing indicated by the fourth timing signal, wherein
the receiver includes circuitry which performs convolution operation processing a plurality of times on the first word.

8. The time synchronization system according to claim 1, wherein
the transmitter is configured to transmit a second radio signal replacing the radio signal from the global navigation satellite system while the first radio signal is not transmitted.

9. The time synchronization system according to claim 1, wherein the line includes at least any of a signal line of a common antenna system, a cable television signal line, and a signal line for communication.

10. The time synchronization system according to claim 1, wherein the first radio signal includes a message of a prescribed length calculated based on the time information obtained by the reference time obtaining unit.

11. The time synchronization system according to claim 10, wherein the message of the prescribed length is calculated in accordance with a cryptographic hash function with a secret key and the time information being defined as input.

12. A time synchronization system comprising:
a reference time obtaining unit configured to obtain, based on a radio signal from a global navigation satellite system, a first timing signal and time information corresponding to timing indicated by the first timing signal; and
a modulator, connected to a line branched into a plurality of branches, configured to generate a modulated signal containing corresponding time information in synchronization with the first timing signal and to send the modulated signal over the line,
at least one terminal for connection of a demodulator configured to demodulate the modulated signal propagating over the line being provided at a branch of the line, wherein:
the first timing signal is periodically output,
the modulator is configured to send the modulated signal over the line at a timing determined from a time point of output of the first timing signal, as a reference, and
the modulated signal contains a synchronization word in addition to the time information.

13. A transmission apparatus comprising:
a demodulator, connected to any position in a line branched into a plurality of branches, configured to demodulate a modulated signal propagating over the line, the modulated signal being generated based on a first timing signal defined as a reference and time information corresponding to timing indicated by the first timing signal and being sent over the line in synchronization with the first timing signal; and a transmitter configured to transmit a radio signal compatible with a radio signal from a global navigation satellite system based on a second timing signal and the time information obtained through demodulation by the demodulator, wherein:
the first timing signal is periodically output,
the modulated signal is transmitted over the line at a timing determined from a time point of output of the first timing signal, as a reference, and
the modulated signal contains a synchronization word in addition to the time information.

14. A transmission apparatus comprising:
a receiver configured to receive a modulated signal generated based on a first radio signal from a global navigation satellite system; and
a transmitter configured to transmit a second radio signal compatible with the first radio signal from the global navigation satellite system based on a timing signal and time information received by the receiver,
the second radio signal including a position, time, timing, and authentication information, wherein
the modulated signal is generated based on a reference timing signal from the global navigation satellite system and time information corresponding to timing indicated by the reference timing signal,
the modulated signal is transmitted over the line at a timing determined from a time point of output of the reference timing signal, as a reference, and
the modulated signal contains a synchronization word in addition to the time information.

* * * * *